(12) United States Patent
Woodgate et al.

(10) Patent No.: US 11,604,311 B2
(45) Date of Patent: *Mar. 14, 2023

(54) OPTICAL WAVEGUIDE FOR DIRECTIONAL BACKLIGHT

(71) Applicant: RealD Spark, LLC, Beverly Hills, CA (US)

(72) Inventors: Graham J. Woodgate, Henley-on-Thames (GB); Michael G. Robinson, Beverly Hills, CA (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,471

(22) Filed: Apr. 15, 2022

(65) Prior Publication Data

US 2022/0365268 A1 Nov. 17, 2022

Related U.S. Application Data

(63) Continuation of application No. 17/161,089, filed on Jan. 28, 2021, now Pat. No. 11,320,575, which is a
(Continued)

(51) Int. Cl.
*F21V 8/00* (2006.01)
*G02F 1/13* (2006.01)

(52) U.S. Cl.
CPC ......... *G02B 6/0038* (2013.01); *G02B 6/0053* (2013.01); *G02B 6/0055* (2013.01); *G02B 6/0056* (2013.01); *G02F 1/1323* (2013.01)

(58) Field of Classification Search
CPC ... G02F 1/1323; G02B 6/0038; G02B 6/0053; G02B 6/0055; G02B 6/0056
See application file for complete search history.

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

CN201980030279.9 Notification of the First Office Action dated Mar. 29, 2022.
(Continued)

*Primary Examiner* — Jong-Suk (James) Lee
*Assistant Examiner* — Christopher E Dunay
(74) *Attorney, Agent, or Firm* — Penny L. Lowry

(57) ABSTRACT

A switchable directional backlight for a privacy display comprises a waveguide with first and second opposing input ends and a turning film arranged to collect light output from the waveguide for input into a spatial light modulator. The waveguide has an array of light deflecting features arranged on one guiding surface and an opposing planar surface. Light deflecting features are arranged such that light input from the first input end is output with a narrow angular range and light input from the second input end is output with a wide angular range.

23 Claims, 40 Drawing Sheets

Related U.S. Application Data continuation of application No. 16/361,963, filed on Mar. 22, 2019, now Pat. No. 10,935,714.

(60) Provisional application No. 62/731,345, filed on Sep. 14, 2018, provisional application No. 62/646,550, filed on Mar. 22, 2018.

(56) References Cited

U.S. PATENT DOCUMENTS

| | | |
|---|---|---|
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 10,054,732 B2 | 8/2018 | Robinson et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,935,714 B2 | 3/2021 | Woodgate et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,099,448 B2 | 8/2021 | Woodgate et al. |
| 11,237,417 B2 | 2/2022 | Woodgate et al. |
| 11,442,316 B2 | 9/2022 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1* | 9/2007 | Liao .................. G02B 6/0061 |
| | | 362/615 |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |

(56) References Cited

U.S. PATENT DOCUMENTS

| | | |
|---|---|---|
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Mnther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1* | 9/2014 | Johnson ............... G02B 5/0278 362/330 |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0055366 A1* | 2/2015 | Chang ................. G02B 6/0061 362/606 |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1* | 7/2015 | Chang ................. G02B 6/0063 362/619 |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1* | 7/2017 | Hirayama ............ G02B 6/0055 |
| 2017/0236494 A1 | 8/2017 | Sommerlade et al. |
| 2017/0269283 A1 | 9/2017 | Wang et al. |
| 2017/0269283 A1* | 9/2017 | Hirayama ............ G02B 6/0055 |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |

(56) References Cited

U.S. PATENT DOCUMENTS

| | | |
|---|---|---|
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0041839 A1 | 2/2020 | Robinson et al. |
| 2020/0159055 A1 | 5/2020 | Robinson et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |

FOREIGN PATENT DOCUMENTS

| | | |
|---|---|---|
| CN | 1776484 A | 5/2006 |
| CN | 101042449 A | 9/2007 |
| CN | 101256251 A | 9/2008 |
| CN | 101518095 A | 8/2009 |
| CN | 101681061 A | 3/2010 |
| CN | 103473494 A | 12/2013 |
| CN | 104133292 A | 11/2014 |
| CN | 104303085 A | 1/2015 |
| CN | 104321686 A | 1/2015 |
| CN | 104380177 A | 2/2015 |
| CN | 204740413 U | 11/2015 |
| CN | 106104372 A | 11/2016 |
| CN | 106415342 A | 2/2017 |
| CN | 209171779 U | 7/2019 |
| EP | 2037318 A1 | 3/2009 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | H01130783 U | 9/1989 |
| JP | H11174489 A | 7/1999 |
| JP | 2005316470 A | 11/2005 |
| JP | 2006139160 A | 6/2006 |
| JP | 2007148279 A | 6/2007 |
| JP | 2007273288 A | 10/2007 |
| JP | 2014099363 A | 5/2014 |
| KR | 20120011228 A | 2/2012 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2008001896 A1 | 1/2008 |
| WO | 2009008406 A1 | 1/2009 |
| WO | 2010021926 A2 | 2/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017117570 A1 | 7/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

EP-19825448.4 Extended European Search Report of European Patent Office dated Mar. 10, 2022.

EP-19881483.2 Extended European Search Report of European Patent Office dated Aug. 5, 2022.

JP2019-561773 Non-Final Notice of Reasons for Rejection dated Mar. 22, 2022.

JP2020-509511 Non-Final Notice of Reasons for Rejection dated Jul. 19, 2022.

Nelkon et al., "Advanced Level Physics", Third edition with SI units, Heinemann Educational Books LTD, London, 1970.

TW107132221 First Office Action dated Apr. 28, 2022.

PCT/US2021/043444 International search report and written opinion of the international searching authority dated Nov. 1, 2021.

Robson, et al. "Spatial and temporal contrast-sensitivity functions of the visual system", J. Opt. Soc. Amer., vol. 56, pp. 1141-1142 (1966).

Simonyan et al., "Very Deep Convolutional Networks For Large-Scale Image Recognition", ICLR 2015.

Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.

Adachi, et al. "P-228L: Late-News Poster: Controllable Viewing-Angle Displays using a Hybrid Aligned Nematic Liquid Crystal Cell", ISSN, SID 2006 Digest, pp. 705-708.

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

Cheng, et al., "Fast-Response Liquid Crystal Variable Optical Retarder and Multilevel Attenuator," Optical Engineering 52 (10), 107105 (Oct. 16, 2013). (Year: 2013).

CN201680061632.6 Notification of the First Office Action dated Sep. 14, 2021.

CN201780030715.3 Notification of the First Office Action dated Jan. 21, 2020.

CN201880042320.X Notification of the First Office Action dated May 25, 2021.

CN201880073578.6 Notification of the First Office Action dated Aug. 27, 2021.

CN-201980020303.0—Notification of the First Office Action dated Dec. 16, 2021.

EP-16860628.3 Extended European Search Report of European Patent Office dated Apr. 26, 2019.

EP-17799963.8 Extended European Search Report of European Patent Office dated Oct. 9, 2019.

EP-18855604.7 Extended European Search Report of European Patent Office dated Jun. 1, 2021.

EP-18857077.4 Extended European Search Report of European Patent Office dated Jun. 16, 2021.

EP-19743619.9 Extended European Search of European Patent Office dated Nov. 23, 2021.

EP-19743701.5 Extended European Search Report of European Patent Office dated Nov. 24, 2021.

EP19771688.9 Extended European Search Report of European Patent Office dated Dec. 2, 2021.

Gass, et al. "Privacy LCD Technology for Cellular Phones", Sharp Laboratories of Europe Ltd, Mobile LCD Group, Feb. 2007, pp. 45-49.

Ishikawa, T., "New Design for a Highly Collimating Turning Film", SID 06 Digest, pp. 514-517.

Kalantar, et al. "Backlight Unit With Double Surface Light Emission," J. Soc. Inf. Display, vol. 12, Issue 4, pp. 379-387 (Dec. 2004).

(56) References Cited

OTHER PUBLICATIONS

PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
PCT/US2021/043435 International search report and written opinion of the international searching authority dated Nov. 1, 2021.
EP-20754927.0 Extended European Search Report of European Patent Office dated Sep. 19, 2022.

* cited by examiner

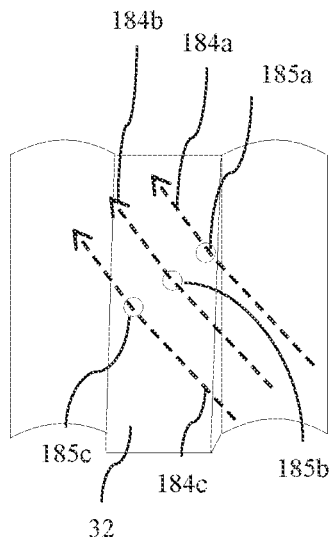
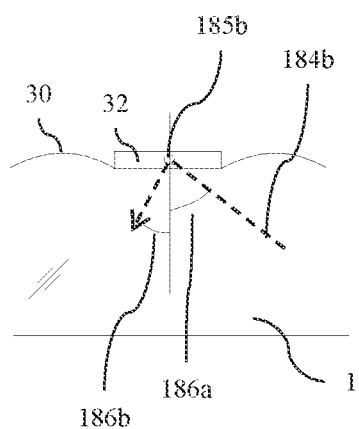
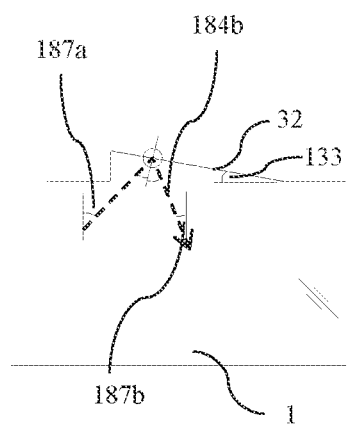
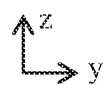
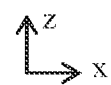
*FIG. 6D*  *FIG. 6E*  *FIG. 6F*
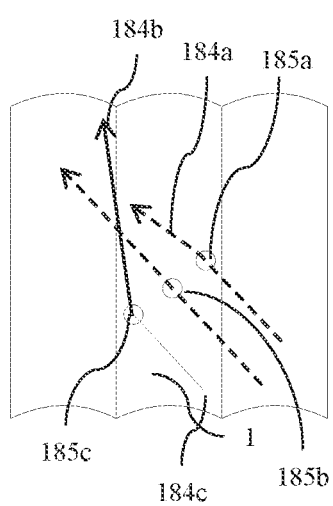
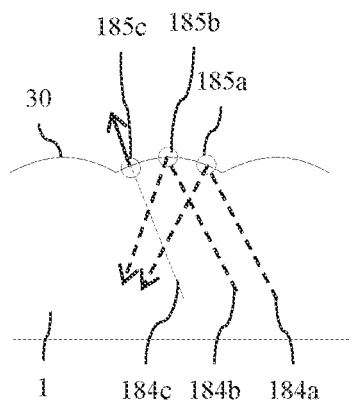
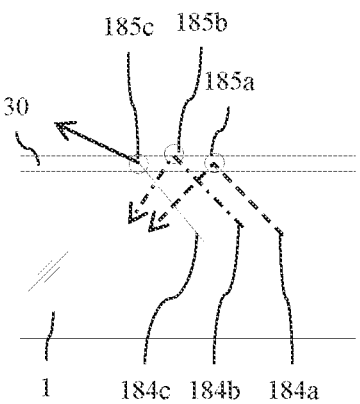
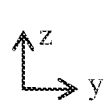
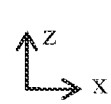
*FIG. 6G*  *FIG. 6H*  *FIG. 6I*

OPTICAL WAVEGUIDE FOR DIRECTIONAL BACKLIGHT

TECHNICAL FIELD

This disclosure generally relates to illumination from light modulation devices, and more specifically relates to optical stacks for providing control of illumination for use in display including privacy display, outdoors display, low stray light displays for night-time use and power saving displays.

BACKGROUND

Privacy displays provide image visibility to a primary user that is typically in an on-axis position and reduced visibility of image content to a snooper, that is typically in an off-axis position. A privacy function may be provided by micro-louvre optical films that transmit a high luminance from a display in an on-axis direction with low luminance in off-axis positions, however such films are not switchable, and thus the display is limited to privacy only function.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Control of off-axis privacy may further be provided by means of contrast reduction, for example by adjusting the liquid crystal bias tilt in an In-Plane-Switching LCD.

BRIEF SUMMARY

According to the present disclosure, a directional illumination apparatus may comprise an optical waveguide with a microstructured light guiding surface and a planar light guiding surface that are arranged to provide a narrow light output cone for light input at one input end. The microstructured light guiding surface is arranged such that the optical output may be switchable by means of control of first and second light sources arranged at opposing input ends of the optical waveguide. A backlight may comprise the optical waveguide, a light turning film and a rear reflector. A display may comprise the backlight and a spatial light modulator. The display may further comprise a switchable retardation optical stack comprising a switchable liquid crystal layer, compensation retarder and an absorptive polariser.

In a wide angle mode of operation, the switchable liquid crystal layer is switched to provide high transmission to ambient illumination for a wide range of polar output angles and the backlight is arranged to provide light with a wide field of view from light input at the second end. In a privacy mode of operation, the switchable liquid crystal layer is switched to provide high transmission to ambient illumination in directions observed by a primary user; and low transmission in directions observed by a snooper and the backlight is arranged to provide a narrow field of view from light input at the first end.

According to a first aspect of the present disclosure, there is provided an optical waveguide comprising: first and second opposed light guiding surfaces for guiding light along the optical waveguide by total internal reflection; and at least one light input end arranged between the first and second light guiding surfaces, wherein the light input end extends in a lateral direction, wherein the second light guiding surface comprises: (i) a plurality of non-inclined light extraction features arranged in an array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction; and (ii) a plurality of inclined light extraction features arranged in an array, each inclined light extraction feature having a surface normal direction with a tilt that has a component in the longitudinal direction, the plurality of non-inclined light extraction features and the plurality of inclined light extraction features being oriented to direct guided light through the first and second light guiding surfaces as output light.

Advantageously a single moulding surface may provide the optical structures of an optical waveguide. Light extraction may be from the optical waveguide towards a display, increasing extraction efficiency. The optical waveguide may have no optical coatings, increasing efficiency and reducing cost and complexity. A very thin waveguide may be arranged and may be formed on or in a flexible substrate to provide a flexible display.

The at least one light input end may comprise a first light input end and a second light input end facing the first light input end in the longitudinal direction. The optical output from the waveguide may be provided with first and second angular illumination profiles for light input from the first and second end respectively. The optical output of the optical waveguide may be different for light input at the first light input end and the second input end. Advantageously a switchable backlight may be provided to achieve switching between privacy and wide angle mode of a display apparatus.

The plurality of non-inclined light extraction features may comprise a lenticular surface or an elongate prismatic surface. Advantageously the features may be tooled by known tooling methods and may be formed on or in the substrate of the optical waveguide with low cost and high uniformity.

The plurality of inclined light extraction features may comprise a first plurality of inclined light extraction features, each light extraction feature of the first plurality of inclined light extraction features having a surface normal direction that has a tilt with a component in the longitudinal direction that is away from the first light input end; and a second plurality of inclined light extraction features, each light extraction feature of the second plurality of inclined light extraction features having a surface normal direction that has a tilt with a component in the longitudinal direction that is towards the first light input end. The magnitude of the component in the longitudinal direction of the tilt of the surface normal direction of the first plurality of inclined light extraction features may be different from the magnitude of the component in the longitudinal direction of the tilt of the surface normal direction of the second plurality of inclined light extraction features.

The component in the longitudinal direction of the tilt of the surface normal direction of the first plurality of inclined light extraction features may be between 0.25 degrees and 5 degrees, preferably between 0.5 degrees and 4 degrees and most preferably between 1 degree and 3 degrees. Advantageously a uniform optical output may be achieved with a narrow cone angle.

The component in the longitudinal direction of the tilt of the surface normal direction of the second plurality of inclined light extraction features may be between 80 degrees and 90 degrees, and preferably between 85 degrees and 90 degrees. Advantageously a uniform optical output may be achieved with a wide cone angle.

The inclined light extraction features may comprise planar inclined light extraction features. The planar inclined light extraction features may have surface normal directions that have no component in the lateral direction. The inclined light extraction features may comprise lenticular surfaces that are extended in the longitudinal direction. Advantageously the features may be tooled by known tooling methods and may be formed on or in the substrate of the optical waveguide with low cost and high uniformity. Further the light output cones may be arranged to provide output collimated light.

At least some of the plurality of non-inclined light extraction features may be intersected by at least one inclined light extraction feature. The plurality of non-inclined light extraction features that are intersected by at least one first inclined light extraction feature may be intersected by the at least one first inclined light extraction feature in an intersection region; and the width of the non-inclined light extraction feature in the intersection region may vary in the longitudinal direction. Advantageously the non-inclined and inclined light extraction features may be conveniently tooled on the same tool and replicated with low cost and high fidelity.

The arrays may be two-dimensional. Advantageously uniform illumination of a spatial light modulator may be provided to achieve a directional backlight.

The first light guiding surface may comprise a planar surface.

According to a second aspect of the present disclosure there is provided a backlight apparatus comprising the optical waveguide of the first aspect and at least one light source arranged to input light into the optical waveguide at the at least one input end. Advantageously a backlight with a narrow output cone angle may be provided.

At least one light source may be arranged to input light into the optical waveguide at the first input end, and at least one further light source may be arranged to input light into the optical waveguide at the second input end. Advantageously a backlight may be provided that has first and second angular output profiles when the at least one light input end comprises a first light input end and a second light input end facing the first light input end in the longitudinal direction.

The backlight apparatus may further comprise a control system arranged to control the luminous flux from the first and second light sources. Advantageously the output field of view of the backlight may be controlled. The backlight may switch between a narrow angle profile, a wide angle profile and intermediate profiles that are the combination of narrow and wide angle profiles.

The backlight apparatus may further comprise a light turning film comprising an array of prismatic elements that are elongate in the lateral direction. Advantageously at least some of the output of the display may be towards the normal direction of a display. At least some of the light may be directed to an on-axis observer.

The second surface of the optical waveguide may be arranged between the first surface of the optical waveguide and the light turning film; and the light turning film may be arranged to receive light transmitted through the second surface of the optical waveguide. Advantageously efficiency of light output may be increased in comparison to arrangements in which a rear reflector receives light transmitted through the second surface of the optical waveguide.

The prismatic elements of the array of prismatic elements may each comprise opposing first and second prismatic faces wherein: each first prismatic face has a surface normal direction that has a component that is inclined in the longitudinal direction towards the first input end; and each second prismatic face has a surface normal direction that has a component that is inclined in the longitudinal direction away from the first input end. Advantageously the size of the output cone angle may be increased.

Each first prismatic face comprises a planar surface and each second prismatic face comprises an undulating surface; wherein when light is input into the first input end of the optical waveguide, output light from the optical waveguide is refracted by the second prismatic facet and is reflected by the first prismatic face; and when light is input into the second input end of the optical waveguide, output light from the optical waveguide is refracted by the first prismatic facet and is reflected by the second prismatic face.

Advantageously the light cone for light from the first light source may have small diffusion and the light cone for light from the second light source may have a larger diffusion. The wide angle mode light cone may be increased in size, whereas the narrow cone angle profile may have similar size. Advantageously wide angle visibility is increased, and privacy visibility is not significantly degraded.

The backlight apparatus may further comprise a rear reflector facing the first light guiding surface that is arranged to reflect light transmitted through the first surface of the optical waveguide. Advantageously light output efficiency may be increased.

According to a third aspect of the present disclosure there is provided a display apparatus comprising the backlight apparatus of the second aspect and further comprising a spatial light modulator arranged to receive light from the light turning film. Advantageously a display may be provided with high efficiency of optical output for an on-axis observer.

The display apparatus may comprise at least one display polariser arranged on a side of the spatial light modulator; an additional polariser arranged on the same side of the spatial light modulator as the display polariser; and a switchable liquid crystal retarder comprising a layer of liquid crystal material arranged between the display polariser and the additional polariser. When a light source is arranged to input light into the optical waveguide at the first input end, a first voltage may be applied across the switchable liquid crystal retarder and when a light source is arranged to input light into the optical waveguide at the second input end, a second voltage different to the first voltage may be applied across the switchable liquid crystal retarder.

Advantageously the off-axis luminance for a snooper may be reduced and privacy mode performance enhanced. The on-axis efficiency may be substantially unchanged. Further the wide angle mode performance will be increased.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 6D is a schematic diagram illustrating in top view operation of an inclined planar feature for off-axis illumination;

FIG. 6E is a schematic diagram illustrating in end view operation of an inclined planar feature for off-axis illumination;

FIG. 6F is a schematic diagram illustrating in side view operation of an inclined planar feature for off-axis illumination;

FIG. 6G is a schematic diagram illustrating in top view operation of a non-inclined lenticular structure for off-axis illumination after incidence with an inclined planar feature;

FIG. 6H is a schematic diagram illustrating in end view operation of a non-inclined lenticular structure for off-axis illumination after incidence with an inclined planar feature;

FIG. 6I is a schematic diagram illustrating in side view operation of a non-inclined lenticular structure for off-axis illumination after incidence with an inclined planar feature;

DETAILED DESCRIPTION

Figure 1:
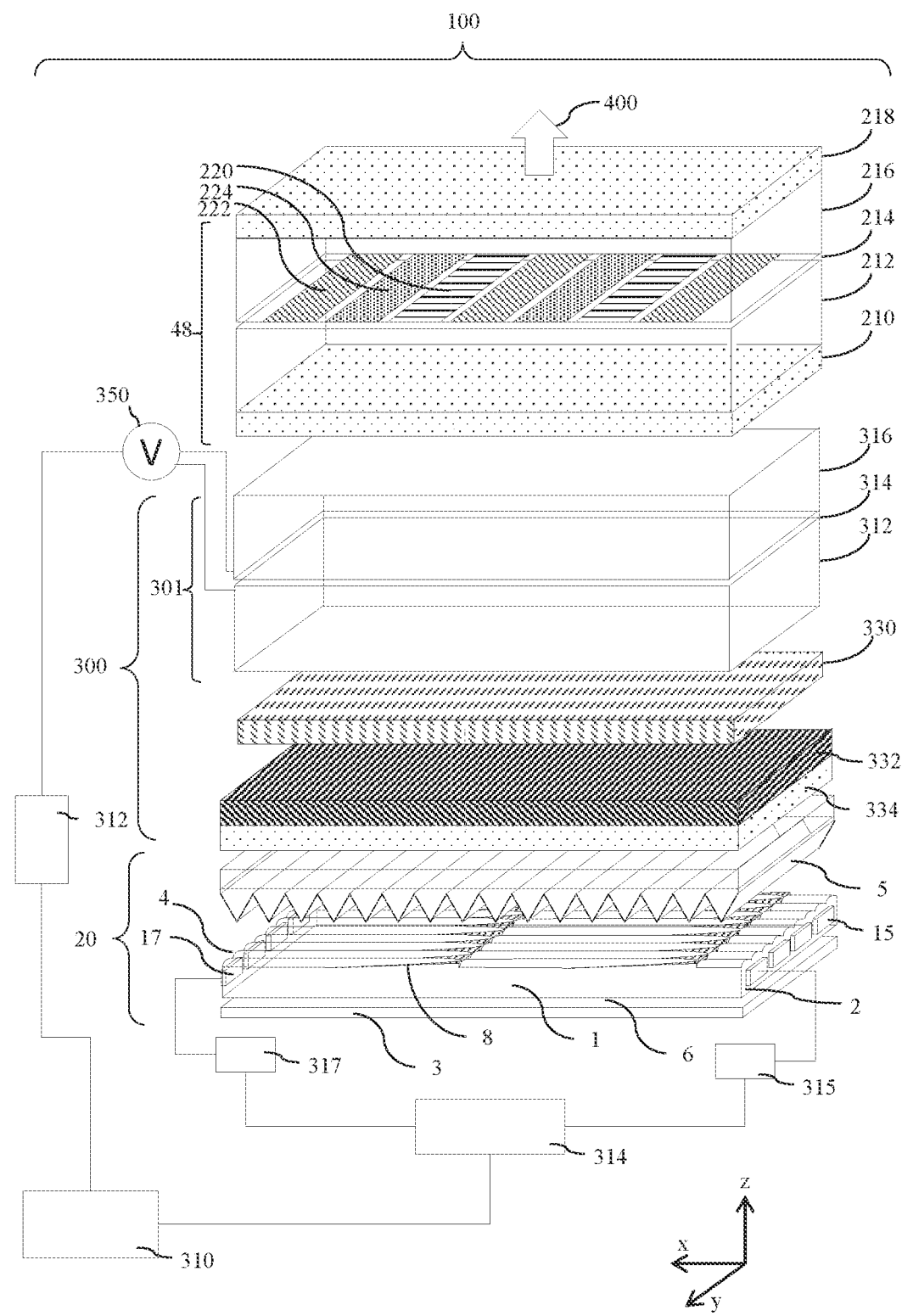
FIG. 1 is a schematic diagram illustrating in side perspective view an optical stack of a switchable privacy display device comprising a switchable backlight arranged to illuminate a spatial light modulator.

It would be desirable to provide a collimated backlight that provides a relatively narrow output cone angle for a display apparatus. In the present disclosure, collimated is used as an accepted term for narrow angle illumination from a display and/or backlight, for example full width half maximum (FWHM) luminance cone angles of less than 40 degrees, and typically less than 30 degrees.

In comparison to conventional wide angle backlights, collimated backlights can provide high efficiency light output for head-on observers, achieving increased luminance for a given power consumption or reduced power consumption for a given luminance. Collimated backlights can also provide low off-axis image visibility for privacy display. It would further be desirable to provide a switchable collimated backlight to provide a narrow angle output in a first mode of operation and a wide angle output in a second mode of operation. In operation, narrow angle output may be provided for a single head-on user, while wide angle output may be provided for multiple display users.

The structure and operation of various switchable display devices will now be described. In this description, common elements have common reference numerals. It is noted that the disclosure relating to any element applies to each device in which the same or corresponding element is provided. Accordingly, for brevity such disclosure is not repeated.

FIG. 1 is a schematic diagram illustrating in side perspective view an optical stack of a switchable privacy display 100 comprising a switchable backlight 20 arranged to illuminate a switchable liquid crystal retarder 300 and a spatial light modulator 48.

An optical waveguide 1 comprises first and second opposed light guiding surfaces 6, 8 for guiding light along the optical waveguide 1 by total internal reflection. At least one light input end 2 is arranged between the first and second light guiding surfaces 6, 8, wherein the light input end 2 extends in a lateral direction (y-axis direction).

Backlight 20 comprises the optical waveguide 1, rear reflector 3 and light turning film 5. The second surface 8 of the optical waveguide 1 is arranged between the first surface 6 of the optical waveguide and the light turning film 5; and the light turning film 5 is arranged to receive light transmitted through the second surface 8 of the optical waveguide 1.

Backlight 20 further comprises light source 15 arranged to input light into the optical waveguide 1 at the first input end 2. Light source 15 may comprise an array of light sources such as white light emitting diodes (LEDs), the array of LEDs extending in the lateral direction. At least one further light source 17 that may be a further array of LEDs is arranged to input light into the optical waveguide 1 at the second input end 4.

A control system comprising display controller 310, backlight controller 314, first light source 15 driver 315 and second light source 17 driver 317 may be arranged to control the luminous flux from the first and second light sources 15, 17.

Display apparatus 100 comprises the backlight 20, switchable liquid crystal retarder stack 300 and spatial light modulator 48 to output light 400.

Spatial light modulator comprises input polariser 210; TFT substrate 212; liquid crystal layer 214 that is pixelated with typically red pixels 220, green pixels 222 and blue pixels 224; color filter substrate 216 and output polariser 218.

Switchable liquid crystal retarder stack 300 is arranged in series with the backlight 20 and spatial light modulator 48. Stack 300 comprises a switchable liquid crystal retarder 301 that comprises substrates 312, 316 with transparent electrodes and alignment layers to provide controllable alignment of a liquid crystal layer 314. Stack 300 further comprises an additional polariser 332 and compensation retarder 330, and various embodiments are described in U.S. Pat. No. 10,126,575 and in U.S. Patent Publ. No. 2019-0086706, both of which are herein incorporated by reference in their entireties.

Switchable liquid crystal retarder stack 300 and spatial light modulator 48 are arranged to receive light transmitted by the light turning film 5. Diffuser 334 may be arranged to provide modification of output cone angle and further to minimise Moiré and mura artefacts.

The control system may further comprise switchable liquid crystal retarder stack 300 controller 312 and liquid crystal cell driver 315 to control the voltage across the liquid crystal retarder 301. Controller 312 is arranged to address voltage driver 350 such that the switchable liquid crystal retarder 301 is driven in a first alignment state when the display operates in a wide angle mode, and in a second alignment state when the display operates in a narrow angle privacy mode.

The structure of optical waveguide 1 will now be further described.

Figure 2:
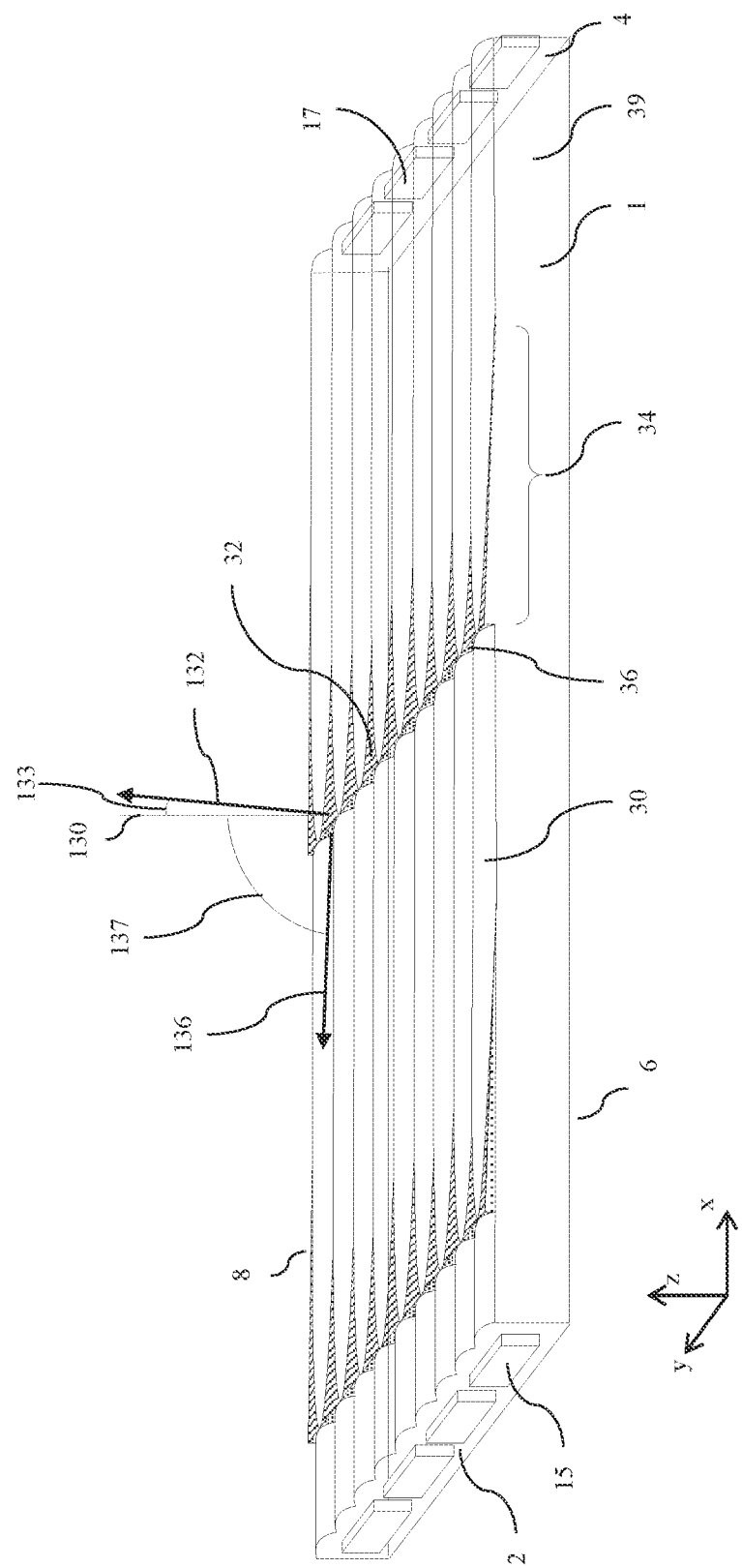
FIG. 2 is a schematic diagram illustrating in side perspective view an optical waveguide comprising a non-inclined lenticular surface and inclined planar surfaces.
Figure 3A:
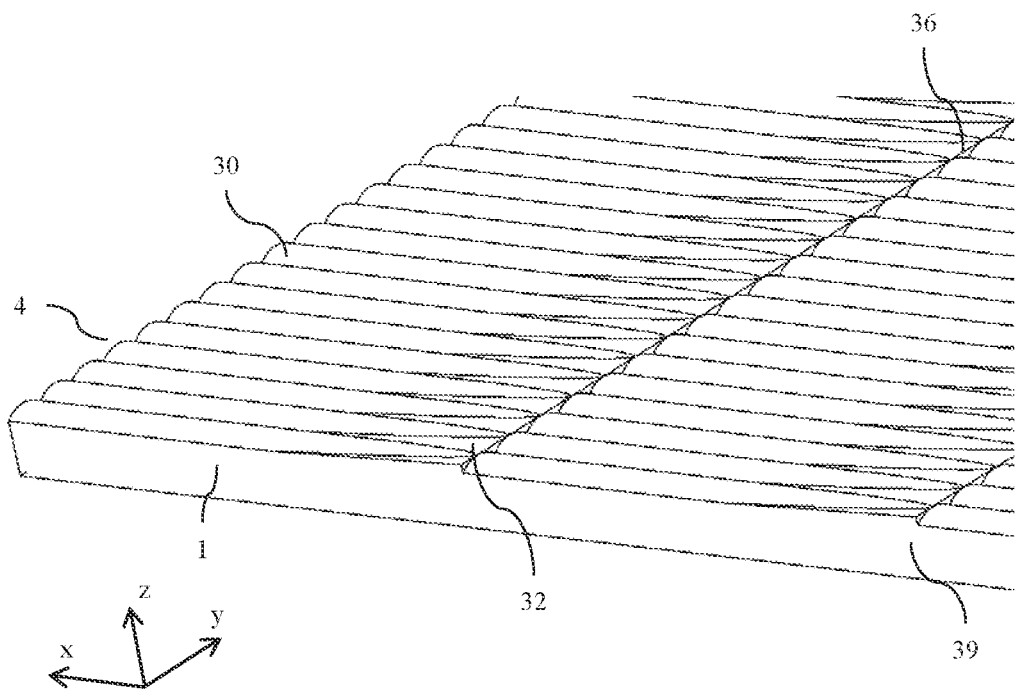
FIG. 3A and FIG. 3B are schematic diagrams illustrating in perspective views an optical waveguide comprising a non-inclined lenticular surface and inclined planar surfaces.
Figure 3B:
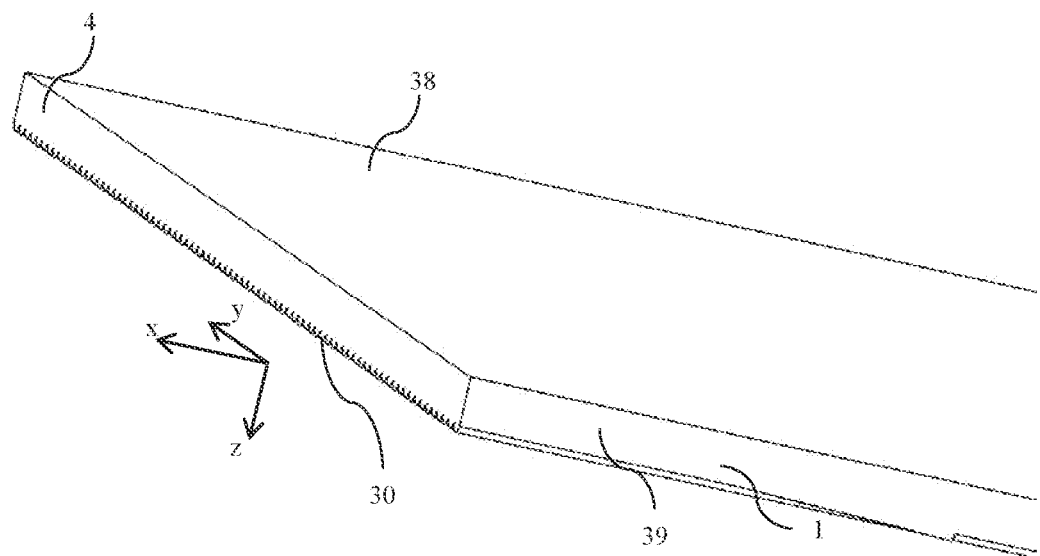

FIG. 2 is a schematic diagram illustrating in side perspective view an optical waveguide 1 comprising a non-inclined lenticular surface 30 and inclined planar surfaces 32, 36; and FIGS. 3A-3B are schematic diagrams illustrating in perspective views an optical waveguide 1 comprising a non-inclined lenticular surface 30 and inclined planar surfaces 32, 36.

The at least one light input end of the optical waveguide 1 comprises a first light input end 2 and a second light input end 4 facing the first light input end 2.

The first light guiding surface 6 of the optical waveguide 1 comprises a planar surface.

The second light guiding surface 8 comprises (i) a plurality of non-inclined light extraction features comprising the lenticular surfaces 30; and (ii) a plurality of inclined light extraction features comprising the inclined planar surfaces 32, 36 arranged in an array. In the present embodiments, the plurality of non-inclined light extraction features comprise the lenticular surfaces 30, each comprising a curved surface that is extended in the longitudinal (parallel to x-axis) direction.

The structure of the second light guiding surface 8 will now be described in further detail.

Figure 4A:
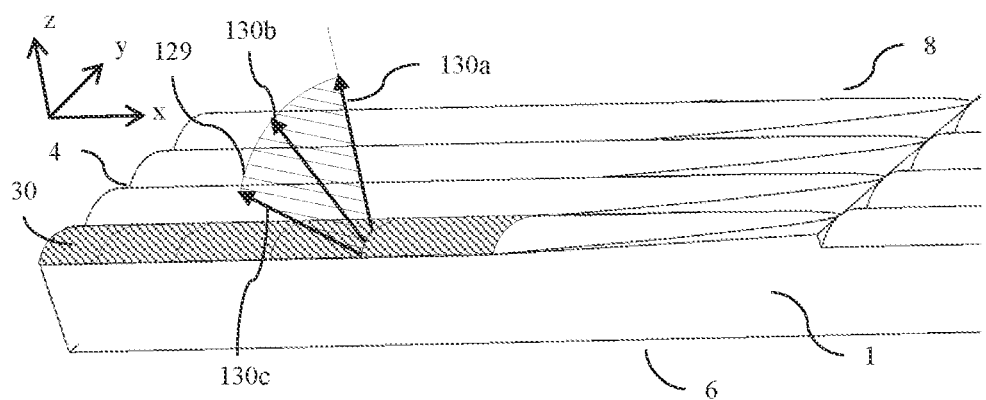
FIG. 4A is a schematic diagram illustrating in side perspective view a non-inclined lenticular surface of an optical waveguide not in an intersection region.

FIG. 4A is a schematic diagram illustrating in side perspective view a non-inclined lenticular surface 30 of an optical waveguide not in an intersection region 34.

The second light guiding surface 8 comprises a plurality of non-inclined light extraction features formed by lenticular surfaces 30 arranged in an array, each non-inclined light extraction feature 30 being elongate and extending in a longitudinal direction (parallel to the x-axis direction). Each non-inclined light extraction feature 30 comprises surface normal directions 130a, 130b, 130c that vary in a plane 129 orthogonal to the longitudinal direction and that have no component of tilt in the longitudinal direction.

Figure 4B:
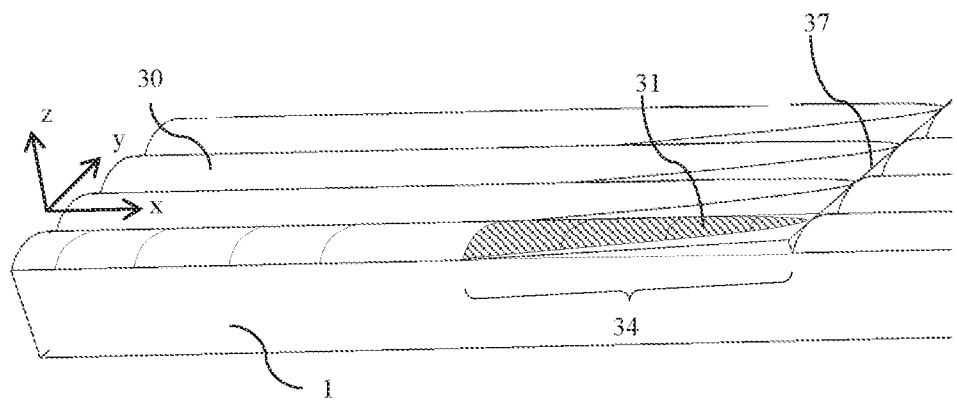
FIG. 4B is a schematic diagram illustrating in side perspective view a non-inclined lenticular surface of an optical waveguide in an intersection region.

FIG. 4B is a schematic diagram illustrating in side perspective view a non-inclined lenticular surface 30 of an optical waveguide in an intersection region 34.

The plurality of non-inclined lenticular surfaces 30 are intersected by inclined planar surfaces 32, 36 in an intersection region 34, and the width of the non-inclined light extraction feature 31 in the intersection region 34 varies in the longitudinal direction. In other words, in the present embodiment, each lenticular surface 30 is bisected by the plane of the inclined planar surfaces 32, 36 adjacent thereto such that its width reduces towards a cusp 37 between the planar surfaces 32, 36.

Figure 4C:
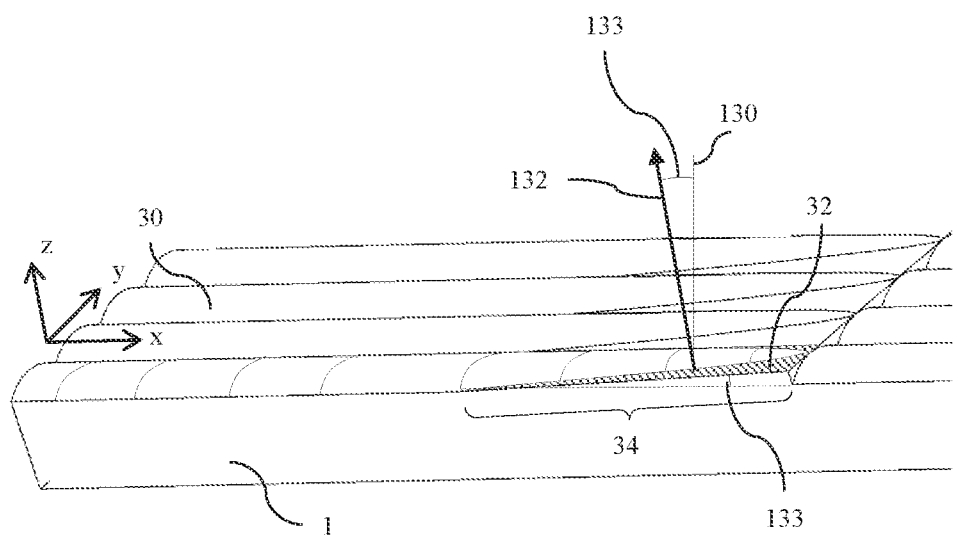
FIG. 4C is a schematic diagram illustrating in side perspective view a first inclined planar region of an optical waveguide in the intersection region.

FIG. 4C is a schematic diagram illustrating in side perspective view a first inclined planar region 32 of an optical waveguide 1 in the intersection region 34.

The second light guiding surface 8 further comprises a plurality of inclined planar surfaces 32 arranged in an array, each inclined planar surface 32 comprising at least one surface normal direction 132 with a tilt with tilt angle 133 with respect to the display normal direction 130 that has a component in the longitudinal direction.

The plurality of inclined light extraction features comprises a first plurality of inclined planar surfaces 32 shown shaded in FIG. 4C. Each planar surface 32 of the first plurality of inclined planar surfaces 32 has a surface normal 132 that has a tilt angle 133 wherein the tilt of the surface normal 132 has a component in the longitudinal direction (parallel to x-axis) that is away from the first light input end 2.

The plurality of inclined light extraction features also comprises a second plurality of inclined light extraction planar surfaces 36 shown shaded in FIG. 4E that is discussed further below. Each planar surface 36 has a surface normal direction 136 that has a tilt angle 137 wherein the tilt of the surface normal 137 has a component in the longitudinal direction that is towards the first light input end 2.

The inclined planar surfaces 32, 36 are planar inclined light extraction features. The planar surfaces 32, 36 may also have surface normal directions that have no component in the lateral direction, that is the surface normals 132, 136 may be arranged in the x-z plane.

Figure 4D:
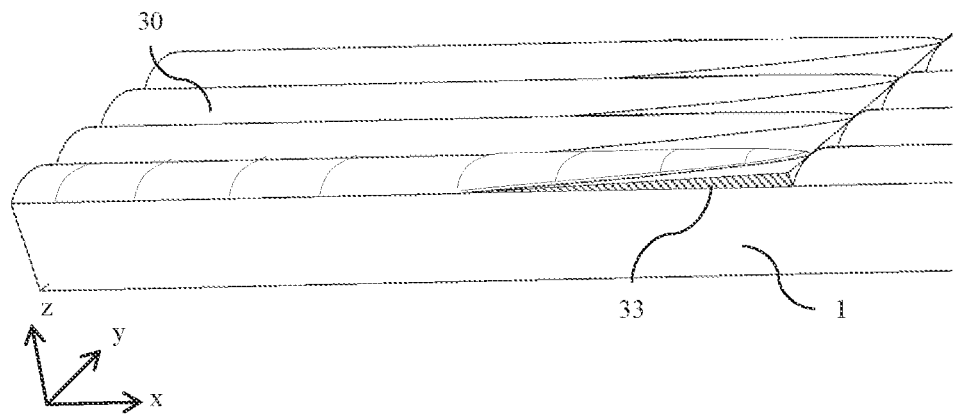
FIG. 4D is a schematic diagram illustrating in side perspective view the tilted cross sectional profile of the first inclined planar region of an optical waveguide in the intersection region.

FIG. 4D is a schematic diagram illustrating in side perspective view the tilted cross sectional profile 33 of the first inclined planar region of an optical waveguide in the intersection region. The cross sectional profile 33 may comprise a triangular region for example. Advantageously such a structure may be conveniently tooled as will be described below.

Figure 4E:
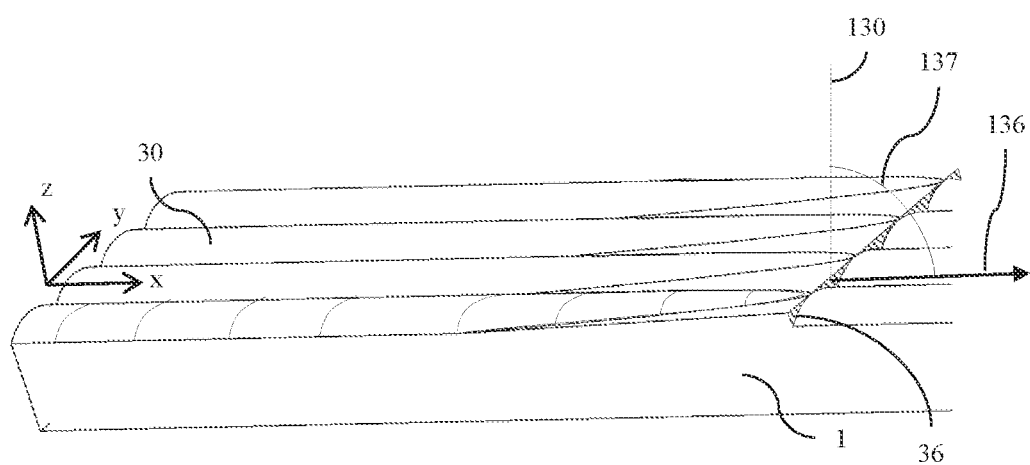
FIG. 4E is a schematic diagram illustrating in side perspective view a second inclined planar region of an optical waveguide in an intersection region.
Figure 4F:
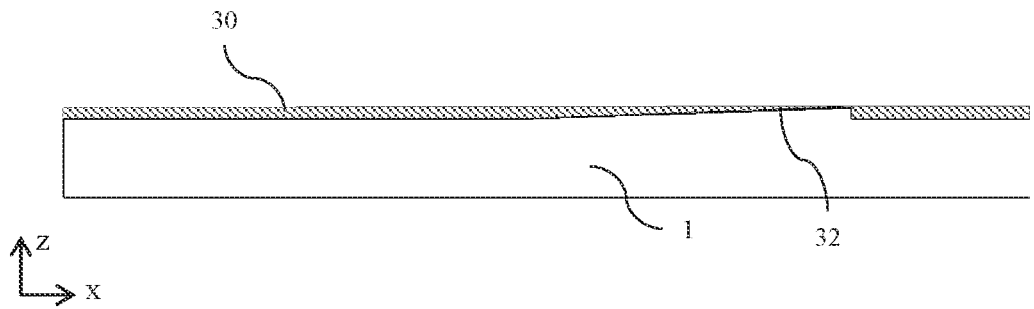
FIG. 4F is a schematic diagram illustrating in side view a non-inclined lenticular surface of an optical waveguide.
Figure 4G:
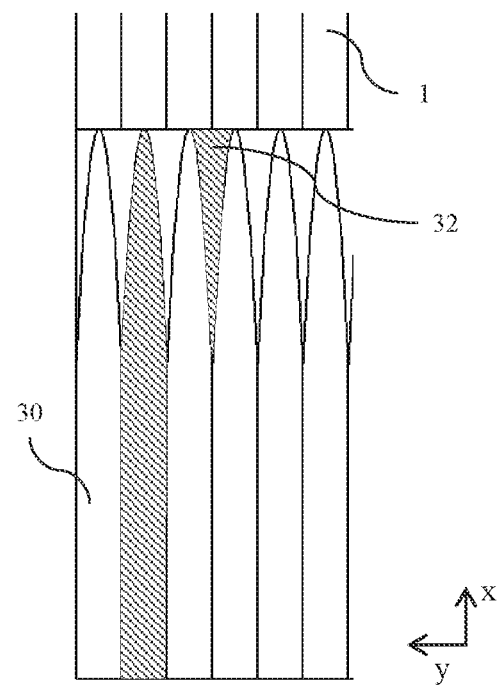
FIG. 4G is a schematic diagram illustrating in top view a non-inclined lenticular surface of an optical waveguide and a first inclined planar region of an optical waveguide in the intersection region.

FIG. 4E is a schematic diagram illustrating in side perspective view a second inclined planar surface 36 of the optical waveguide 1 in the intersection region 34; FIG. 4F is a schematic diagram illustrating in side view a non-inclined lenticular surface 30 of an optical waveguide 1; and FIG. 4G is a schematic diagram illustrating in top view a non-inclined lenticular surface 30 of an optical waveguide and a first inclined planar region of an optical waveguide in the intersection region. Features of the arrangements of FIGS. 2-4G not discussed in further detail may be assumed to correspond to the features with equivalent reference numerals as discussed above, including any potential variations in the features.

In an illustrative embodiment, the tilt angle 133 may be 2 degrees and the tilt angle 137 may be 88 degrees. More generally in an optical waveguide 1 of the type illustrated in FIG. 2, the tilt angle 133 in the longitudinal direction of the first plurality of inclined planar surfaces 32 may be between 0.25 degrees and 5 degrees, preferably between 0.5 degrees and 4 degrees and most preferably between 1 degree and 3 degrees; and the tilt angle 137 in the longitudinal direction of the second plurality of inclined planar surfaces 36 may be between 80 degrees and 90 degrees, and preferably between 85 degrees and 90 degrees.

At least some of the plurality of non-inclined lenticular surfaces 30 are intersected in intersection region 34 by at least one inclined planar surfaces 32, 36. FIGS. 14A-G hereinbelow illustrate a cutting method for a tool to provide the surface 8 of the optical waveguide 1. During such tooling process, the planar surfaces 32, 36 may be cut through the lenticular surface 30, or the planar surfaces 32, 36 may be cut through by the lenticular surface. The intersection regions 34 are provided by the respective cut intersections.

In the present embodiments the arrays are two-dimensional. Illumination may be provided over a large area for an LCD backlight, advantageously achieving high uniformity.

The operation of the light extraction features will now be described further for light input from the first input end 2.

Figure 5A:
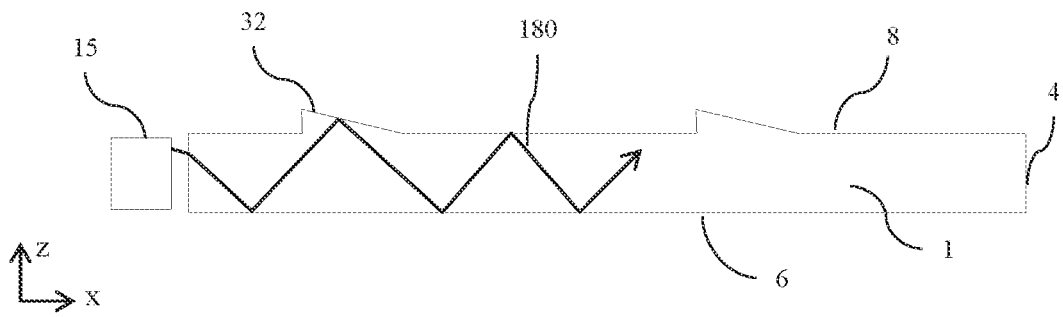
FIG. 5A is a schematic diagram illustrating in side view operation of a first inclined planar region of an optical waveguide comprising a planar non-inclined region for on-axis illumination.

FIG. 5A is a schematic diagram illustrating in side view operation of a first inclined planar surface 32 of an optical waveguide 1 for on-axis illumination. Light ray 180 propagates by guiding between surfaces 6 and 8. Light ray 180 has angle of incidence at surface 6, 8 gradually reduced by the tapering of the planar surfaces 32 given by the tilt angle 133. Light rays that are at smaller angles of incidence than the critical angle in the material of the optical waveguide 1 are extracted at angles close to grazing the first or second guiding surfaces 6, 8. In operation the tilt angle 133 of the planar surfaces 32 is arranged to not provide alone sufficient light leakage from the optical waveguide 1; that is insufficient leakage would be present if the non-inclined lenticular surface 30 were not present.

Figure 5B:
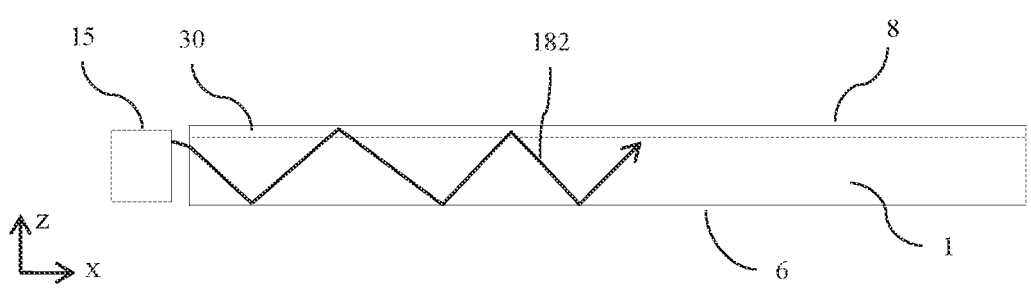
FIG. 5B is a schematic diagram illustrating in side view operation of a non-inclined lenticular structure for on-axis illumination.

FIG. 5B is a schematic diagram illustrating in side view operation of a non-inclined lenticular structure for on-axis illumination. At each reflection at the non-inclined lenticular surface 30, a deflection of the light ray 182 is provided that is out of plane of the paper in FIG. 5B. The resultant ray thus sees a taper effect due to the inclined surface of the lenticular surface 30. Some reflections increase the angle of incidence while other reflections reduce the angle of incidence. In operation the net ray angle of incidence change is small and does not provide sufficient light leakage from the optical waveguide 1; that is insufficient leakage would be present if the planar surfaces 32 were not present.

The directionality of light extraction from the lenticular surface 30 will now be further described for light rays incident at different positions across the lenticular surface 30 for light that has not undergone reflections at the planar surface 32.

Figures 6A, 6B, 6C:
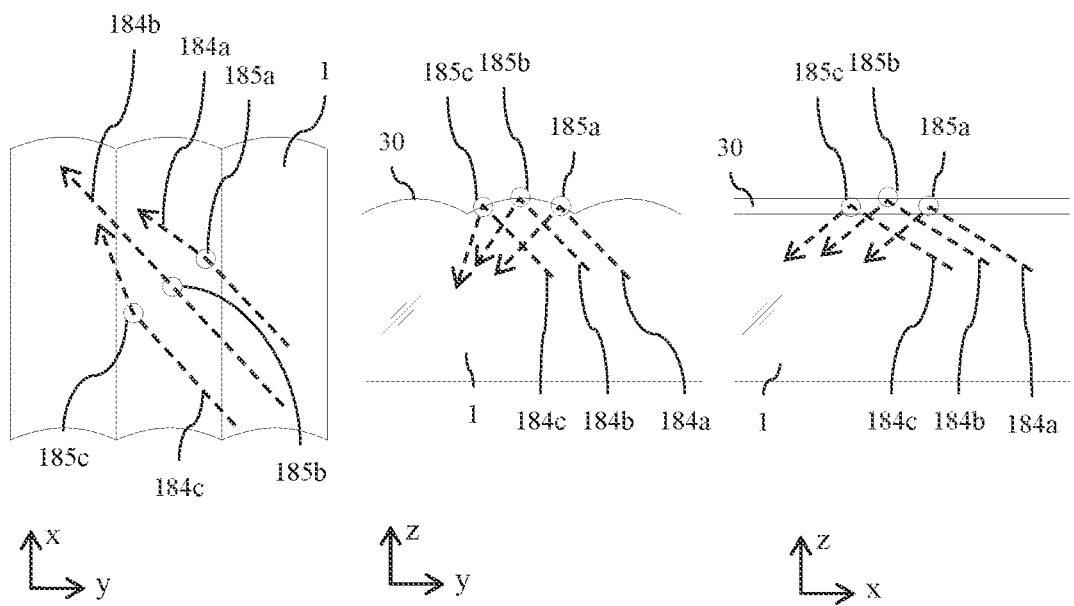
FIG. 6A is a schematic diagram illustrating in top view operation of a non-inclined lenticular structure for off-axis illumination.
FIG. 6B is a schematic diagram illustrating in end view operation of a non-inclined lenticular structure for off-axis illumination.
FIG. 6C is a schematic diagram illustrating in side view operation of a non-inclined lenticular structure for off-axis illumination.

FIG. 6A is a schematic diagram illustrating in top view operation of a non-inclined lenticular structure for off-axis illumination; FIG. 6B is a schematic diagram illustrating in end view operation of a non-inclined lenticular structure for off-axis illumination; and FIG. 6C is a schematic diagram illustrating in side view operation of a non-inclined lenticular structure for off-axis illumination.

Rays 184a, 184b, 184c have locations of incidence 185a, 185b, 185c respectively at the lenticular surface 30. In top view the rays 184a, 184c are deflected by the inclined lenticular surface 30. In end view, the angle of reflection varies across the surface 30 while in side view the angle of reflection is unmodified. For each reflection, the ray angles are sufficiently above the critical angle that no light is extracted.

FIG. 6D is a schematic diagram illustrating in top view operation of an inclined planar feature for off-axis illumination; FIG. 6E is a schematic diagram illustrating in end view operation of an inclined planar feature for off-axis illumination; and FIG. 6F is a schematic diagram illustrating in side view operation of an inclined planar feature for off-axis illumination.

Rays 184a, 184b, 184c have locations of incidence 185a, 185b, 185c respectively at the planar surface 32. In top view and end view the rays 184a, 184b, 184c are slightly deflected by the inclined planar surface 32. In side view the dominant effect of the planar surface 32 can be visualised, the angle 187b being smaller than the angle 187a. Thus the tilt angle 133 of the planar surface 32 directs light rays 184b closer to the critical angle.

The combined effect of the planar surfaces 32 and non-inclined lenticular surfaces 30 will now be described.

FIG. 6G is a schematic diagram illustrating in top view operation of a non-inclined lenticular structure for off-axis illumination after incidence with an inclined planar surface 32; FIG. 6H is a schematic diagram illustrating in end view operation of a non-inclined lenticular structure for off-axis illumination after incidence with an inclined planar surface 32; and FIG. 6I is a schematic diagram illustrating in side view operation of a non-inclined lenticular structure for off-axis illumination after incidence with an inclined planar surface 32.

In comparison to the arrangement of FIGS. 6A-6C, the light rays 184a-c have angles of incidence that have been reduced after reflection at planar surface 32. Light rays 184a, 184b still remain above the critical angle of incidence when incident on the lenticular surface 30. However, light ray 184c is incident at an angle below the critical angle and is extracted. The direction of extraction is inclined towards the longitudinal direction in comparison to the incident ray angle, as illustrated in FIG. 6G. In this manner, the planar surfaces 32 and lenticular surface 30 cooperate to extract light in directions close to the longitudinal direction.

Figure 7:
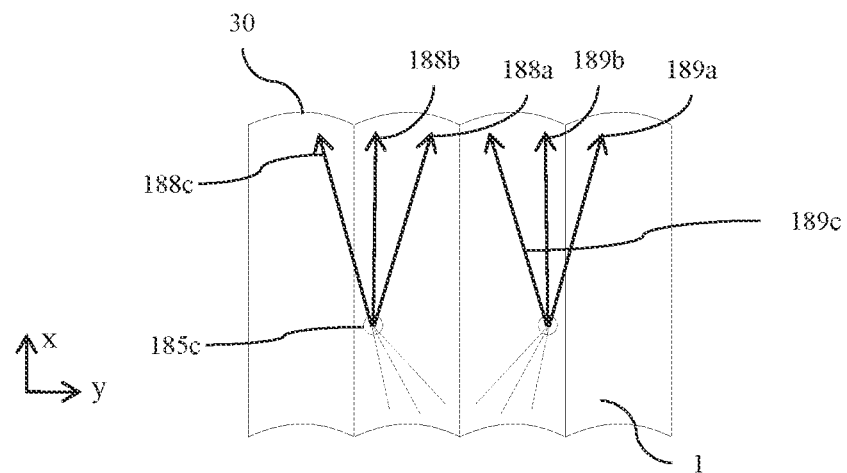
FIG. 7 is a schematic diagram illustrating in top view output of an optical waveguide.

FIG. 7 is a schematic diagram illustrating in top view output of an optical waveguide. Thus light cones comprising rays 188a, 188b, 188c are preferentially output from the lenticular surface 30, arising for light travelling towards an inclined surface. Thus reflected ray bundles 189a-c are also provided from the oppositely tilted lenticular surface.

Features of the arrangements of FIGS. 5A-7 not discussed in further detail may be assumed to correspond to the features with equivalent reference numerals as discussed above, including any potential variations in the features.

Figure 8A:
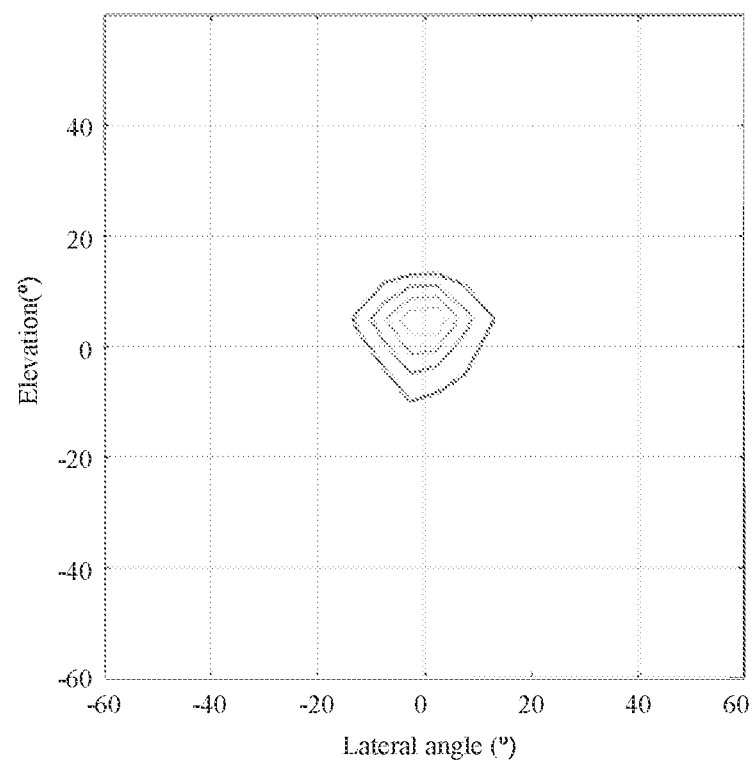
FIG. 8A is a schematic graph illustrating an iso-luminance field-of-view polar plot for the arrangement of FIG. 7 after incidence on a light turning film.
Figure 8B:
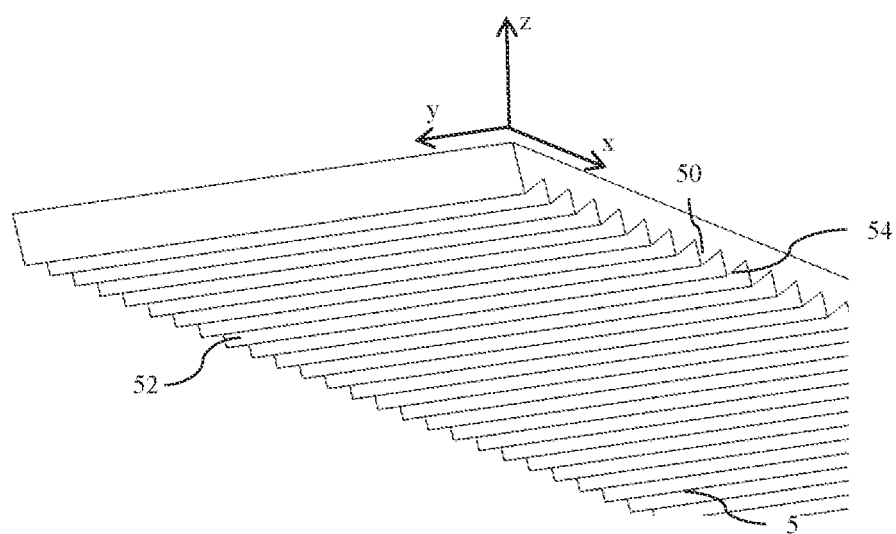
FIG. 8B is a schematic diagram illustrating in perspective view a light turning film comprising planar opposing faces.

FIG. 8A is a schematic graph illustrating simulated iso-luminance field-of-view polar plot for the arrangement of FIG. 7 after incidence onto a turning film 5 as illustrated in FIG. 8B which is a schematic diagram illustrating in perspective view a light turning film comprising planar opposing faces 52, 54 of elongate prismatic elements 50. The profile is illustrated for a device arranged with input LEDs 15 arranged along a lower side of the waveguide 1 such that the direction parallel to the x-axis represents the elevation and the orthogonal direction represents the lateral direction for a viewer.

The field-of-view plots of the present disclosure illustrate the variation of output luminance for longitudinal viewing angle against lateral viewing angle. In the present illustrative embodiments, the source 15 may be arranged at the lower edge of the display 100 and the source 17 is arranged at the upper edge of the display 100. In this arrangement, the horizontal viewing angle direction is in the lateral direction (parallel to x-axis) and the vertical viewing angle direction is the longitudinal direction (parallel to y-axis).

In the longitudinal direction the light ray distribution is provided by light at near grazing angles of incidence onto the light guiding surface 8 and thus has a restricted cone angle. In the lateral viewing angle direction, the output luminance profile is determined by the distribution of rays from the lenticular surface 30 as shown in FIG. 7.

Advantageously a very narrow cone angle may be provided. Such an illumination profile may be used for high efficiency output to reduce power consumption or to increase output luminance for a given input power consumption. Further such a luminance profile may be used for privacy display as will be described further hereinbelow.

It would be desirable to provide a wider angular profile of output than that provided in FIG. 8A.

Figures 9A, 9B, 9C:
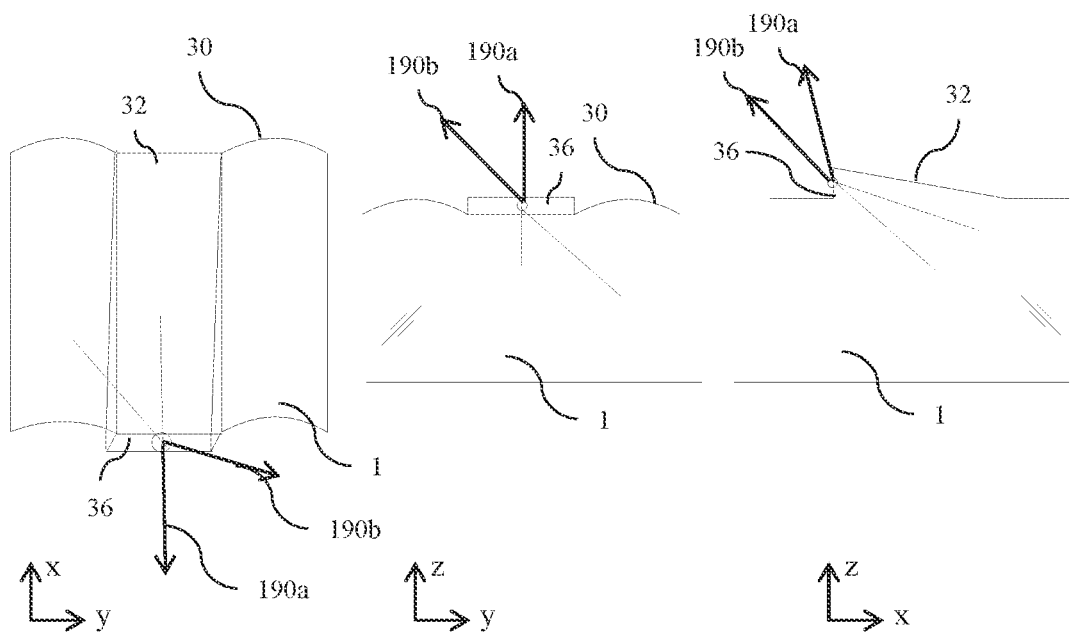
FIG. 9A is a schematic diagram illustrating in top view operation of an inclined planar feature for light from the second input end.
FIG. 9B is a schematic diagram illustrating in end view operation of an inclined planar feature for light from the second input end.
FIG. 9C is a schematic diagram illustrating in side view operation of an inclined planar feature for light from the second input end.

FIG. 9A is a schematic diagram illustrating in top view operation of an inclined planar surface 36 for light from the second input end; FIG. 9B is a schematic diagram illustrating in end view operation of an inclined planar feature for light from the second input end; and FIG. 9C is a schematic diagram illustrating in side view operation of an inclined planar feature for light from the second input end.

In comparison to FIG. 7, light rays 190a, 190b incident on the planar surface 36 are directed with a wide angular spread by refraction at the interface. As will be shown further such an output provides a wide spread of optical output. Advantageously an optical waveguide 1 with a switchable wide angular range may be provided.

The extraction from the planar surfaces 36 is in proximity to the light turning film 5 and not onto rear reflector 3. Efficiency of extraction is improved because of increased Fresnel reflections that would otherwise be present if the extraction was from the first guiding surface 8. Advantageously efficiency of wide angle output is enhanced.

The operation of the backlight 20 of FIG. 1 comprising optical waveguide 1 will now be further described.

Figure 10:
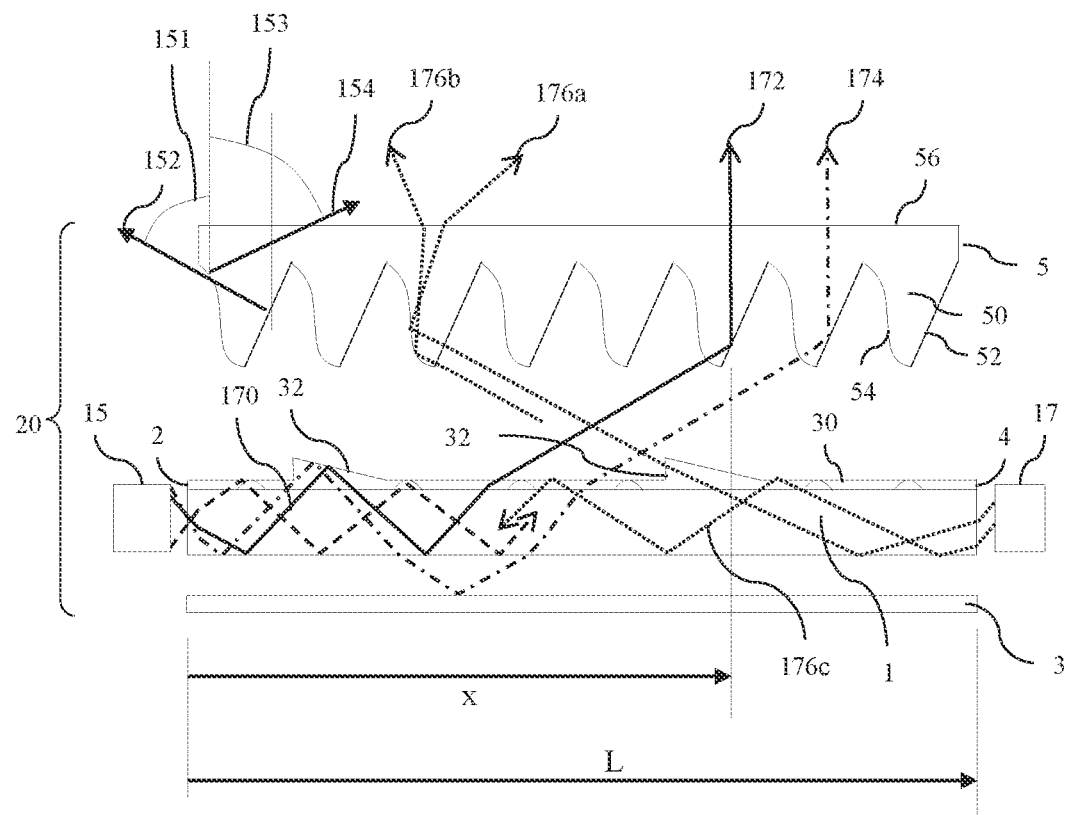
FIG. 10 is a schematic diagram illustrating in side view a backlight comprising an optical waveguide comprising a non-inclined lenticular surface and inclined planar surfaces, a rear reflector and a light turning film.
Figure 11A:
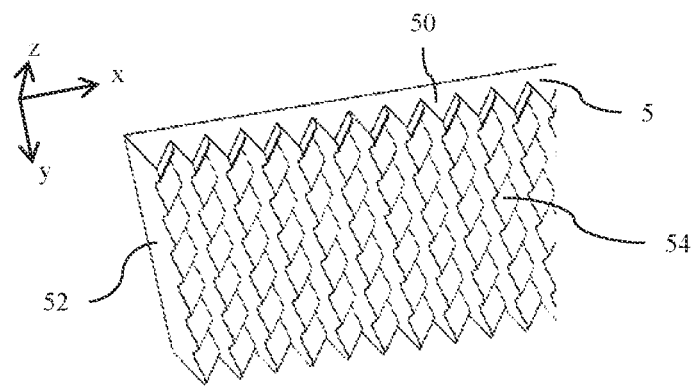
FIG. 11A, FIG. 11B, FIG. 11C, and FIG. 11D are schematic diagrams illustrating in perspective views a light turning film wherein each first prismatic face comprises a planar surface and each second prismatic face comprises an undulating surface.
Figure 11B:
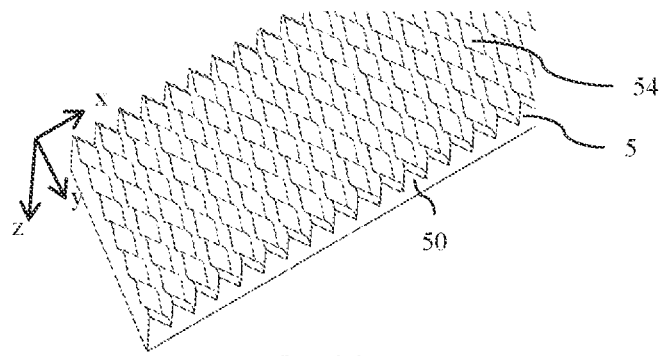
Figure 11C:
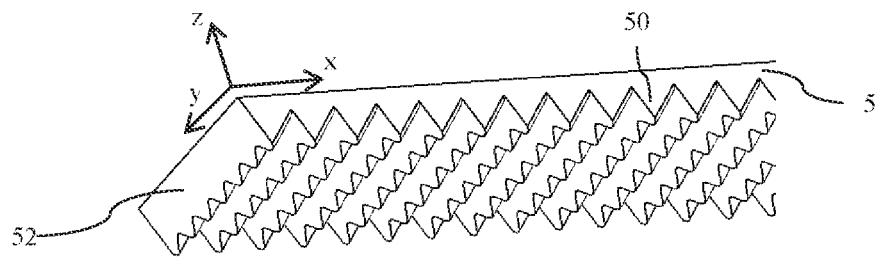
Figure 11D:
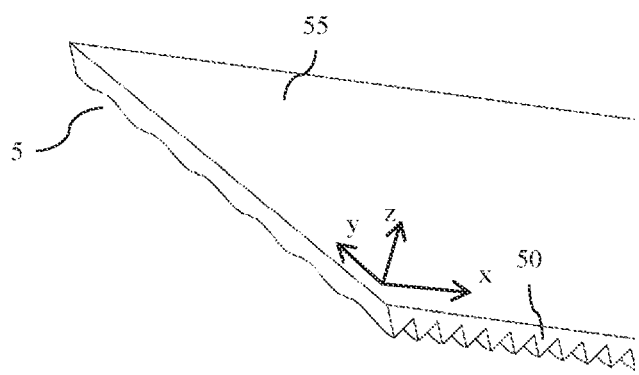

FIG. 10 is a schematic diagram illustrating in side view a backlight 20 comprising an optical waveguide comprising a non-inclined lenticular surface 30 and inclined planar surfaces 32, 36, a rear reflector 3 and a light turning film 5. FIGS. 11A-11D are schematic diagrams illustrating in perspective views a light turning film 5 wherein each first prismatic face 40 comprises a planar surface and each second prismatic face 42 comprises an undulating surface. Features of the arrangements of FIGS. 10-11D not discussed in further detail may be assumed to correspond to the features with equivalent reference numerals as discussed above, including any potential variations in the features.

Light turning film 5 comprises a first surface 55 that is typically planar and a second surface facing the first surface 55 that comprises an array of prismatic elements 50 that are elongate in the lateral direction (parallel to y-axis). The prismatic elements 50 of the array of prismatic elements each comprise opposing first and second prismatic faces 52, 54. Each first prismatic face 52 has a surface normal 152 direction that is tilted by tilt angle 151 from the display normal direction (z-axis direction) and has a component that is inclined in the longitudinal direction (parallel to x-axis) towards the first input end 2. Each second prismatic face 54 has a surface normal direction 154 that is tilted by tilt angle 153 from the display normal direction (z-axis direction) and has a component that is inclined in the longitudinal direction away from the first input end 2.

When light source 15 is operated, light rays 172, 174 are input into the first input end 2 of the optical waveguide 1 and are guided by total internal reflection within the waveguide 1. As will be described further below, the pluralities of non-inclined lenticular surfaces 30 and inclined planar surfaces 32 are oriented to direct guided light rays 170 through the first and second light guiding surfaces 6, 8 as output light rays 172, 174. Planar surfaces 36 are hidden for light propagating from the first input end 2 and thus do not substantially contribute to output light.

The direction of output from the surface 8 is for light rays 172, 174 that are near to the critical angle within the optical waveguide 1 and thus are typically close to grazing incidence from the surface 8 in air.

The backlight 20 further comprises a rear reflector 3 facing the first light guiding surface 6 that is arranged to reflect light rays 174 that are transmitted through the first surface 6 of the optical waveguide 1. Light rays that pass through the surface 6 are incident on rear reflector 3 and are reflected back through the optical waveguide 1.

After output from the optical waveguide, output light rays 172, 174 from the optical waveguide 1 are input into the turning film 5 whereupon they are refracted by the second prismatic face 54 and reflected by the first prismatic face 52 by total internal reflection.

Light rays are reflected towards the display surface normal direction (parallel to z-axis), advantageously achieving high head-on luminance.

The undulations of second prismatic face 54 may provide some deflection of light ray directions for rays 172, 174. For illustrative purposes, the surface 54 is shown as undulating in the x-z plane, orthogonal to the lateral direction. However, the undulation is primarily in the x-y plane. Accordingly, rays are shown as diffusing in the longitudinal direction, however such undulating facets illustrated in FIGS. 11A-11D are arranged to provide diffusion primarily in the lateral direction.

Such deflections are provided by refraction at the undulating face 54 and are thus relatively small. A small amount of light cone diffusion may be provided for light rays 172, 174 by the undulating prismatic face 54.

The present embodiments may provide for a single light source 15 at the first end 2. Advantageously a narrow output cone angle may be provided, achieving low off-axis luminance for privacy operation and high head-on efficiency as will be described further hereinbelow. Further a narrow bezel width may be achieved.

It may be desirable to provide a second operating mode that provides a wider viewing angle in comparison to the first operating mode.

A second light source 17 may be arranged to input input light into the second input end 4 of the optical waveguide 1. The pluralities of non-inclined light extraction features 30 and inclined planar surfaces 32 are oriented to direct guided light rays 176c within the optical waveguide 1 as guiding light rays. The planar surfaces 36 face the second input end 4 such that incident light rays 176a, 176b are refracted as output light by the planar surfaces 36. As will be described hereinbelow, the cone angle of light output from the planar surface 36 for the transmitted light rays 176a, 176b may be substantially greater than for light rays 172, 174.

The planar surfaces 36 are arranged on the same side of the optical waveguide 1 as the prismatic elements 50 of the light turning film 5. The output light is not reflected by the rear reflector 3 or output through the first planar surface 6. In comparison to arrangements with planar surfaces 36 arranged near to the reflector 3, in the present embodiments Fresnel reflection losses are reduced so that advantageously, efficiency of extraction is improved in the second mode of operation.

Output light rays 176a, 176b from the optical waveguide 1 are refracted by the first prismatic facet 52 and are reflected by the second prismatic face 54 by total internal reflection. In comparison to light rays 172, 174, the light rays undergo a reflection at the undulating facets 54 rather than refraction. The effective optical power of the reflecting surface is approximately three times the optical power of the same surface for refracted light, and thus the undulation may provide substantial diffusion effect in comparison to that for light rays 172, 174.

The planar surface 36 and undulating prismatic face 54 may achieve an output cone angle for light input from the second end by source 17 that is substantially greater than the output cone angle achieved for light input from the input end 2 by source 15. Advantageously the output cone angle in wide angle mode may be substantially increased. Such a backlight 20 may provide a display 100 that may be conveniently viewed from a wide range of viewing angles.

The simulated luminance distribution of the illustrative embodiments of FIGS. 2-6D will now be described for illumination by the light sources 15 and the light sources 17.

Figure 12A:
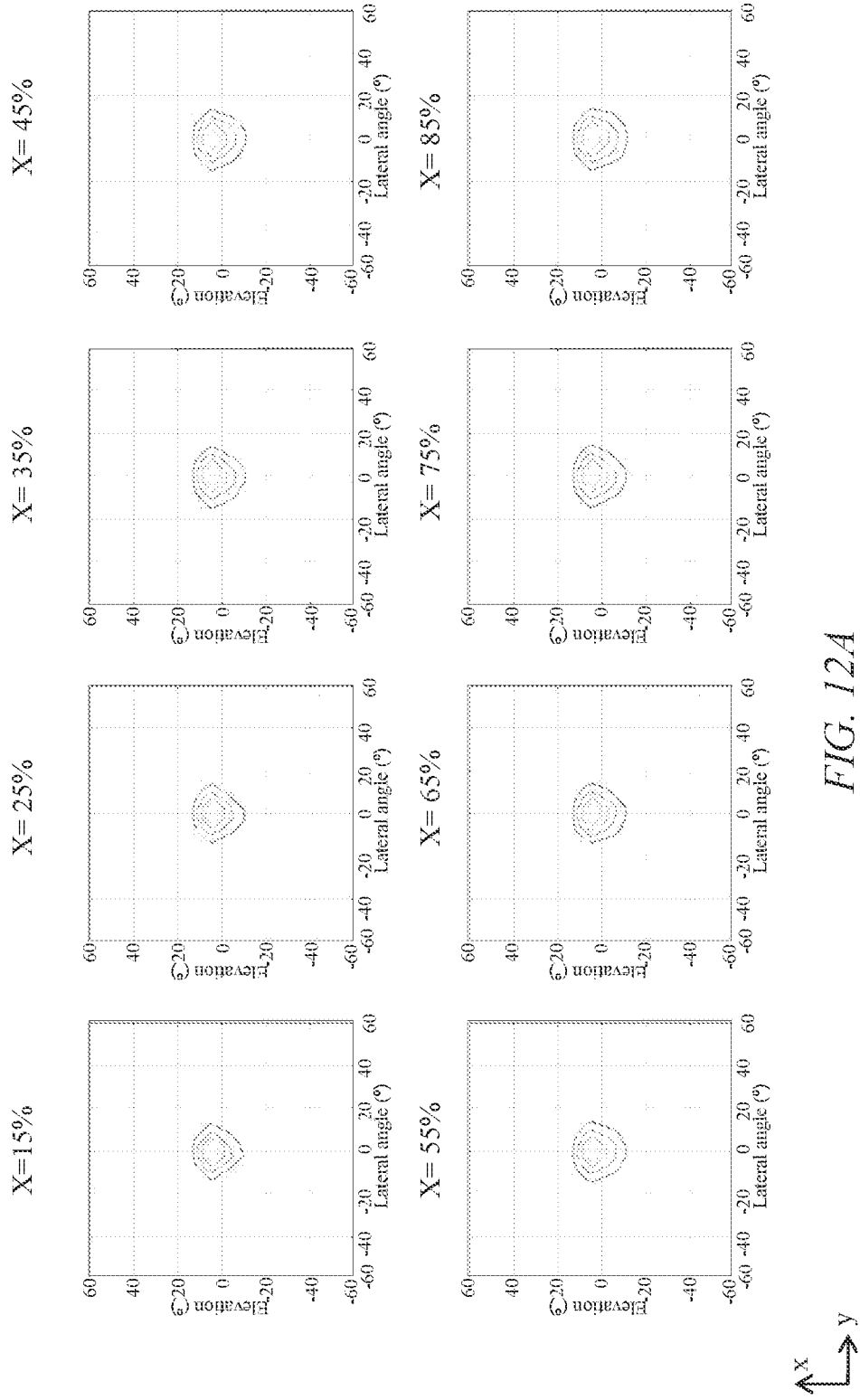
FIG. 12A is a schematic graph illustrating iso-luminance field-of-view polar plots for different positions across a backlight comprising an optical waveguide of FIG. 2 and light turning film of FIG. 8B when light is input into the first end of the optical waveguide.
Figure 12B:
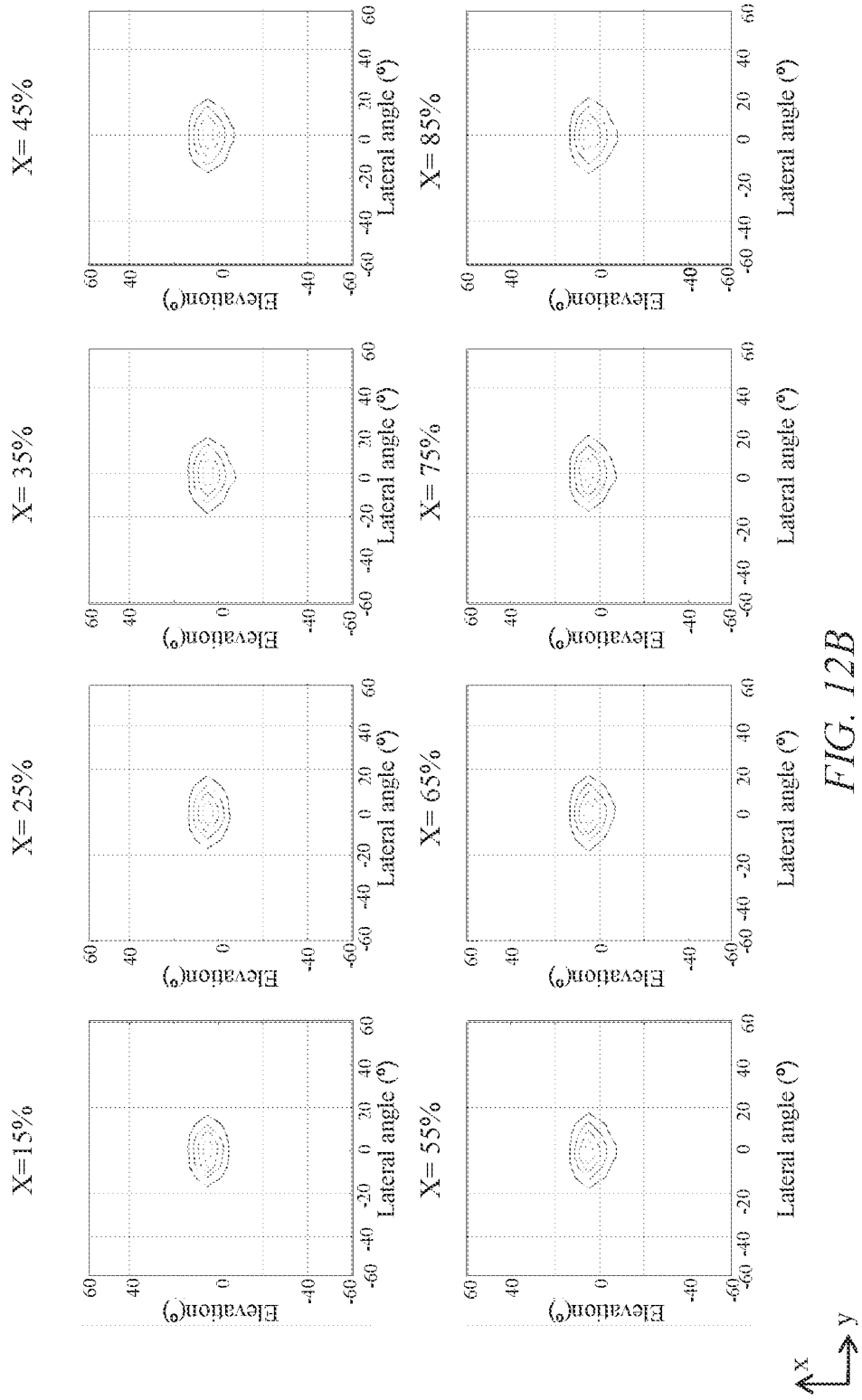
FIG. 12B is a schematic graph illustrating iso-luminance field-of-view polar plots for different positions across a backlight comprising an optical waveguide of FIG. 2 and light turning film of FIGS. 11A-11D when light is input into the first end of the optical waveguide.

FIG. 12A is a schematic graph illustrating iso-luminance field-of-view polar plots for different positions across a backlight comprising an optical waveguide of FIG. 2 and light turning film of FIG. 8B when light is input into the first end of the optical waveguide; and FIG. 12B is a schematic graph illustrating iso-luminance field-of-view polar plots for different positions across a backlight comprising an optical waveguide 1 of FIG. 2 and light turning film 5 of FIGS. 11A-11D when light is input into the first end of the optical waveguide.

Thus FIGS. 12A-12B illustrate simulated appearance for illumination of the optical waveguide 1 and turning film 5 of the present illustrative embodiment by light source 15 where each contour represents a 20% luminance contour interval. The parameter X represents the relative distance from the first input end 2, and is given by equation 1 where x is the distance from the input end 2 and L is the length of the optical waveguide 1, illustrated in FIG. 10.

$$X = x/L \qquad \text{Eqn. 1}$$

The luminance output profile is provided within approximately +/−20 degree lateral viewing angle and +/−10 degree longitudinal viewing angle about the display normal direction 130.

Advantageously such an illumination profile can achieve high efficiency of illumination to a head-on user. Further, such a profile is substantially uniform along the length of the optical waveguide 1, achieving high luminance uniformity. Such a profile can also be used to provide the privacy mode operation of a privacy display as will be described further below.

FIG. 12B differs from FIG. 12A in that substantially no increased lateral diffusion is provided by the undulation on the face 45 of the turning film 5 in comparison to a planar face. Advantageously only a small change in lateral field of view is provided by the undulations and privacy performance is similar.

Figure 12C:
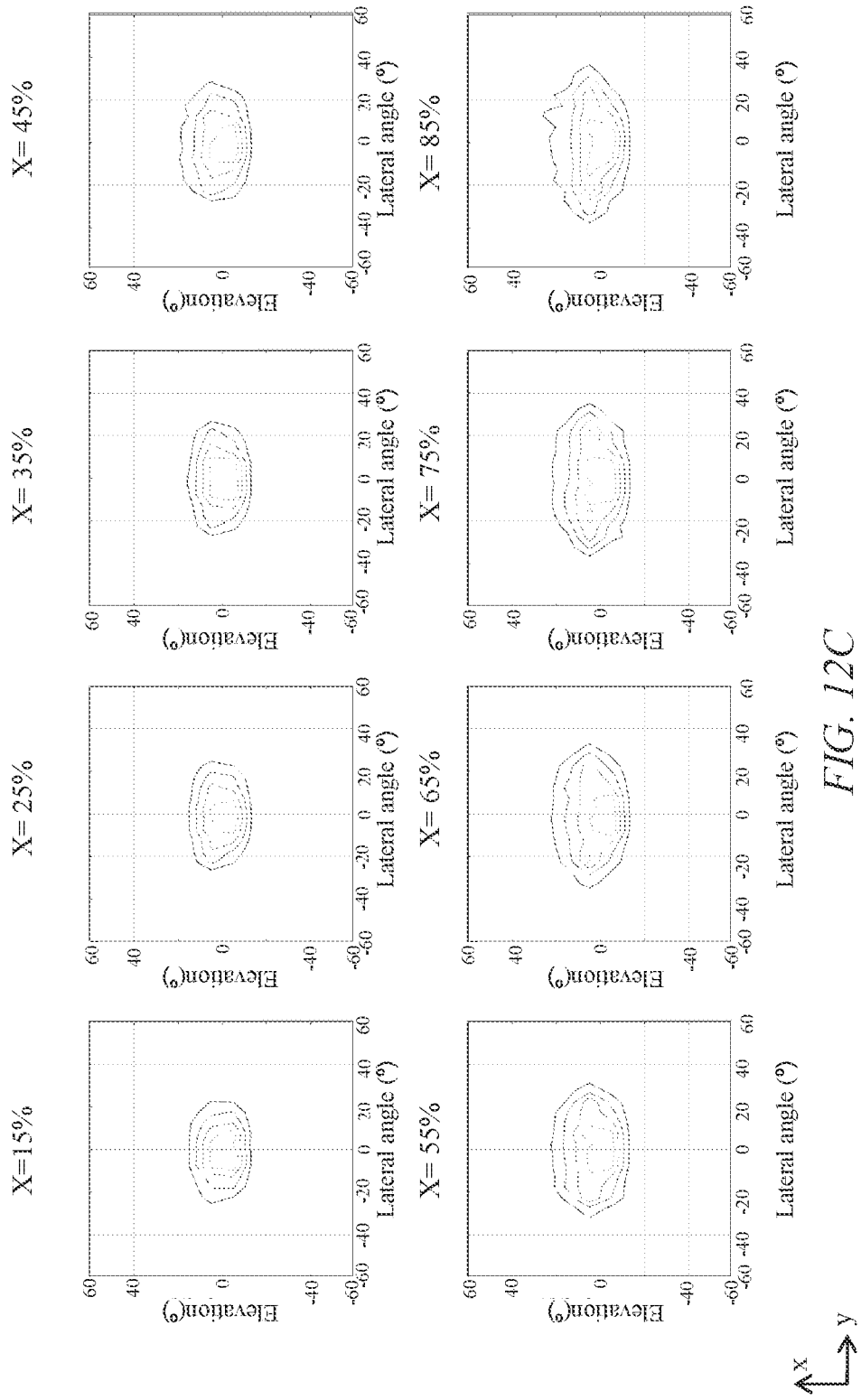
FIG. 12C is a schematic graph illustrating iso-luminance field-of-view polar plots for different positions across a backlight comprising an optical waveguide of FIG. 2 and light turning film of FIG. 8B when light is input into the second end of the optical waveguide.
Figure 12D:
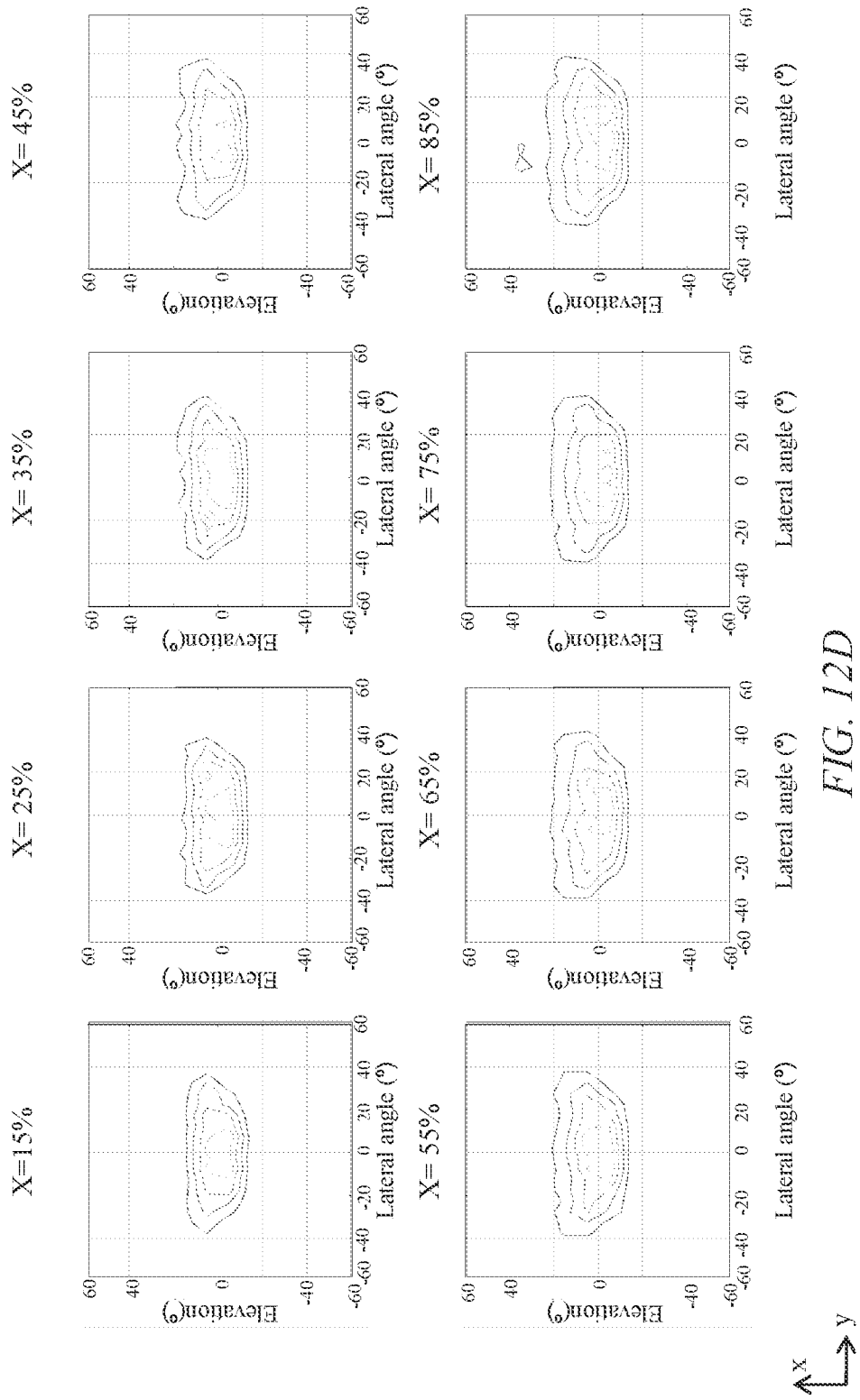
FIG. 12D is a schematic graph illustrating iso-luminance field-of-view polar plots for different positions across a backlight comprising an optical waveguide of FIG. 2 and light turning film of FIGS. 11A-11D when light is input into the second end of the optical waveguide.

FIG. 12C is a schematic graph illustrating iso-luminance field-of-view polar plots for different positions across a backlight comprising an optical waveguide of FIG. 2 and light turning film of FIG. 8B when light is input into the second end of the optical waveguide; and FIG. 12D is a schematic graph illustrating iso-luminance field-of-view polar plots for different positions across a backlight comprising an optical waveguide of FIG. 2 and light turning film of FIGS. 11A-11D when light is input by light source 17 into the second input end 2 of the optical waveguide 1. In comparison to the output of FIG. 12B, the field of view is increased to approximately +/−40 degrees in the lateral direction. Advantageously the display may be viewed from an increased range of lateral viewing directions for a wide angle mode of operation.

FIG. 12D differs from FIG. 12C in that increased lateral diffusion is provided by the undulation on the face 45 of the turning film 5 in comparison to a planar face. Advantageously the lateral field of view is increased, and wide angle performance is improved.

The field-of-view profiles of FIGS. 12A-12D may be further expanded by means of diffuser 334 and diffusers arranged on other display surfaces such as output polariser 218. The diffusers may be symmetric or asymmetric diffusers. For example, an asymmetric diffuser comprising asymmetric surface relief microstructures for example may provide increased cone angle in the longitudinal direction while providing substantially no change to the lateral angular profile. Advantageously viewing freedom in the longitudinal direction (that may typically be the vertical direction) may be expanded and privacy viewing angle in the lateral direction is substantially unmodified. Further Moiré beating between the repeating cusps 37 of the optical waveguide 1, the light turning film 5 and the pixels of the spatial light modulator 48, each of which has major components in the longitudinal direction may be minimised.

The viewing angle profile for a single longitudinal viewing angle will now be described.

Figure 13A:
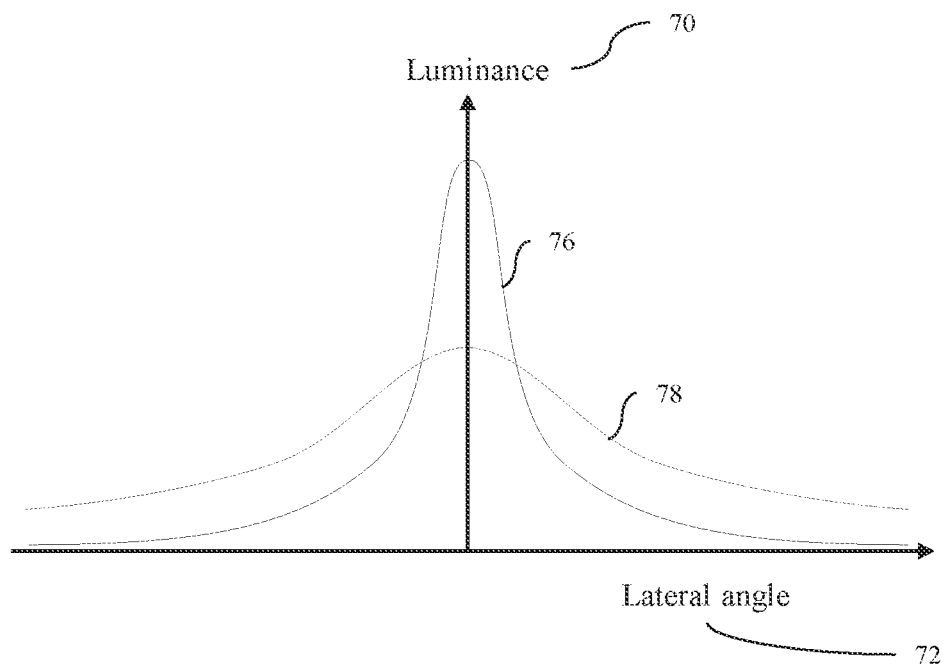
FIG. 13A is a schematic graph illustrating angular luminance profiles for light input from first and second input ends of an optical waveguide.
Figure 13B:
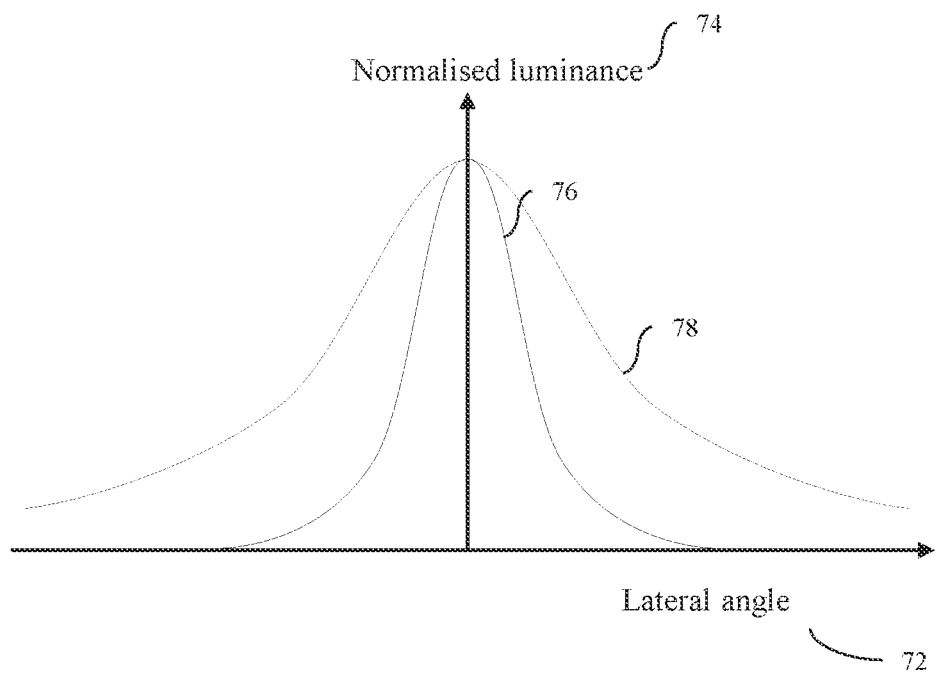
FIG. 13B is a schematic graph illustrating normalised angular luminance profiles for light input from first and second input ends of an optical waveguide.

FIG. 13A is a schematic graph illustrating angular luminance 70 against lateral viewing angle 72 profiles 76, 78 for light input from first and second input ends 2, 4 of an optical waveguide 1; and FIG. 13B is a schematic graph illustrating normalised angular luminance profiles for light input from first and second input ends 2, 4 of an optical waveguide 1. In privacy mode of operation, the profile 76 may be provided for illumination by light source 15 while in wide angle mode the profile 78 may be provided for illumination by light source 17. The full width half maximum width for profile 78 is substantially greater for the profile 76. Further, for off-axis viewing positions, the luminance is substantially reduced.

Advantageously a switchable privacy display may be provided.

A method to provide a tool to be used to form the surface 8 of the optical waveguide 1 will now be described.

FIGS. 14A-14E are schematic diagrams illustrating in perspective views a method to form a tool for fabrication of a surface of an optical waveguide comprising non-inclined lenticular surface and inclined planar surfaces.

Figure 14A:
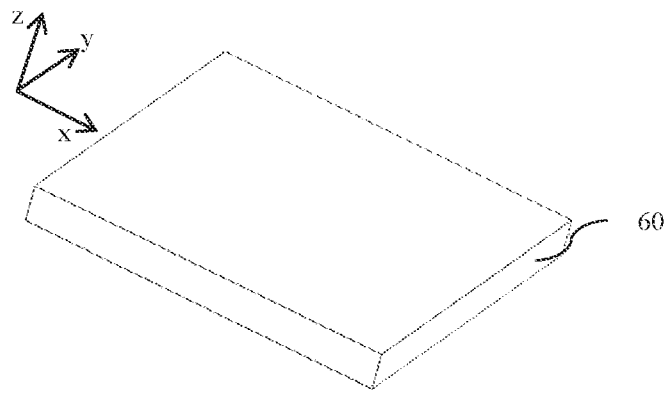
FIG. 14A, FIG. 14B, FIG. 14C, FIG. 14D, and FIG. 14E are schematic diagrams illustrating in perspective views a method to form a tool for fabrication of a surface of an optical waveguide comprising non-inclined lenticular surface and inclined planar surfaces.
Figure 14B:
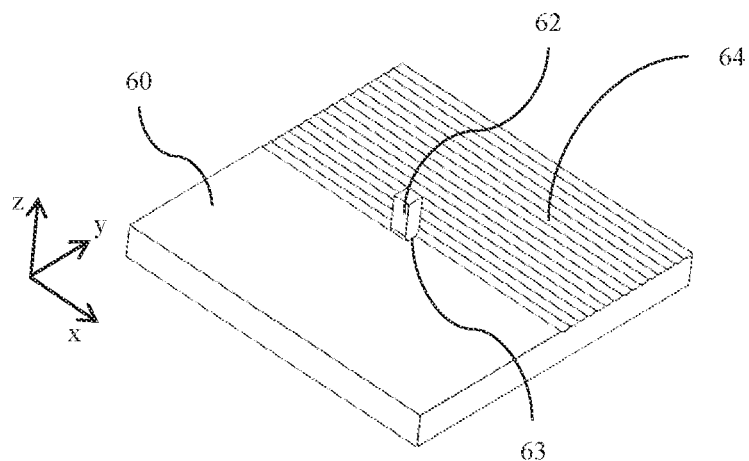
Figure 14C:
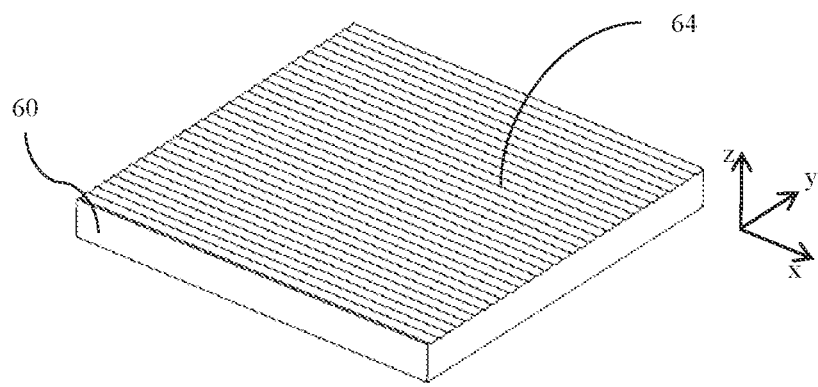
Figure 14D:
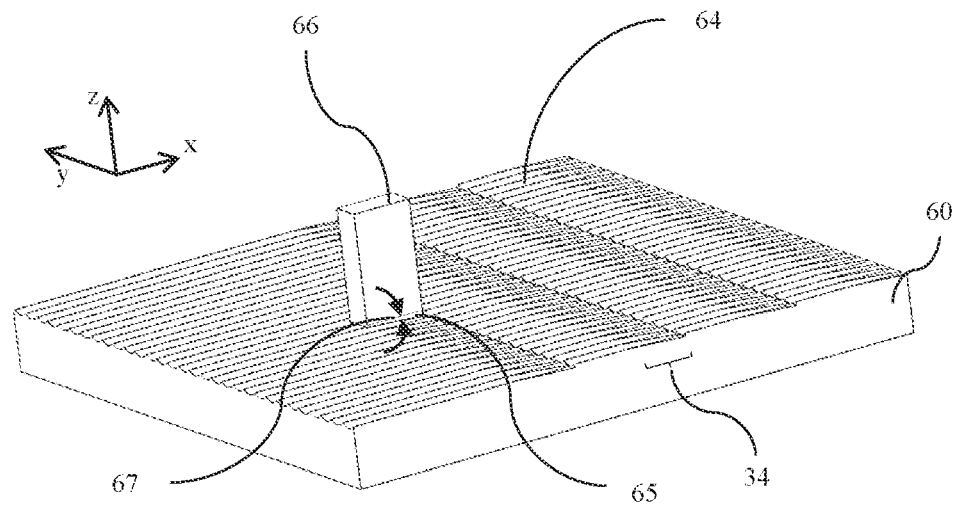

In a first step as illustrated in FIG. 14A, a planar tool 60 blank is provided. The tool blank may be for example copper or nickel. In a second step as illustrated in FIG. 14B a diamond 62 with a curved cutting face 63 is used to scribe cylindrical grooves 64 aligned parallel to the longitudinal direction in the surface of the tool 60, and a uniform lenticular surface is provided as illustrated in FIG. 14C.

In a third step a different diamond 66 with a planar cutting face 65 that is inclined at angle 67 to the surface of the tool 60, where the angle 67 is typically the same as the angle 133 of the planar surface normal. The tool is used to scribe planar grooves in the lateral direction, orthogonal to the longitudinal direction such that the tool cuts through the lenticular grooves 64 in the intersection region 34.

Figure 14E:
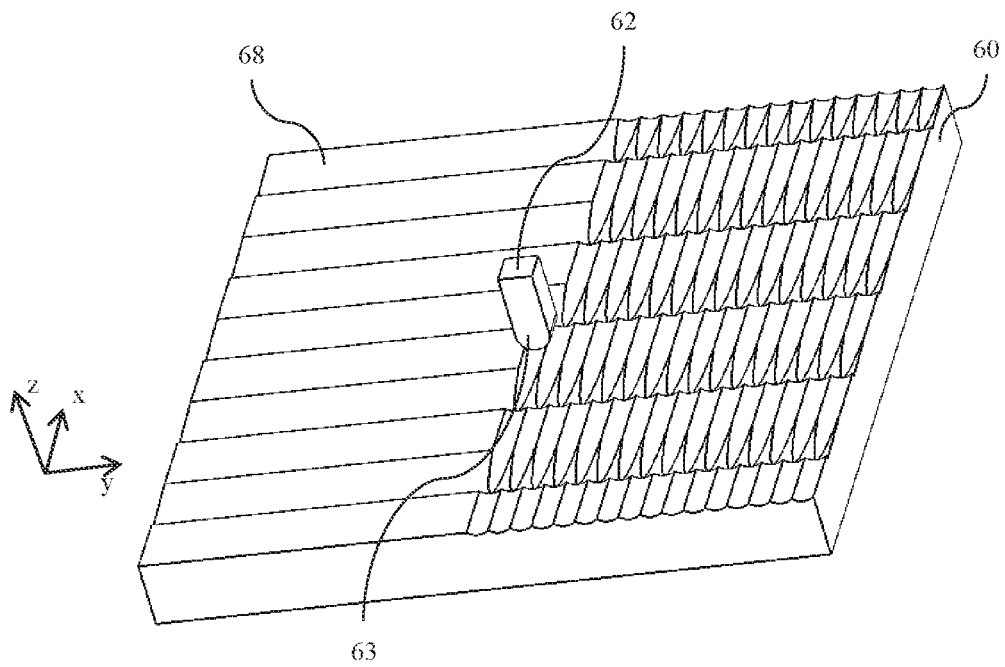

FIG. 14E illustrates an alternative cutting sequence. In a second step (not shown), linear facets 68 are cut in the lateral direction, and in the third step lenticular grooves are cut through the linear facets 68 by the diamond 62 with curved cutting face 63.

Figure 14F:
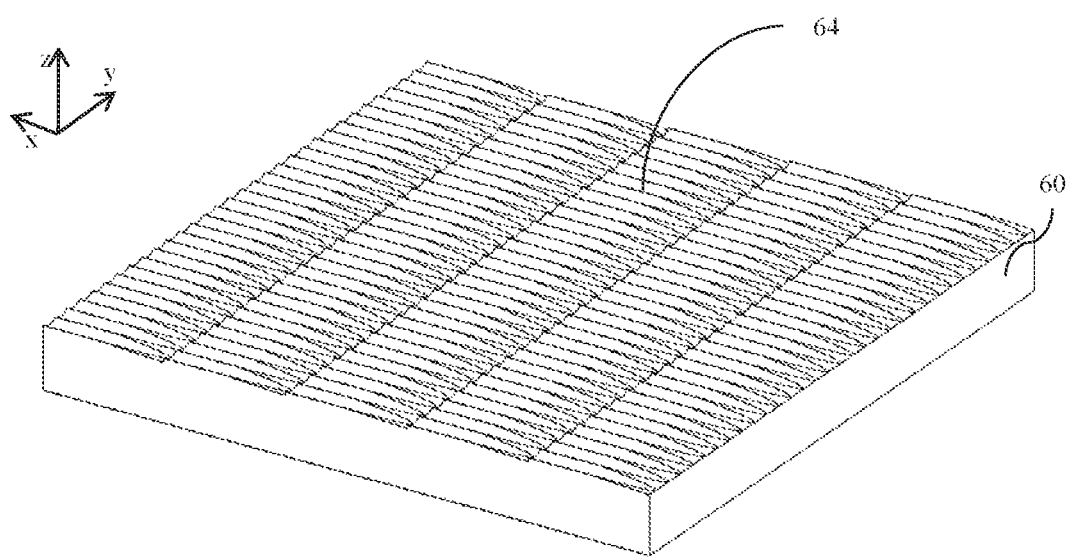
FIG. 14F and FIG. 14G are schematic diagrams illustrating in perspective views tools for fabrication of a surface of an optical waveguide comprising non-inclined lenticular surface and inclined planar surfaces.
Figure 14G:
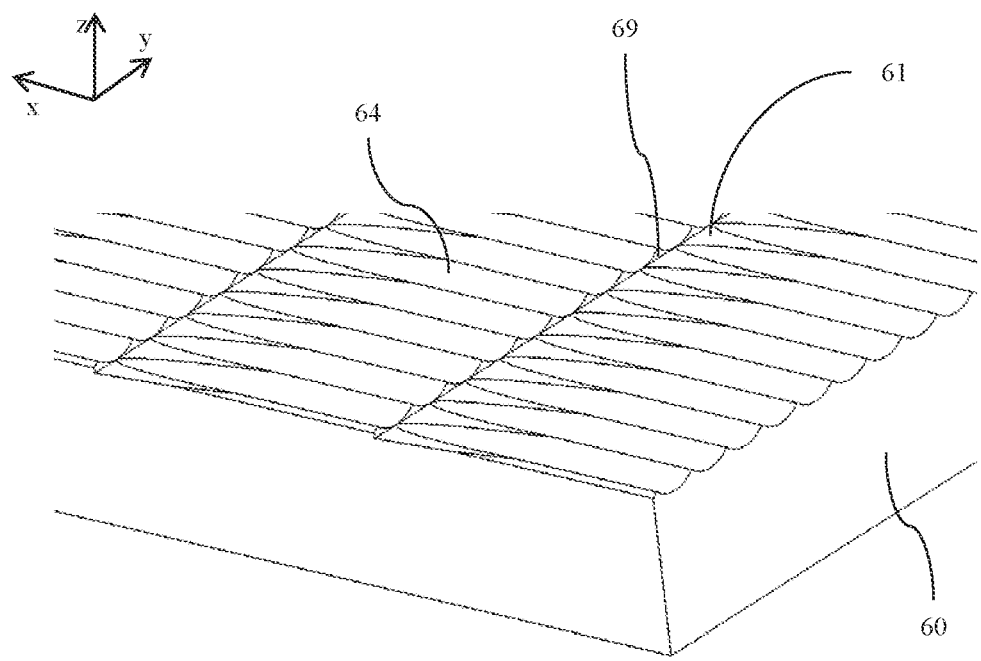

FIGS. 14F-14G are schematic diagrams illustrating in perspective views tools for fabrication of a surface of an optical waveguide comprising non-inclined lenticular surface and inclined planar surfaces that have been cut as illustrated in FIGS. 14A-14E and comprising grooves 64 and planar regions 61, 69. Features of the arrangements of FIGS. 14A-G not discussed in further detail may be assumed to correspond to the features with equivalent reference numerals as discussed above, including any potential variations in the features.

Such a tool may be used for injection moulding, hot embossing or UV casting of an optical waveguide 1 for example.

Advantageously the optical surface 6 is planar and may be conveniently provided by a support substrate or a planar injection mould. Further, high fidelity of features may be provided, achieving high efficiency of extraction. The surface 8 may be provided on stiff substrates such as 0.4 mm or greater thickness PMMA or PET substrates to provide light guide plates (LGPs). Alternatively thin flexible substrates of thickness less than 0.4 mm may be used to provide light guide films (LGFs) for use in flexible display.

It would be desirable to provide free-form shapes for display 100, for example to provide curved corners or notches in the display area.

Figure 15:
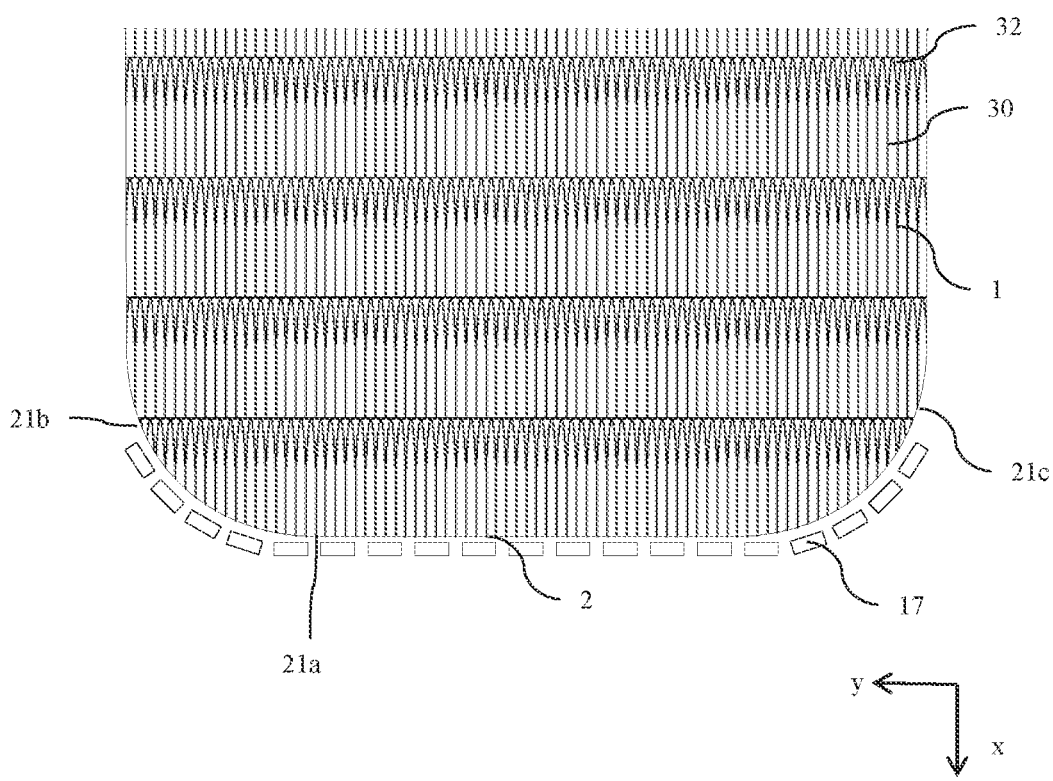
FIG. 15 is a schematic diagram illustrating in top view a curved input shape optical waveguide, in accordance with the present disclosure.

FIG. 15 is a schematic diagram illustrating in top view a curved input shape optical waveguide 1. Input side 2 may be provided with linear region 21*a* and curved regions 21*c*, 21*b* by moulding or cutting of a moulded component. Advantageously a free form shape display may be provided. Features of the arrangement of FIG. 15 not discussed in further detail may be assumed to correspond to the features with equivalent reference numerals as discussed above, including any potential variations in the features.

In typical privacy mode operation a display may be provided with a relatively narrow viewing angle in the lateral direction, and a wider viewing freedom in the longitudinal direction. It would be desirable to maximise the viewing freedom in the longitudinal direction in order to enable display rotation about an axis in the lateral direction, that may typically be the horizontal direction.

Figure 16:
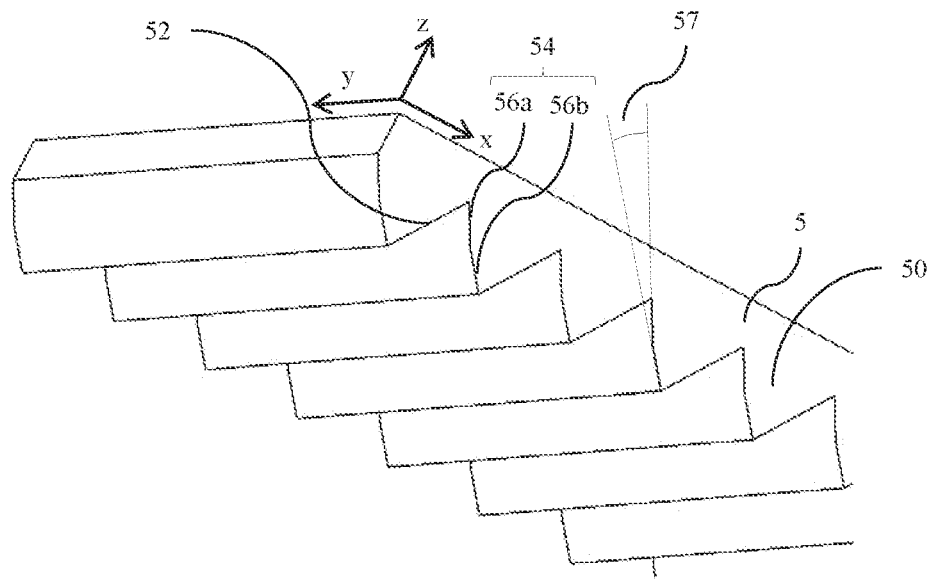
FIG. 16 is a schematic diagram illustrating in a first perspective view a light turning film comprising a planar opposing face and a kinked opposing face.
Figure 17:
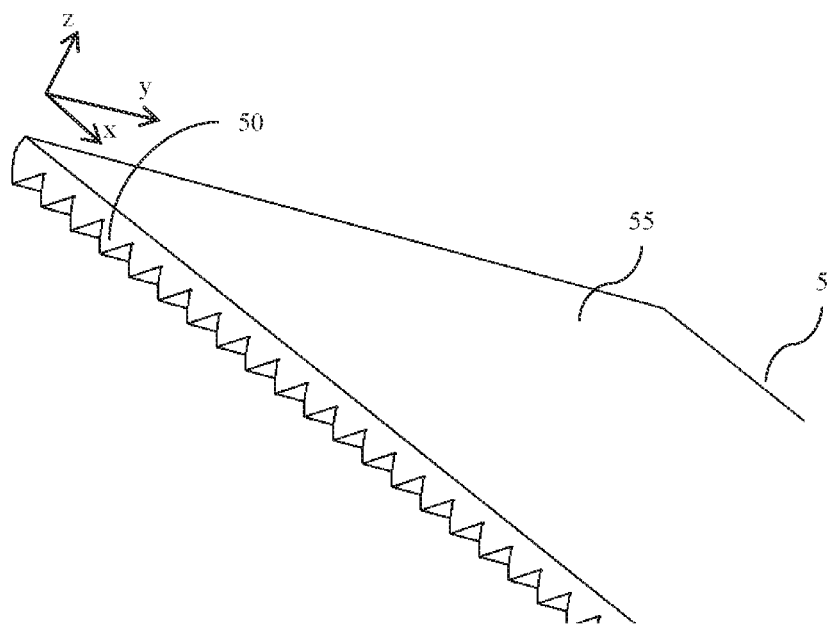
FIG. 17 is a schematic diagram illustrating in a second perspective view a light turning film comprising a planar opposing face and a kinked opposing face and a planar output surface.

FIG. 16 is a schematic diagram illustrating in a first perspective view a light turning film 5 comprising a planar opposing face 52 and a kinked opposing face 54 comprising facets 56*a*, 56*b* that are inclined at angle 57 to each other. FIG. 17 is a schematic diagram illustrating in a second perspective view a light turning film 5 comprising a planar opposing face 52 and a kinked opposing face 54 and a planar output surface. Features of the arrangements of FIGS. 16-17 not discussed in further detail may be assumed to correspond to the features with equivalent reference numerals as discussed above, including any potential variations in the features.

The face 54 may comprise more than two facets or may be a curved surface. In comparison to the undulating surface of FIGS. 11A-11D, the facets are arranged to provide diffusion primarily in the longitudinal direction.

In operation, light rays from the source 17 arranged at the second end 4 are deflected by total internal reflection at face 54 of the turning film 5 and are spread in the longitudinal direction, as compared to spreading in the lateral direction by the undulating surface of FIGS. 11A-11D.

Figure 18A:
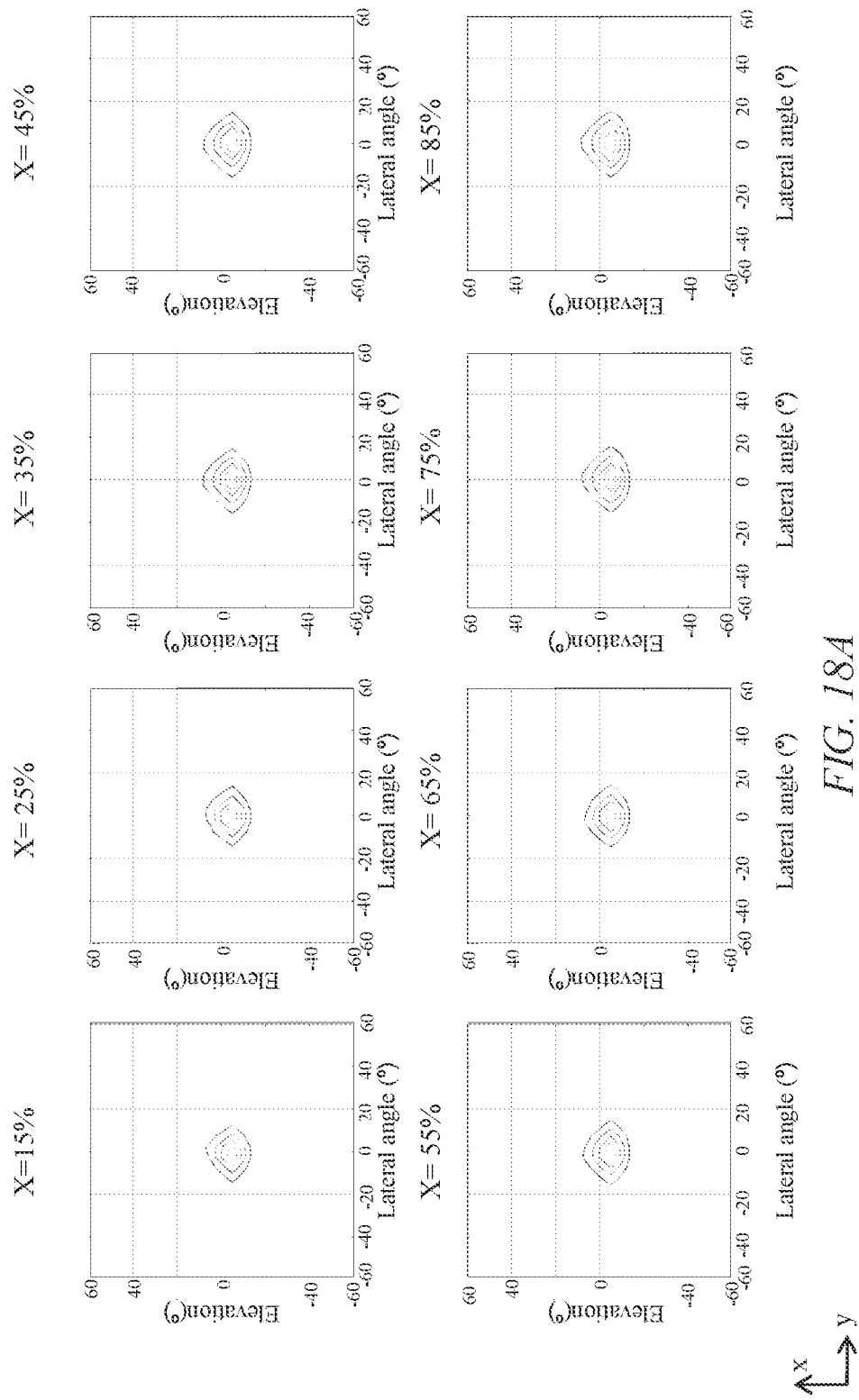
FIG. 18A is a schematic graph illustrating iso-luminance field-of-view polar plots for different positions across a backlight comprising an optical waveguide of FIG. 2 and light turning film of FIGS. 17A-B when light is input into the first end of the optical waveguide.
Figure 18B:
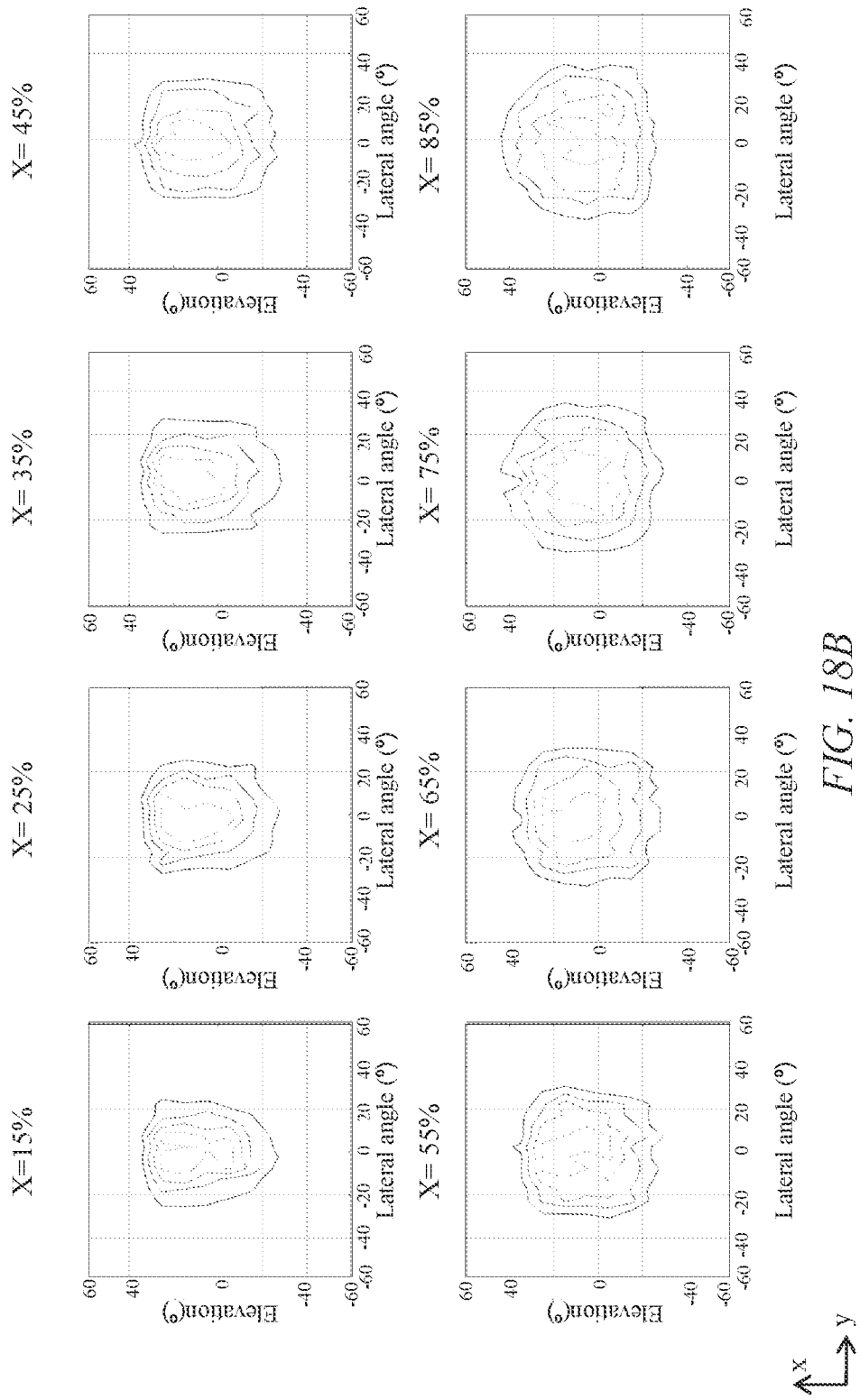
FIG. 18B is a schematic graph illustrating iso-luminance field-of-view polar plots for different positions across a backlight comprising an optical waveguide of FIG. 2 and light turning film of FIGS. 17A-B when light is input into the second end of the optical waveguide.

FIG. 18A is a schematic graph illustrating iso-luminance field-of-view polar plots for different positions across a backlight 20 comprising an optical waveguide 1 of FIG. 2 and light turning film of FIGS. 16-17 when light is input into the first end 2 of the optical waveguide 1; and FIG. 18B is a schematic graph illustrating iso-luminance field-of-view polar plots for different positions across a backlight 20 comprising an optical waveguide 1 of FIG. 2 and light turning film 5 of FIGS. 16-17 when light is input into the second end 4 of the optical waveguide 1.

In the privacy mode of operation, a narrow field of view is provided to advantageously achieve high efficiency and low privacy cross talk levels. In wide angle mode, the longitudinal direction field of view is substantially increased in comparison to FIG. 12D for example. Advantageously the display may be visible from a wider range of viewing angles. Further the display may have substantially uniform illumination profile for both landscape and portrait viewing.

In the present embodiments, the total output for wide angle mode may be provided by illumination from both light sources 15 and 17, and thus the combined output may be a combination of FIGS. 18A and 18B in proportions determined by the relative luminous flux of the driven sources 15, 17. Advantageously the output directionality may be tuned by control of light sources 15, 17.

In a privacy mode of operation, the backlight 20 of the present embodiments may provide stray light in viewing regions that may enable a snooper to perceive image data on a display, for example arising from scatter and diffusion in the backlight 20. For example a snooper may be able to observe image data at luminances of greater than 0.5% of peak head-on luminance, depending on ambient lighting conditions. A typical narrow angle backlight may achieve off-axis luminance of 2% or more for off-axis viewing positions (for example lateral viewing positions of +−45 degrees). It would be desirable to minimise visibility of off-axis images to a snooper.

Figure 19A:
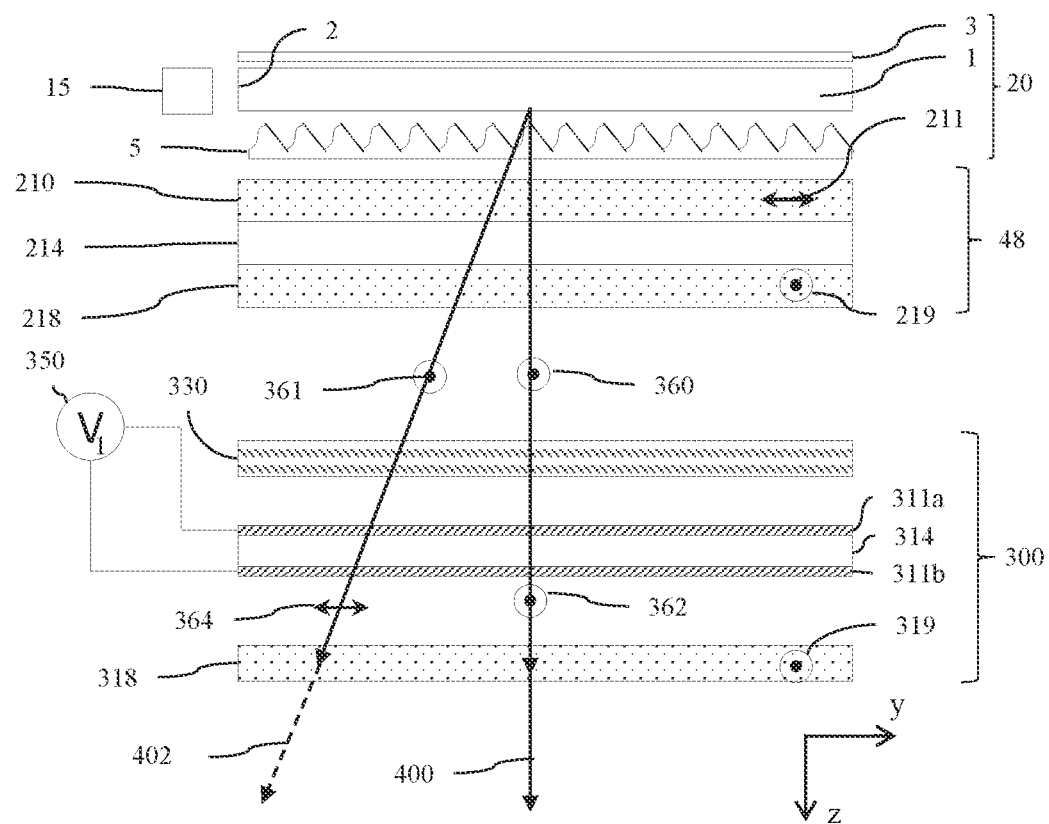
FIG. 19A is a schematic diagram illustrating in top view the optical stack of a privacy display comprising an optical waveguide arranged to provide privacy mode illumination and a switchable liquid crystal retarder.

FIG. 19A is a schematic diagram illustrating in top view the optical stack of a privacy display comprising backlight 20 comprising an optical waveguide 1 illuminated by light source 15 at a first end 2 arranged to provide privacy mode illumination, and a switchable liquid crystal retarder 300 driven in a first state of liquid crystal alignment.

Switchable liquid crystal retarders 300 for privacy display enhancement are described in U.S. Pat. No. 10,126,575 and in U.S. Patent Publ. No. 2019-0086706, both of which are herein incorporated by reference in their entireties.

In comparison to FIG. 1, the spatial light modulator 48 is arranged between the backlight 20 and the switchable liquid crystal retarder 300, however the performance would be expected to be substantially the same for the two arrangements. Thus the display apparatus 100 further comprises at least one display polariser 218 or 210 arranged on a side of the spatial light modulator 48; an additional polariser 318 arranged on the same side of the spatial light modulator 48 as the display polariser 218; and a switchable liquid crystal retarder 330, 314 comprising a layer of liquid crystal material 314 arranged between the display polariser 218 and the additional polariser 318.

Returning to FIG. 1, in operation in the second state for privacy operation, the light source driver 315 is activated to drive the first light source 15. Further, the liquid crystal retarder 300 controller 312 is operated to provide a narrow angle field of view. In other words, when a light source 15 is arranged to input light into the optical waveguide 1 at the first input end 2, a first voltage $V_1$ is applied across the switchable liquid crystal retarder 300 by means of electrodes 311a, 311b such that the molecules of the liquid crystal layer 314 have a first orientation arrangement.

In operation, unpolarised light rays 400, 402 from the backlight 20 are polarised by spatial light modulator 48 input polariser 210 with electric vector transmission direction 211. After modulation by pixel layer 214, output polariser 218 with electric vector transmission direction 219 provides polarisation states 360, 361 to rays 400, 402. Compensation retarder 300 and switchable liquid crystal layer 314 are arranged to provide substantially no change to the polarisation state 362 for ray 400, but to provide a modified polarisation state 364 for off-axis ray 402. Additional polariser 318 with electric vector transmission direction 319 that is parallel to direction 219 transmits ray 400 but absorbs light on ray 402, substantially reducing transmission for off-axis directions.

Figure 19B:
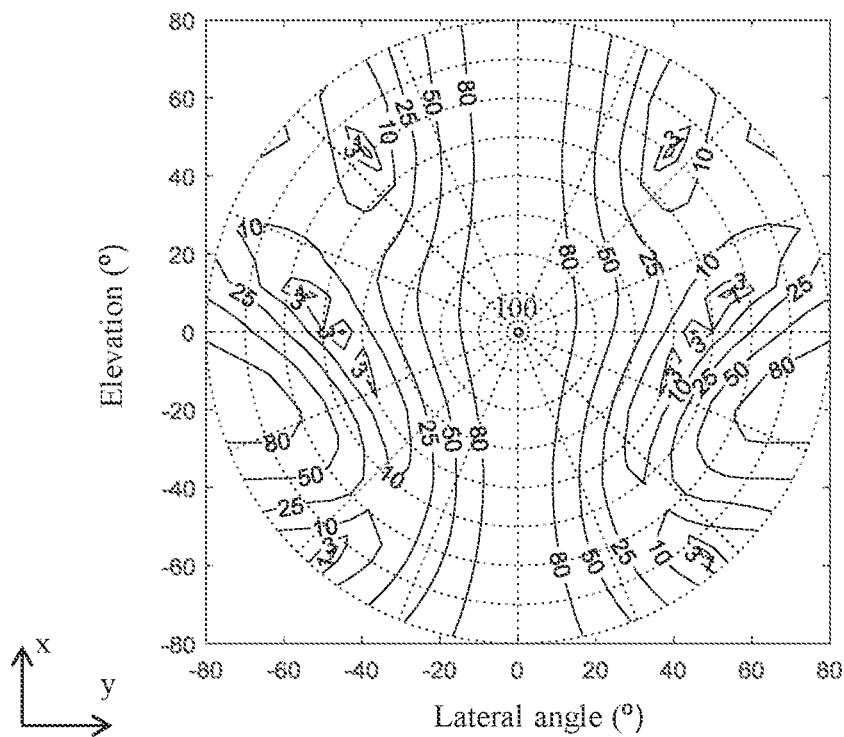
FIG. 19B is a schematic graph illustrating an iso-transmission field-of-view polar plot for a switchable retarder in a privacy mode of operation.

FIG. 19B is a schematic graph illustrating an iso-transmission field-of-view polar plot for a compensated switchable retarder in a privacy mode of operation.

The orientation of the field-of-view profile may be arranged to provide reduction of stray light luminance in privacy mode. For example, the off-axis luminance may be reduced to less than 1% of the peak head-on luminance for a wide field of view by combination of the output light cone of FIG. 18A and the transmission field-of-view profile of FIG. 19B.

Advantageously the output seen by a snooper is substantially reduced in comparison to displays that do not comprise the switchable liquid crystal retarder, and enhanced privacy performance is achieved. Further the head-on luminance is substantially unaffected, achieving high efficiency for the primary user.

It would be further desirable to provide a switchable wide field of view for a switchable privacy display.

Figure 20A:
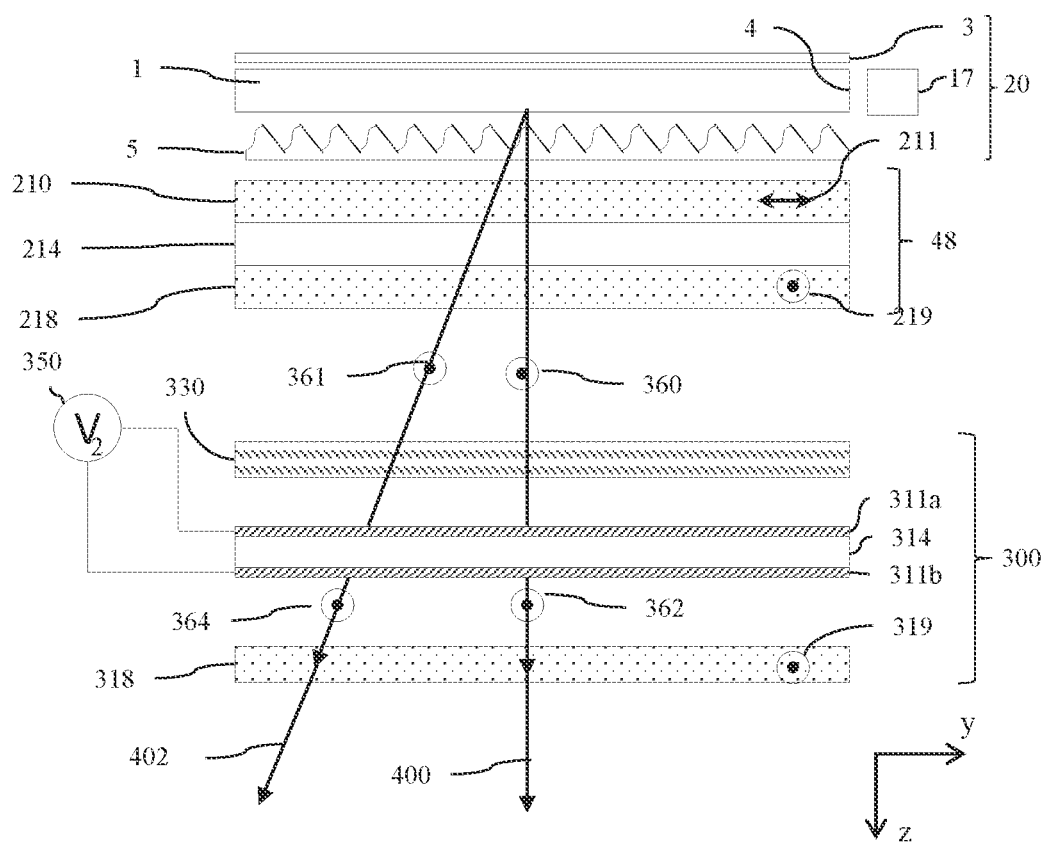
FIG. 20A is a schematic diagram illustrating in top view the optical stack of a privacy display comprising an optical waveguide arranged to provide wide angle illumination and a switchable liquid crystal retarder.

FIG. 20A is a schematic diagram illustrating in top view the optical stack of a privacy display comprising a backlight 20 comprising an optical waveguide 1 illuminated by light source 17 at the second end 4 arranged to provide wide angle illumination and a switchable liquid crystal retarder 300 driven in a second state of liquid crystal alignment.

Returning to FIG. 1, in operation in the second state for wide angle operation, the light source driver 317 is activated to drive the second light source 17. Further, the liquid crystal retarder 300 controller 312 is operated to provide a wide angle field of view. In other words, when a light source 17 is arranged to input light into the optical waveguide 1 at the second input end 4, a second voltage $V_2$ different to the first voltage is applied by driver 350 across the switchable liquid crystal retarder 300 by means of electrodes 311a, 311b such that the molecules of the liquid crystal layer 314 have a second orientation arrangement.

In operation, compensation retarder 300 and switchable liquid crystal layer 314 are arranged to provide substantially no change to the polarisation state 362 for ray 400 and for off-axis ray 402. Additional polariser 318 with electric vector transmission direction 319 that is parallel to direction 219 transmits rays 400, 402, substantially maintaining luminance for off-axis directions.

Figure 20B:
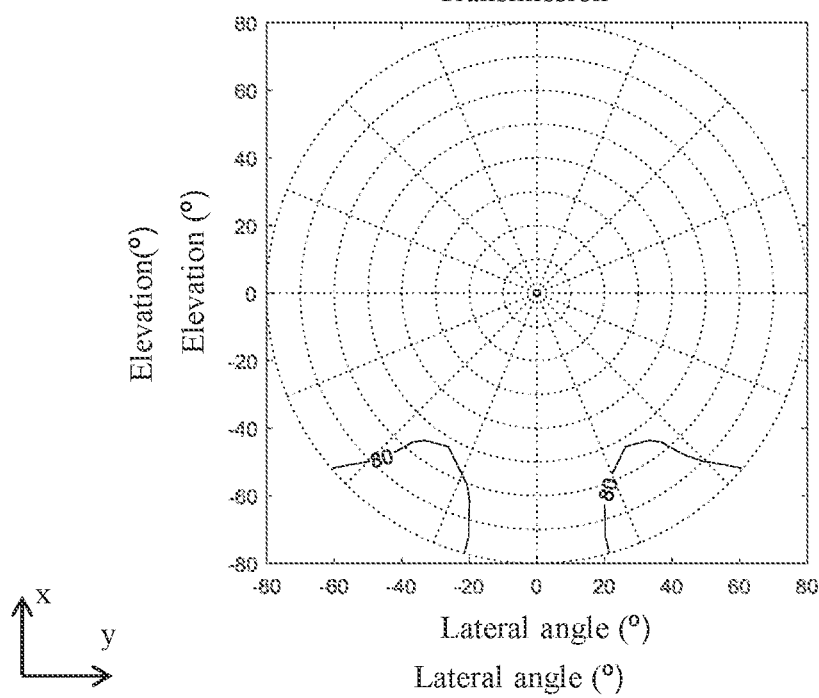
FIG. 20B is a schematic graph illustrating an iso-transmission field-of-view polar plot for a switchable retarder in wide angle mode of operation.

FIG. 20B is a schematic graph illustrating an iso-transmission field-of-view polar plot for a switchable retarder in wide angle mode of operation. Advantageously the output seen by an off-axis viewer has high luminance and high efficiency operation is maintained. Further the head-on luminance is substantially unaffected, achieving high efficiency for the primary user.

Features of the arrangements of FIGS. 19A-20B not discussed in further detail may be assumed to correspond to the features with equivalent reference numerals as discussed above, including any potential variations in the features.

Viewing of a privacy display will now be further described.

Figure 21A:
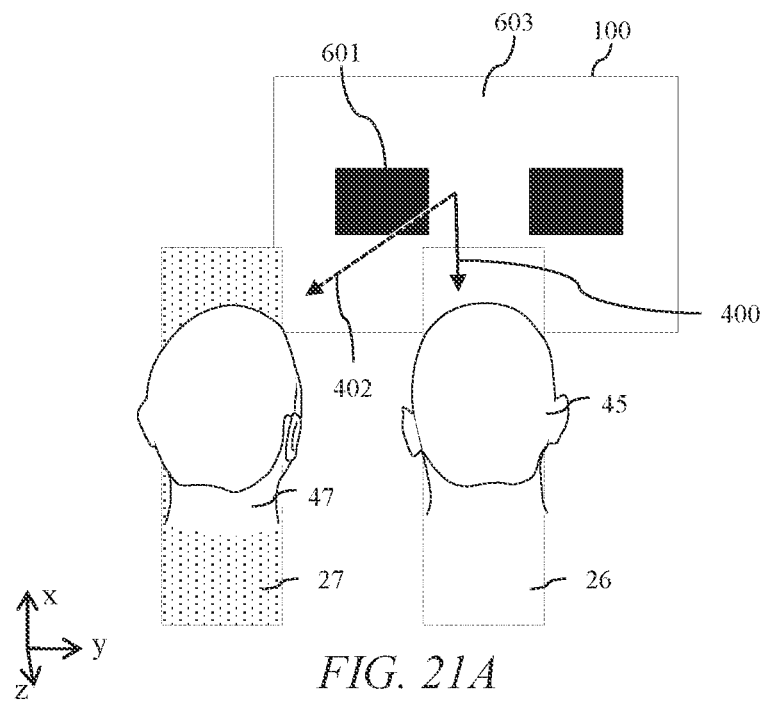
FIG. 21A is a schematic diagram illustrating in front perspective view observation of transmitted output light for a display operating in privacy mode.

FIG. 21A is a schematic diagram illustrating in front perspective view observation of transmitted output light for a display operating in privacy mode. Display 100 may be provided with white regions 603 and black regions 601. A snooper 47 may observe an image on the display if luminance difference between the observed regions 601, 603 can be perceived. In operation, primary user 45 observes a full luminance images by rays 400 to viewing locations 26 that may be optical windows of a directional display. Snooper 47 observes reduced luminance rays 402 in viewing locations 27 due to the reduction of luminance for off-axis positions from the optical waveguide and optional switchable liquid crystal retarder 300.

Figure 21B:
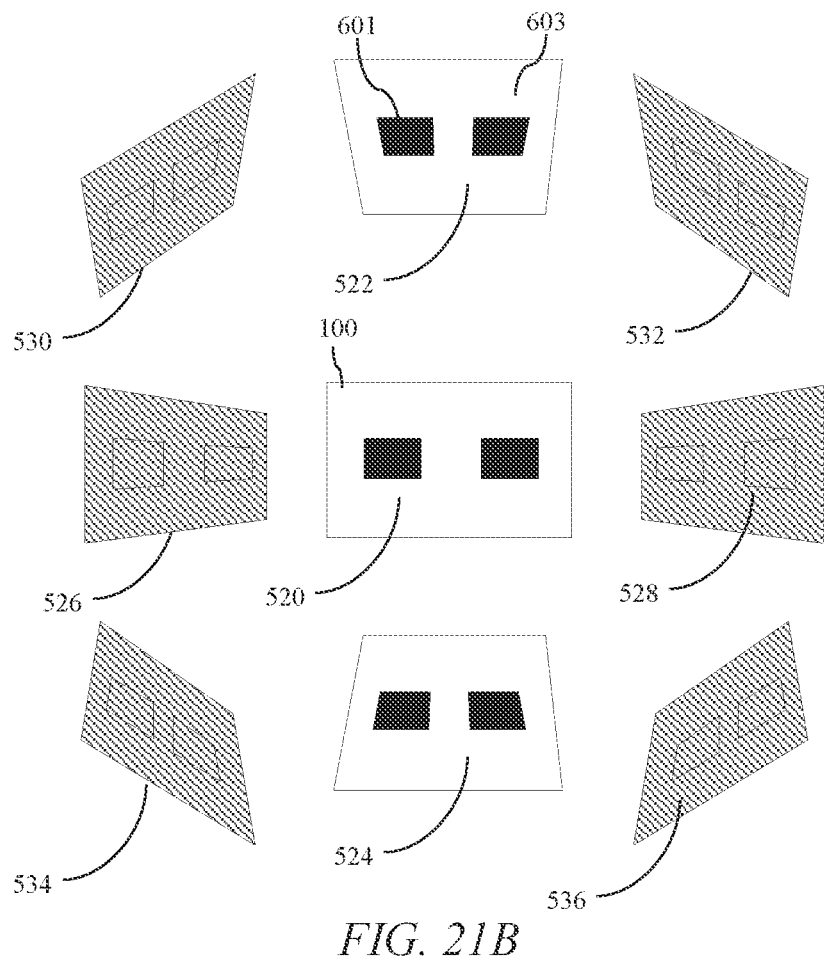
FIG. 21B is a schematic diagram illustrating in front perspective views the appearance of the display of FIGS. 1A-1C operating in privacy mode.

FIG. 21B is a schematic diagram illustrating in front perspective views the appearance of the display of FIG. 1 operating in privacy mode 1 with off-axis luminance reduction. Thus upper viewing quadrants 530, 532, lower viewing quadrants 534, 536 and lateral viewing positions 526, 528 provide reduced luminance, whereas up/down central viewing regions 522, 520 and head-on viewing provides much higher luminance.

Advantageously a privacy display that has comfortable viewing for rotation about a lateral axis may be provided.

Another structure of optical waveguide 1 will now be described.

Figure 22:
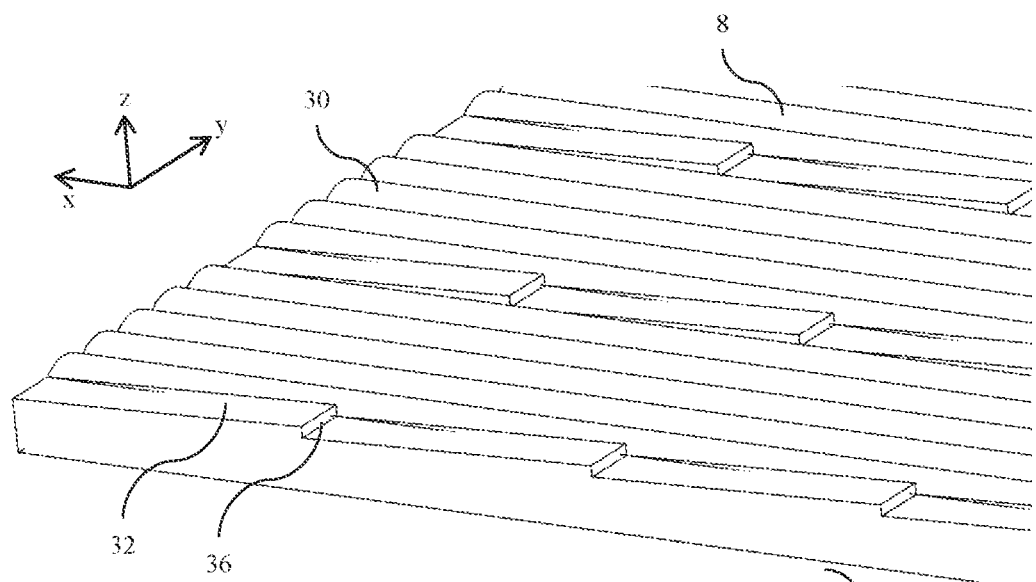
FIG. 22 and FIG. 23 are schematic diagrams illustrating in side perspective views an optical waveguide comprising a non-inclined lenticular surface and inclined planar surfaces that do not intersect the non-inclined lenticular surfaces.
Figure 23:
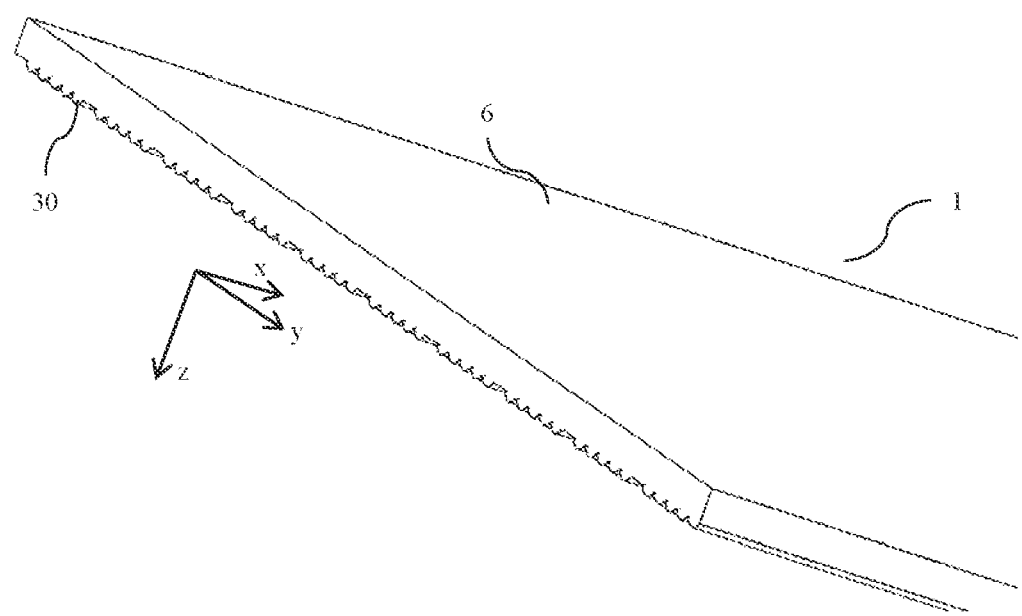
Figure 24A:
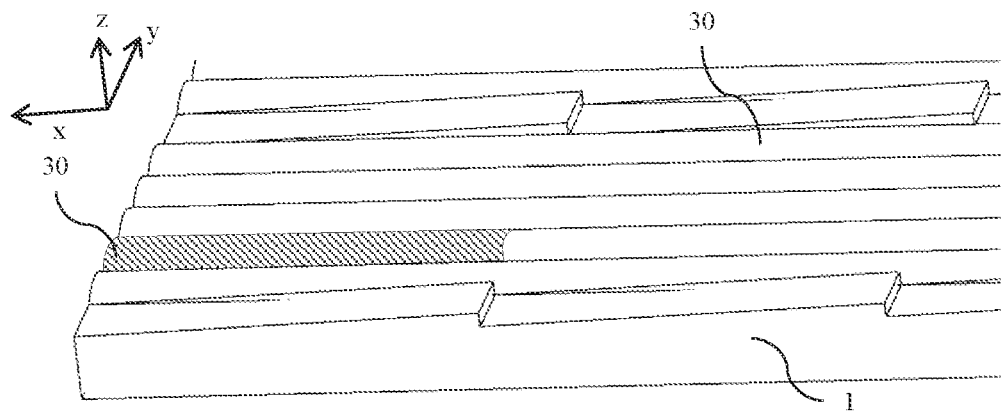
FIG. 24A is a schematic diagram illustrating in side perspective view a non-inclined lenticular surface of an optical waveguide.
Figure 24B:
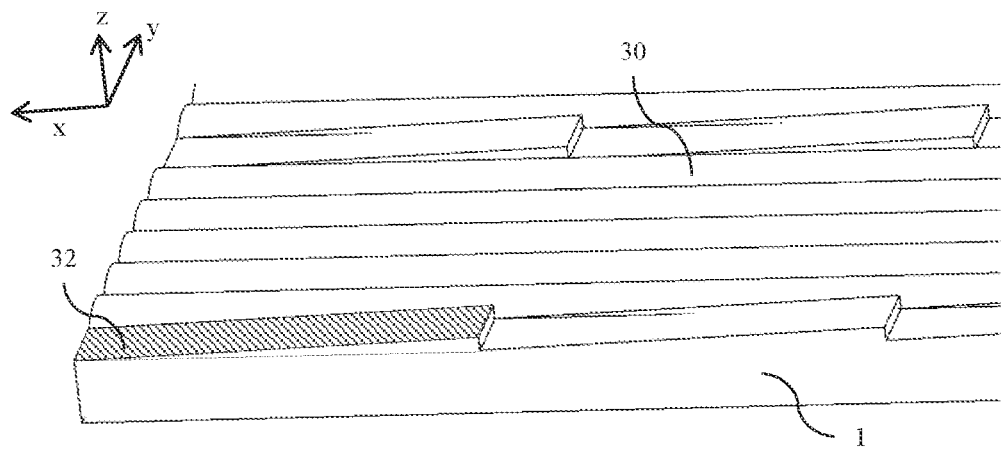
FIG. 24B is a schematic diagram illustrating in side perspective view a first inclined planar region of an optical waveguide.
Figure 24C:
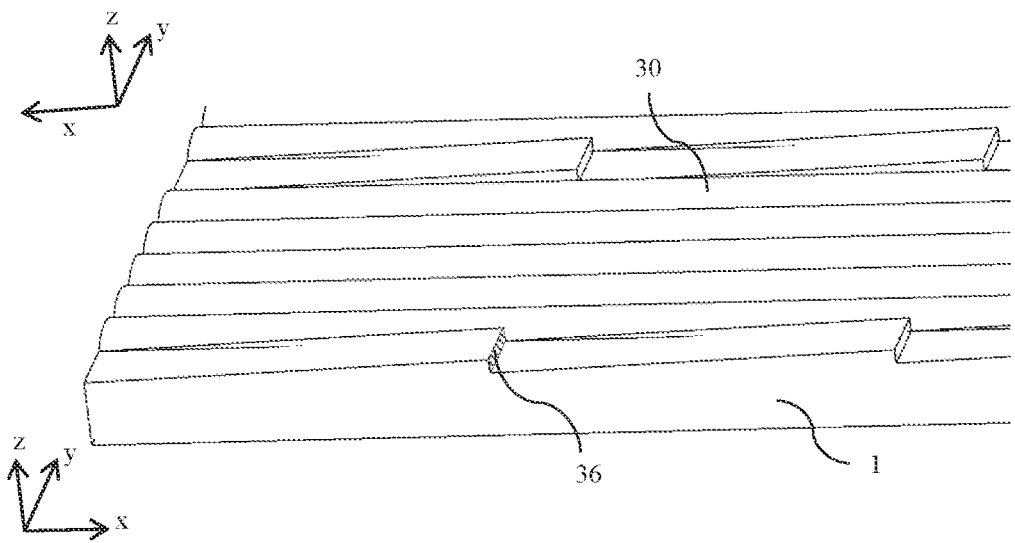
FIG. 24C is a schematic diagram illustrating in side perspective view a second inclined planar region of an optical waveguide.

FIGS. 22-23 are schematic diagrams illustrating in side perspective views an optical waveguide 1 comprising a non-inclined lenticular surface 30 and inclined planar surfaces 32, 36 that do not intersect the non-inclined lenticular surface 30; FIG. 24A is a schematic diagram illustrating in side perspective view a non-inclined lenticular surface 30 of an optical waveguide 1; FIG. 24B is a schematic diagram illustrating in side perspective view a first inclined planar surface 32 of an optical waveguide 1; and FIG. 24C is a schematic diagram illustrating in side perspective view a second inclined planar surface 36 of an optical waveguide 1.

In simulation, such a structure provides similar field-of-view luminance characteristics to those illustrated above for FIG. 2. In comparison to the embodiment of FIG. 2, such a structure may provide uniform elongate lenticular surfaces that are not cross-cut. Scatter at intersection of the cross-cut surfaces may be reduced. Advantageously privacy performance may be improved.

Another structure of optical waveguide 1 will now be described.

Figure 25:
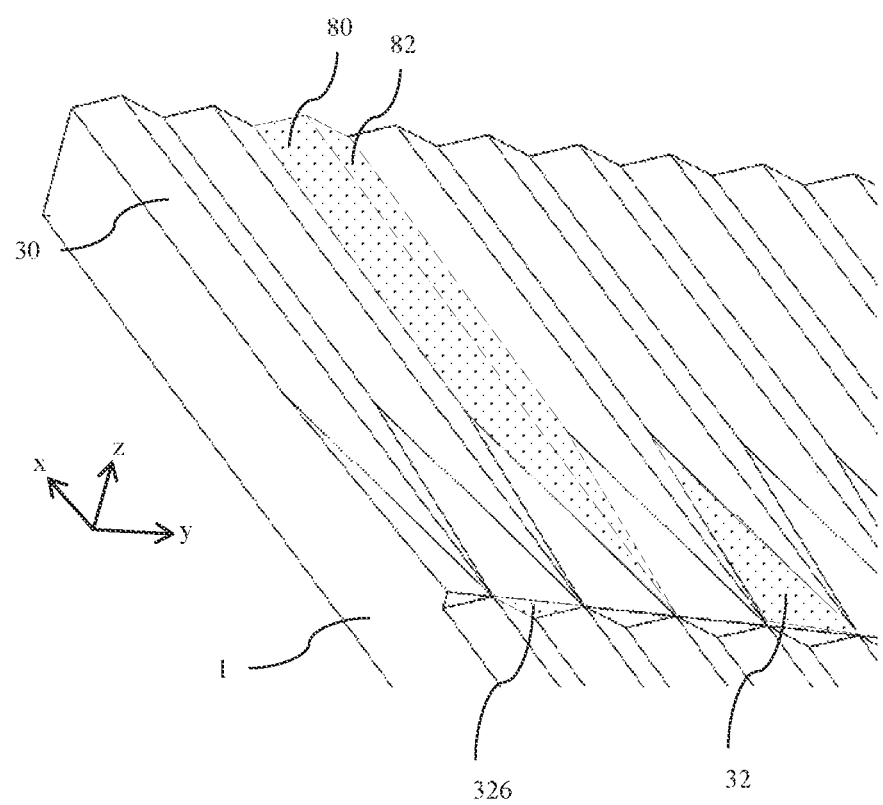
FIG. 25 is a schematic diagram illustrating in side perspective view an optical waveguide comprising a non-inclined elongate prismatic surface and first and second inclined intersecting planar surfaces.

FIG. 25 is a schematic diagram illustrating in side perspective view an optical waveguide 1 wherein the second light guiding surface comprises a non-inclined elongate feature that is a prismatic feature comprising two surfaces 80, 82 which each have a surface normal in a plane perpendicular to the lateral direction inclined at an opposite angle so that the surface normal varies across the width of the elongate prismatic feature in the lateral direction. The second light guiding surface also comprises first and second inclined intersecting planar surfaces 32, 36 which form inclined light extraction features.

Features of the arrangements of FIGS. 22-25 not discussed in further detail may be assumed to correspond to the features with equivalent reference numerals as discussed above, including any potential variations in the features.

Figure 26A:
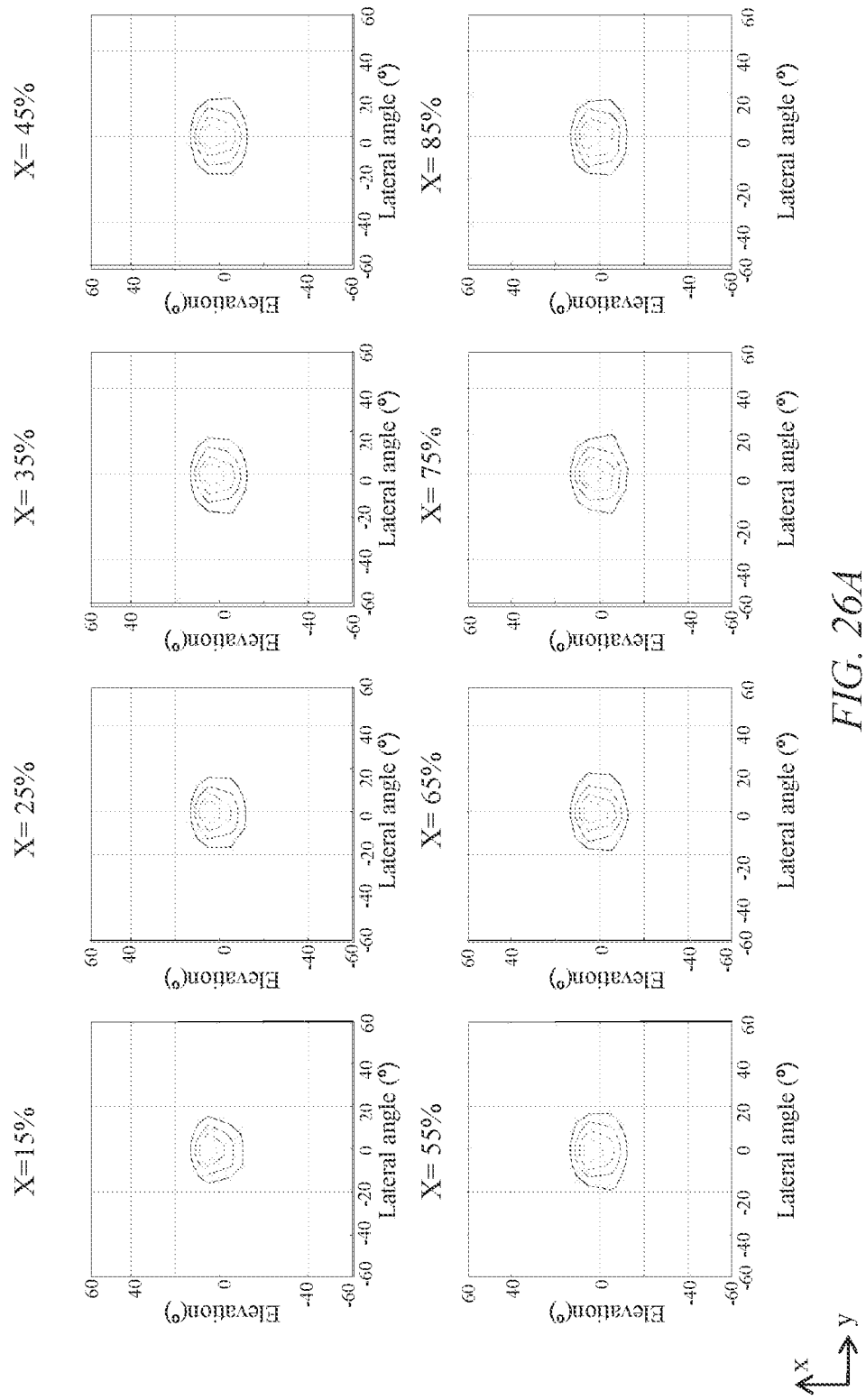
FIG. 26A is a schematic graph illustrating iso-luminance field-of-view polar plots for different positions across a backlight comprising an optical waveguide of FIG. 25 and light turning film of FIGS. 11A-11D when light is input into the first end of the optical waveguide.
Figure 26B:
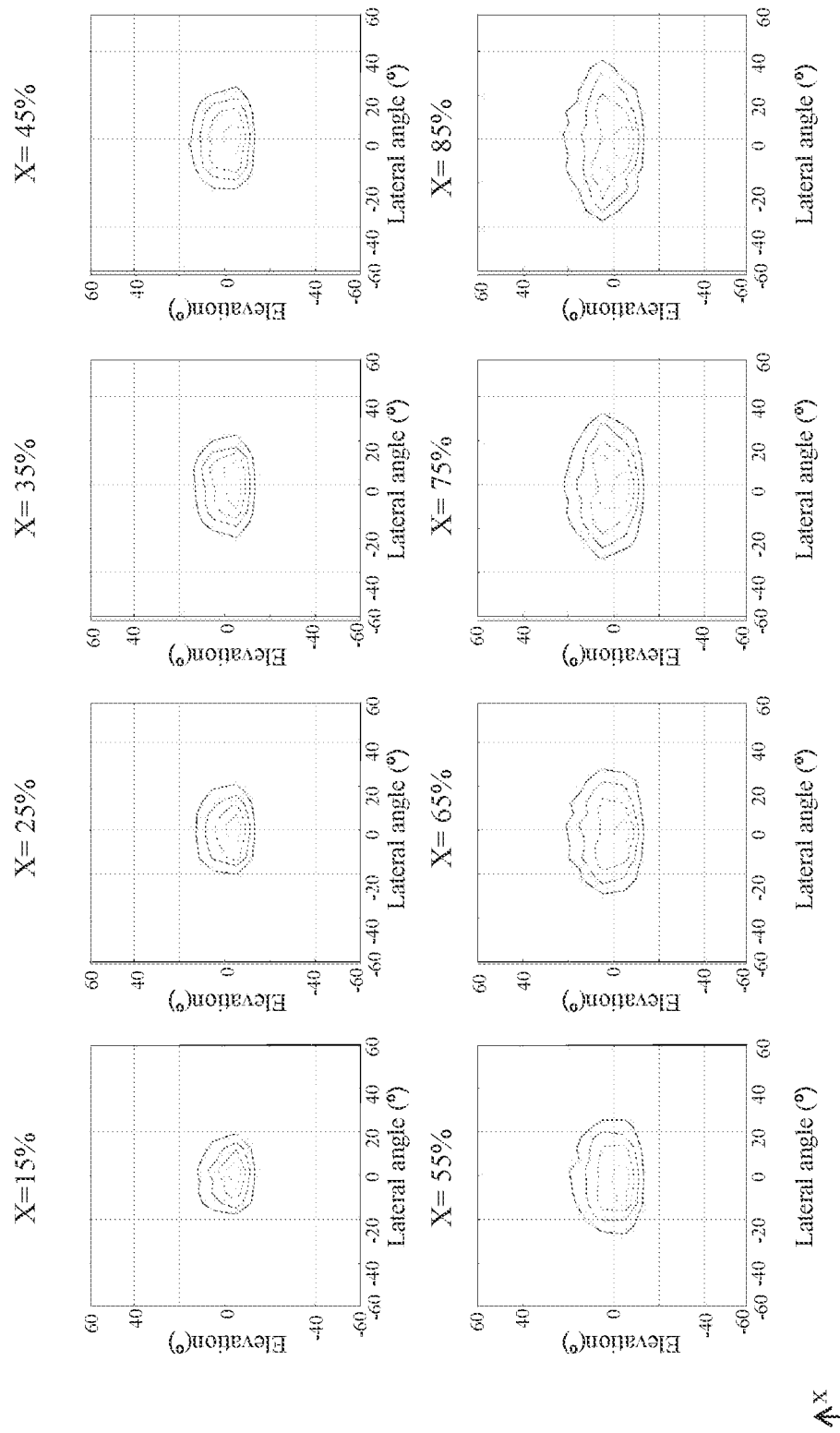
FIG. 26B is a schematic graph illustrating iso-luminance field-of-view polar plots for different positions across a backlight comprising an optical waveguide of FIG. 25 and light turning film of FIGS. 11A-11D when light is input into the second end of the optical waveguide.

FIG. 26A is a schematic graph illustrating iso-luminance field-of-view polar plots for different positions across a backlight comprising an optical waveguide of FIG. 25 and light turning film of FIGS. 11A-11D when light is input into the first end of the optical waveguide; and FIG. 26B is a schematic graph illustrating iso-luminance field-of-view polar plots for different positions across a backlight comprising an optical waveguide of FIG. 25 and light turning film 5 of FIGS. 11A-11D when light is input into the second end of the optical waveguide. Advantageously the prismatic surfaces may be conveniently fabricated with planar surface diamonds. Further, the profile of output in privacy mode can be enlarged, achieving increased uniformity for on-axis viewing.

Another structure of optical waveguide 1 will now be described.

Figure 27A:
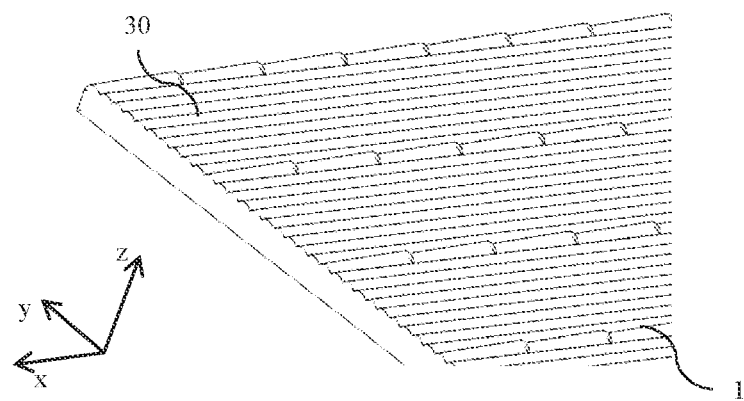
FIG. 27A, FIG. 27B, and FIG. 27C are schematic diagrams illustrating in perspective views an optical waveguide comprising a non-inclined lenticular surface, an inclined lenticular surface and an inclined planar surface.
Figure 27B:
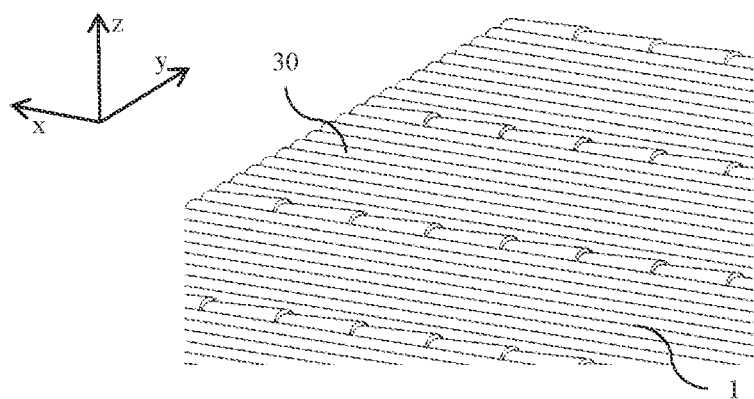
Figure 27C:
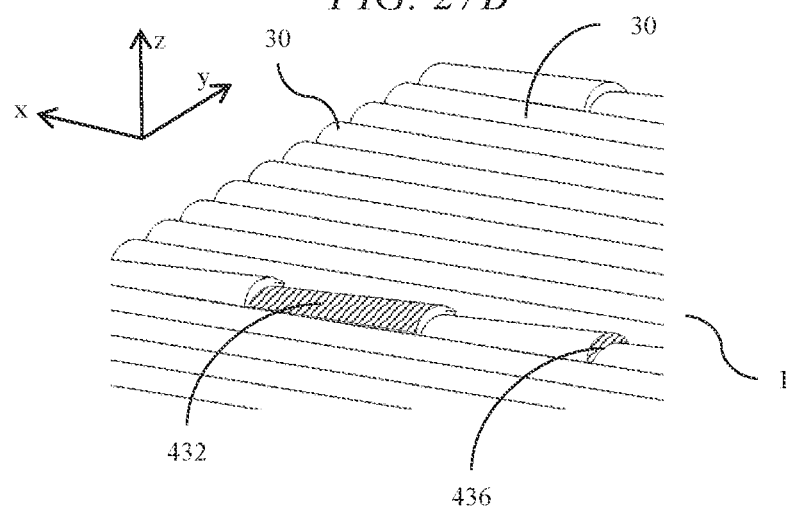

FIGS. 27A-27C are schematic diagrams illustrating in perspective views an optical waveguide wherein the second guide surface comprises a non-inclined lenticular surface 30 that is a non-inclined light extraction feature, and also an inclined lenticular surface 432 and an inclined planar surface 436 that are inclined light extraction features. That is, the inclined light extraction features comprise lenticular surfaces 432 and planar surfaces 436 that are extended in the longitudinal direction. Advantageously the same diamond that is used to cut the non-inclined lenticular surface 30 may be used to cut the inclined lenticular surfaces 432, reducing cost and complexity.

Another structure of optical waveguide 1 will now be described.

Figure 28:
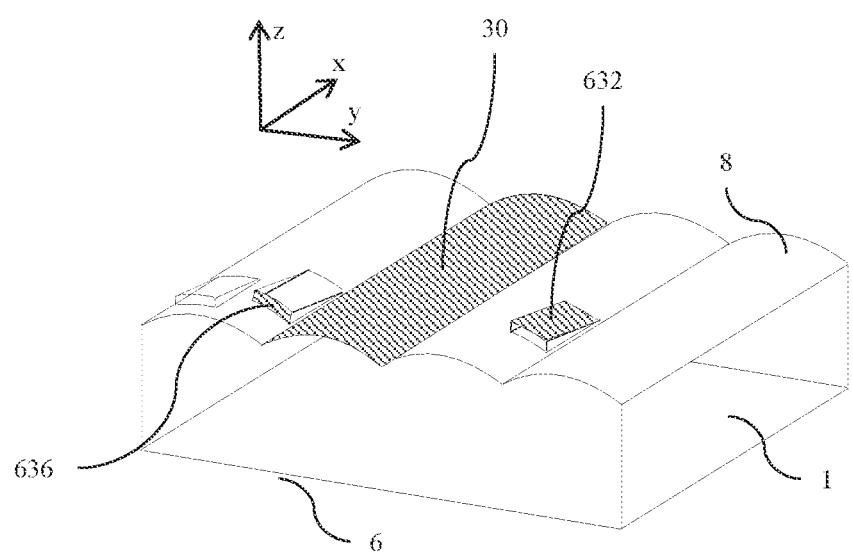
FIG. 28 is a schematic diagram illustrating in perspective view an optical waveguide comprising a non-inclined lenticular surface and first and second inclined planar surfaces arranged on the non-inclined lenticular surface.

FIG. 28 is a schematic diagram illustrating in perspective view an optical waveguide wherein the second guide surface comprises a non-inclined lenticular surface 30 that is a non-inclined light extraction feature and first and second inclined planar surfaces 632, 636 that are inclined light extraction features arranged on the non-inclined lenticular surface 30. In comparison to FIG. 2, the planar surfaces 632, 636 may be arranged randomly across the light guiding surface 8, advantageously reducing the appearance of Moiré.

It may be desirable to provide two different narrow angle illumination directions.

Figure 29A:
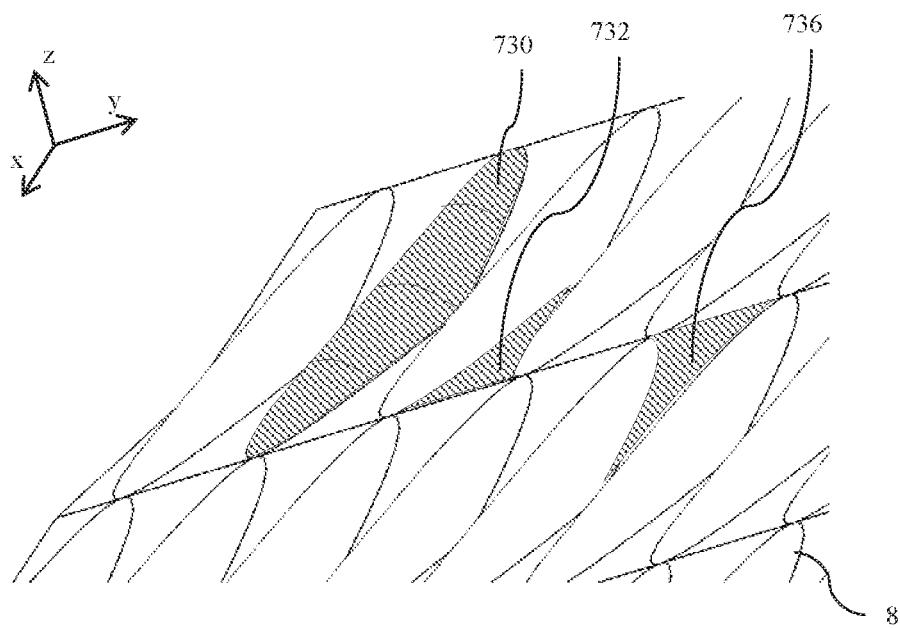
FIG. 29A and FIG. 29B are schematic diagrams illustrating in perspective views an optical waveguide comprising a non-inclined lenticular surface and first and second opposed inclined planar surfaces.
Figure 29B:
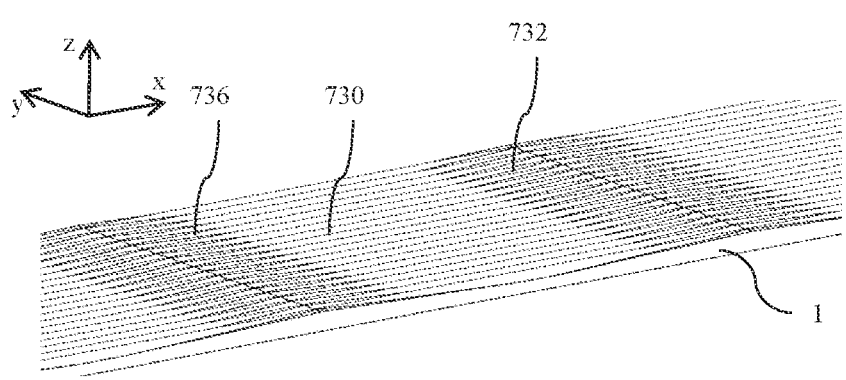
Figure 29C:
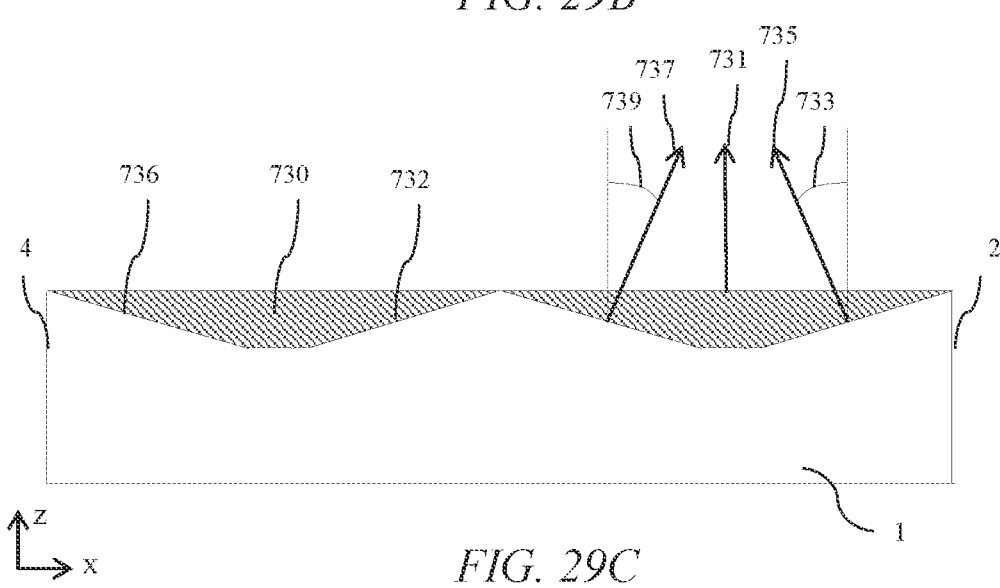
FIG. 29C is a schematic diagram illustrating in side view an optical waveguide comprising a non-inclined lenticular surface and first and second opposed inclined planar surfaces.

FIGS. 29A-29B are schematic diagrams illustrating in perspective views an optical waveguide wherein the second guide surface comprises a non-inclined lenticular surface 730 that is a non-inclined light extraction feature and first and second opposed inclined planar surfaces 732, 736 that are inclined light extraction features; and FIG. 29C is a schematic diagram illustrating the same optical waveguide in side view.

The tilt of the normal 731 to the non-inclined lenticular surface 730 in the x-z plane is zero, that is there is no tilt in the longitudinal direction.

First inclined planar surface 732 has surface normal 735 inclined in the longitudinal direction towards the second input end 4 and second inclined planar surface 736 has surface normal 737 inclined towards the first input end 2. The tilt angle 733, 739 of the normal directions 735, 737 in the longitudinal direction of each of the first and second pluralities of inclined planar surfaces 732, 736 is between 0.25 degrees and 5 degrees, preferably between 0.5 degrees and 4 degrees and most preferably between 1 degree and 3 degrees.

Features of the arrangements of FIGS. 27A-29C not discussed in further detail may be assumed to correspond to the features with equivalent reference numerals as discussed above, including any potential variations in the features.

Figure 30A:
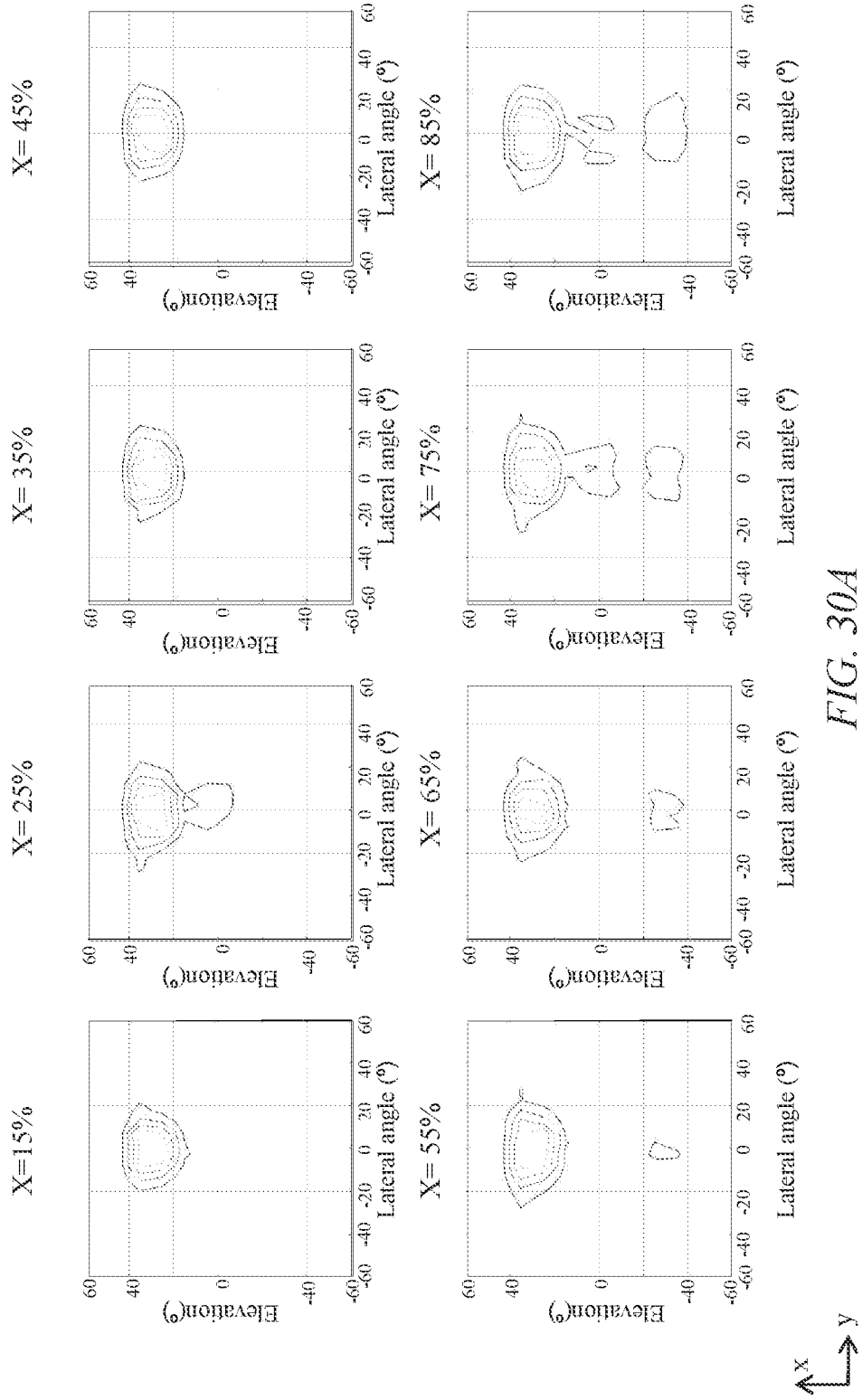
FIG. 30A is a schematic graph illustrating iso-luminance field-of-view polar plots for different positions across a backlight comprising an optical waveguide of FIG. 29C and light turning film of FIGS. 11A-11D when light is input into the first end of the optical waveguide.
Figure 30B:
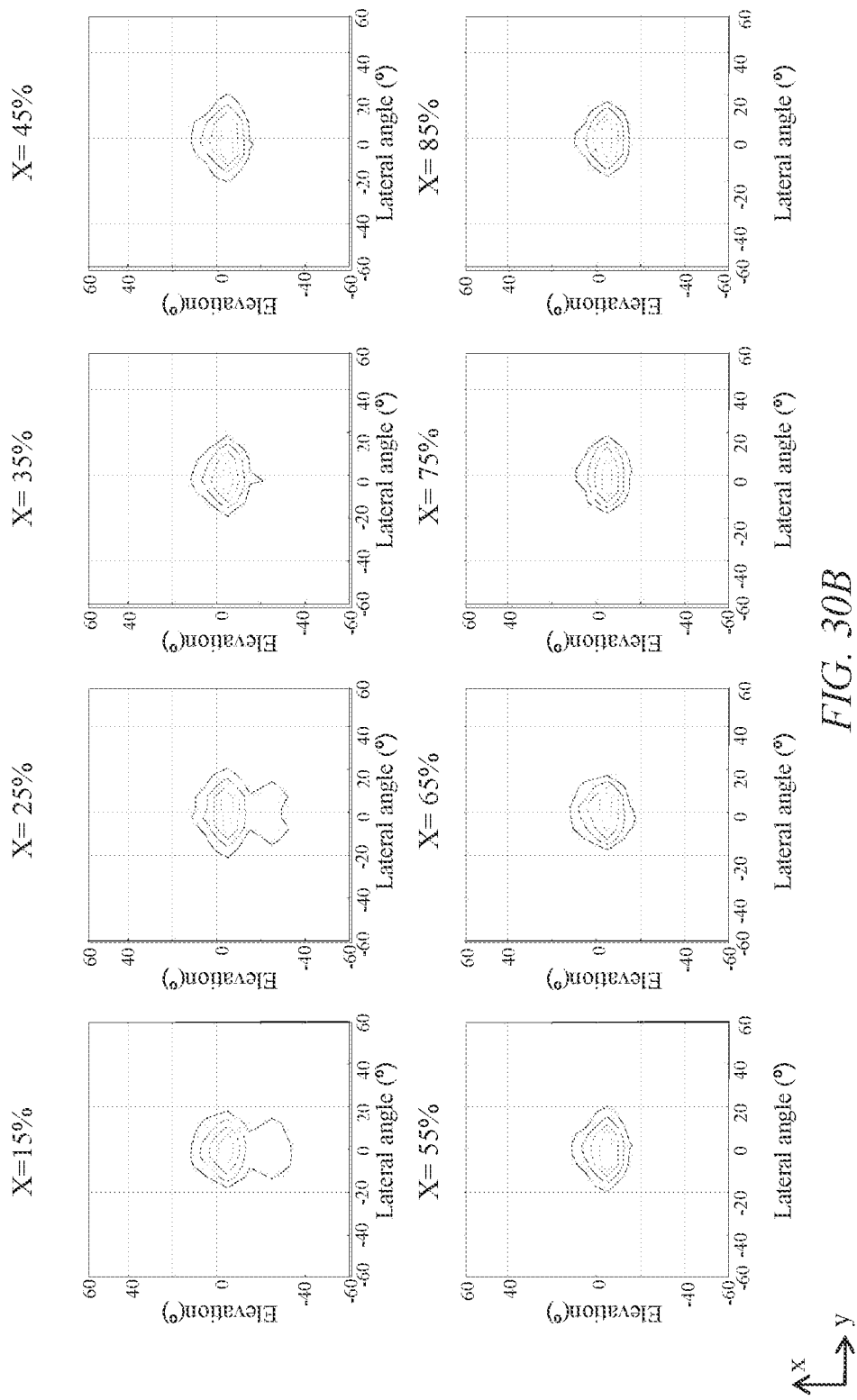
FIG. 30B is a schematic graph illustrating iso-luminance field-of-view polar plots for different positions across a backlight comprising an optical waveguide of FIG. 29C and light turning film of FIGS. 11A-11D when light is input into the second end of the optical waveguide.

FIG. 30A is a schematic graph illustrating iso-luminance field-of-view polar plots for different positions across a backlight comprising an optical waveguide 1 of FIG. 29C and light turning film 5 of FIGS. 11A-11D when light is input into the first end 2 of the optical waveguide 1 by light source 15; and FIG. 30B is a schematic graph illustrating iso-luminance field-of-view polar plots for different positions across a backlight comprising an optical waveguide of FIG. 29C and light turning film 5 of FIGS. 11A-11D when light is input into the second end 2 of the optical waveguide 1.

Thus in a first mode of operation, provided by illuminating light source 15 an off-axis illumination profile is provided with a 30 degrees offset from the normal direction in the longitudinal direction. In a second mode of operation an on-axis illumination profile may be provided by illumination of light source 17.

The relative offset of the two illumination profiles may be controlled by adjustment of the angles of the prism faces 52, 54 surface normal directions of the light turning film 5.

Advantageously such a display may provide controllable illumination to two separate users. The application of such a display to an automotive cabin environment will now be described.

Figure 31:
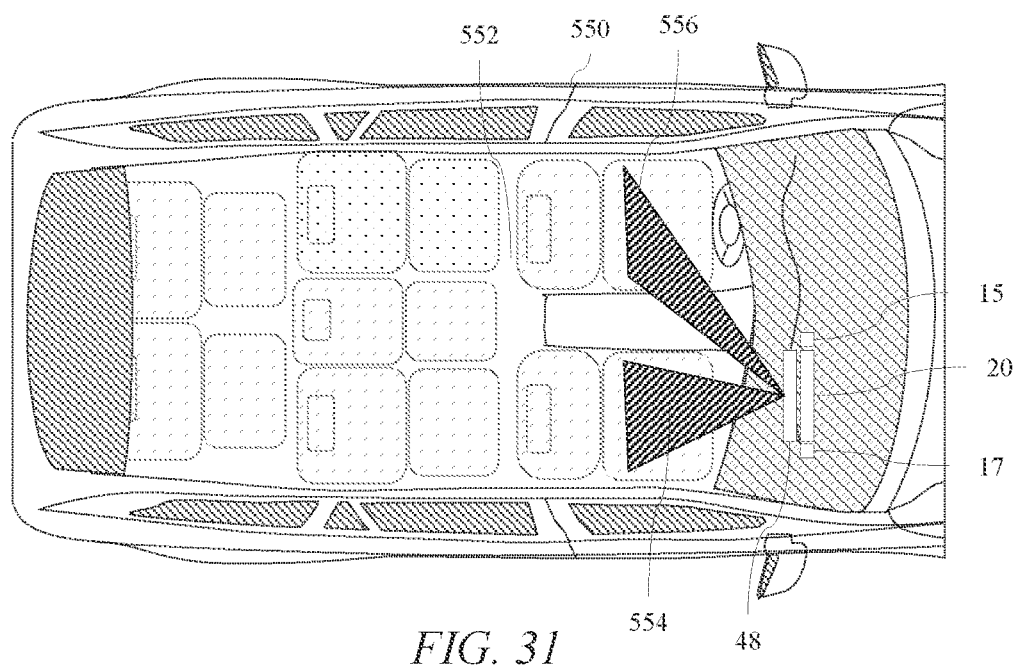
FIG. 31 is a schematic diagram illustrating in top view an automotive cabin comprising a display comprising the backlight comprising the optical waveguide 1 of FIG. 29C.

FIG. 31 is a schematic diagram illustrating in top view an automotive cabin 552 of a vehicle 550 comprising a display 100 comprising the backlight 20 comprising the optical waveguide 1 of FIG. 29C. In operation in a first mode, light source 15 is illuminated to provide illumination to passenger in light cone 554. Such a display may provide low luminance to the driver, and thus provide an entertainment function for example without distraction to the driver. The off-axis luminance may be further reduced by means of the switchable liquid crystal retarder 300 of FIG. 1.

For night-time operation, stray light may be reduced advantageously providing increased safety from undesirable internal cabin illumination. Display size may be increased for low ambient illumination of the automotive cabin.

In a second mode of operation the backlight 20 may be illuminated alternatively or additionally by a second source 17 such that the driver may perceive an image from the display.

The image displayed on the spatial light modulator may be time multiplexed. In a first phase the light source 15 may be illuminated and a first image displayed on the spatial light modulator 48 that may be a fast response liquid crystal display, for example capable of 100 Hz or higher frame rates. In a second phase the light source 17 may be illuminated and a second image displayed of the spatial light modulator 48. A first image may be supplied to the driver and a second image may be supplied to the passenger. Advantageously the display 100 may provide different images to passenger and driver with full spatial resolution for each user at low cost and complexity.

Various display arrangements will now be described.

Figure 32:
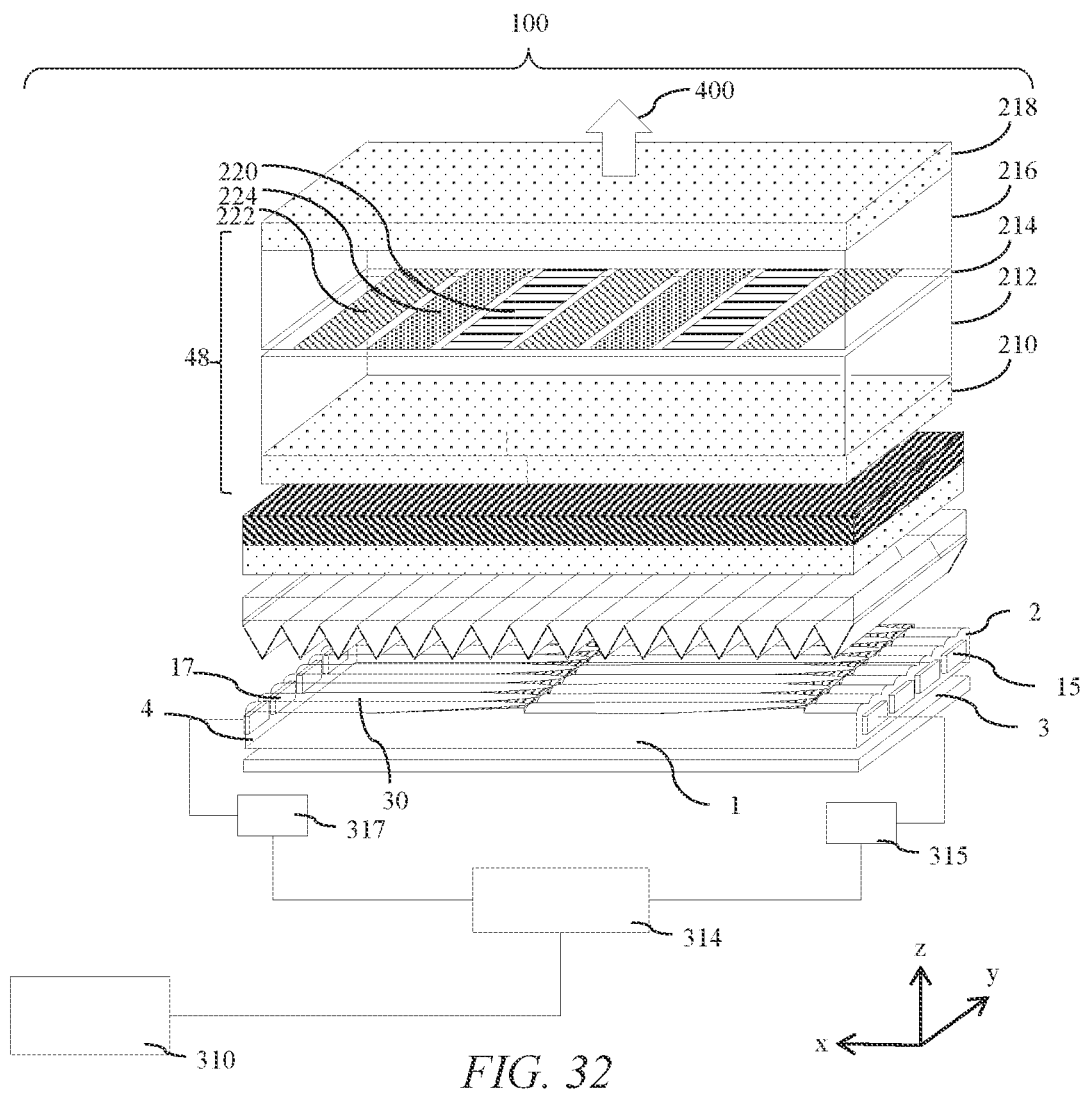
FIG. 32 is a schematic diagram illustrating in side perspective view an optical stack of a switchable privacy display device comprising a switchable directional waveguide arranged to illuminate a spatial light modulator.

FIG. 32 is a schematic diagram illustrating in side perspective view an optical stack of a switchable privacy display device comprising a switchable directional waveguide arranged to illuminate a spatial light modulator. Thus the switchable liquid crystal retarder 300 of FIG. 1 may be omitted. Advantageously thickness and cost is reduced. Such a display may conveniently provide high luminance or reduced power consumption as well as night-time operation to reduce stray light to non-users.

Figure 33:
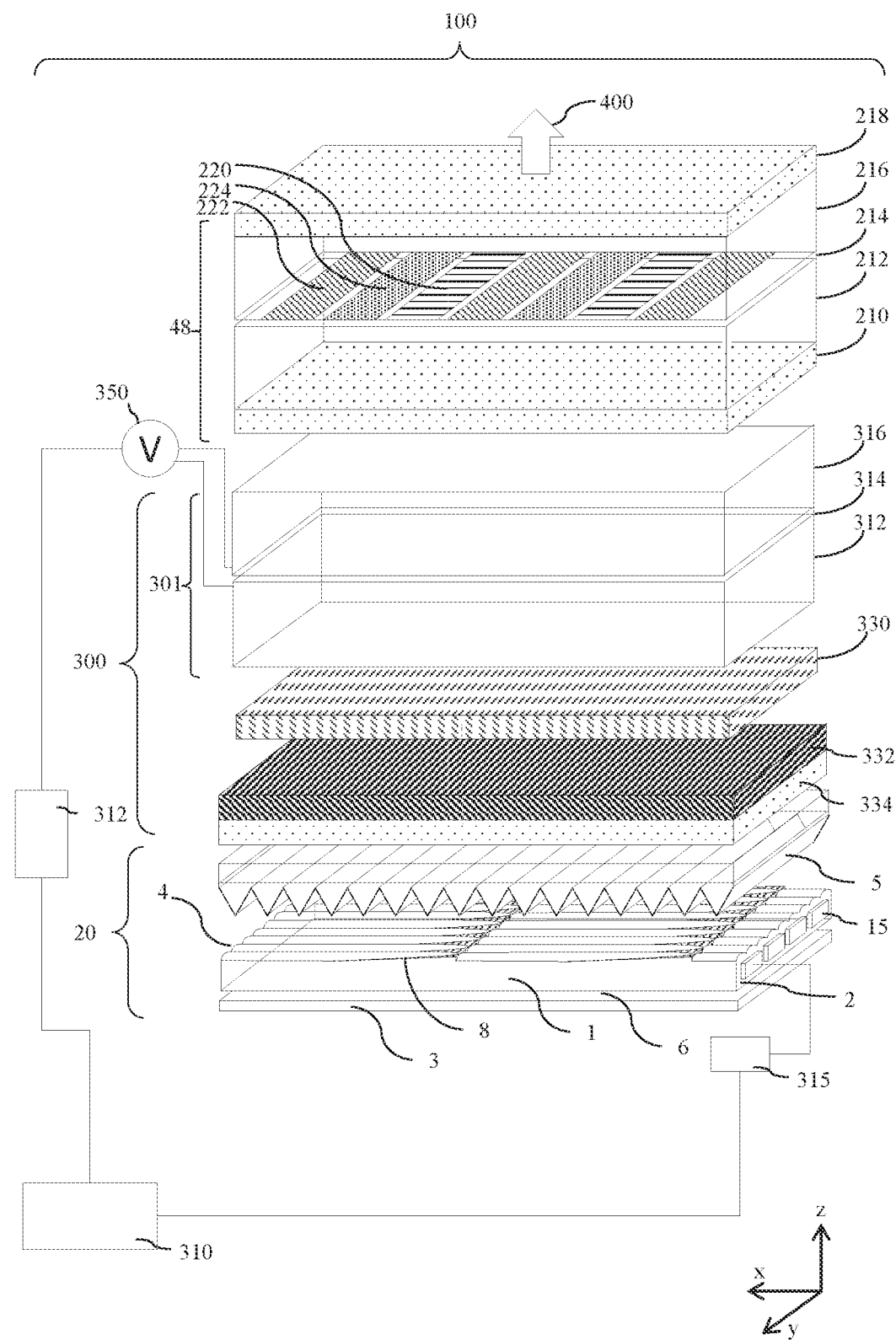
FIG. 33 is a schematic diagram illustrating in side perspective view an optical stack of a collimated display device comprising a switchable directional waveguide arranged to illuminate a spatial light modulator.

FIG. 33 is a schematic diagram illustrating in side perspective view an optical stack of a collimated display device comprising a non-switchable directional waveguide arranged to illuminate a spatial light modulator. Such a display omits the light source 17 and associated connections so has a narrower bezel width in comparison to FIG. 1 and thus may be arranged in smaller form factors. The shape of the planar surfaces 32, 36 and light turning film 5 may be adjusted to provide a larger cone angle than illustrated in FIG. 12A for example to achieve a desirable wide angle profile with privacy switching provided by the switchable liquid crystal retarder 300.

Features of the arrangements of FIGS. 33A-B not discussed in further detail may be assumed to correspond to the features with equivalent reference numerals as discussed above, including any potential variations in the features.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An optical waveguide comprising:
   first and second opposed light guiding surfaces for guiding light along the optical waveguide by total internal reflection;
   a first light input end arranged between the first and second light guiding surfaces, wherein the first light input end extends in a lateral direction; and
   a second light input end arranged between the first and second light guiding surfaces, wherein the second light input end extends in a lateral direction facing the first light input end,
   wherein the second light guiding surface of the optical waveguide comprises:
   (i) a plurality of non-inclined light extraction features arranged in a two dimensional array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction; and
   (ii) a plurality of inclined light extraction features arranged in a two dimensional array, each inclined light extraction feature having a surface normal direction with a tilt that has a component in the longitudinal direction, the plurality of non-inclined light extraction features and the plurality of inclined light extraction features being oriented to direct guided light through the first and second light guiding surfaces as output light having different angular illumination profiles for light input through the first and second input ends.

2. An optical waveguide according to claim 1, wherein the plurality of inclined light extraction features comprises:

a first plurality of inclined light extraction features, each light extraction feature of the first plurality of inclined light extraction features having a surface normal direction that has a tilt with a component in the longitudinal direction that is away from the first light input end; and a second plurality of inclined light extraction features, each light extraction feature of the second plurality of inclined light extraction features having a surface normal direction that has a tilt with a component in the longitudinal direction that is towards the first light input end.

3. An optical waveguide according to claim 2, wherein the magnitude of the component in the longitudinal direction of the tilt of the surface normal direction of the first plurality of inclined light extraction features is different from the magnitude of the component in the longitudinal direction of the tilt of the surface normal direction of the second plurality of inclined light extraction features.

4. An optical waveguide according to claim 3, wherein the component in the longitudinal direction of the tilt of the surface normal direction of the first plurality of inclined light extraction features is between 0.25 degrees and 5 degrees, preferably between 0.5 degrees and 4 degrees and most preferably between 1 degree and 3 degrees.

5. An optical waveguide according to claim 3, wherein the component in the longitudinal direction of the tilt of the surface normal direction of the second plurality of inclined light extraction features is between 80 degrees and 90 degrees, and preferably between 85 degrees and 90 degrees.

6. An optical waveguide according to claim 3, wherein the tilt in the longitudinal direction of the second plurality of inclined light extraction features is between 0.25 degrees and 5 degrees, preferably between 0.5 degrees and 4 degrees and most preferably between 1 degree and 3 degrees.

7. An optical waveguide according to claim 1, wherein the inclined light extraction features comprise planar inclined light extraction features.

8. An optical waveguide according to claim 7, wherein the planar inclined light extraction features have surface normal directions that have no component in the lateral direction.

9. An optical waveguide according to claim 1, wherein the inclined light extraction features comprise lenticular surfaces that are extended in the longitudinal direction.

10. An optical waveguide according to claim 1, wherein the non-inclined light extraction features comprise lenticular surfaces or an elongate prismatic surfaces.

11. An optical waveguide according to claim 1, wherein the plurality of non-inclined light extraction features are intersected by the inclined light extraction features.

12. An optical waveguide according to claim 1, wherein the first light guiding surface comprises a planar surface.

13. A backlight apparatus comprising the optical waveguide according to claim 1, further comprising:

at least one light source arranged to input light into the optical waveguide at the first input end; and at least one further light source arranged to input light into the optical waveguide at the second input end.

14. A backlight apparatus according to claim 13, further comprising a control system arranged to control the luminous flux from the light sources.

15. A backlight apparatus according to claim 13, further comprising a light turning film arranged to receive the output light, the light turning film comprising an array of prismatic elements that are elongate in the lateral direction.

16. A backlight apparatus according to claim 15, wherein the second surface of the optical waveguide is arranged between the first surface of the optical waveguide and the light turning film, and the light turning film is arranged to receive light transmitted through the second surface of the optical waveguide.

17. A backlight apparatus according to claim 15, wherein the prismatic elements of the array of prismatic elements each comprise opposing first and second prismatic faces, wherein:

each first prismatic face has a surface normal direction that has a component that is inclined in the longitudinal direction towards the first input end; and each second prismatic face has a surface normal direction that has a component that is inclined in the longitudinal direction away from the first input end.

18. A backlight apparatus according to claim 17, wherein each first prismatic face comprises a planar surface and each second prismatic face comprises an undulating surface, wherein:

when light is input into the first input end of the optical waveguide, output light from the optical waveguide is refracted by the second prismatic facet and is reflected by the first prismatic face; and when light is input into the second input end of the optical waveguide, output light from the optical waveguide is refracted by the first prismatic facet and is reflected by the second prismatic face.

19. A backlight apparatus according to claim 13, further comprising a rear reflector facing the first light guiding surface that is arranged to reflect light transmitted through the first surface of the optical waveguide.

20. A display apparatus comprising the backlight apparatus according to claim 13, further comprising a spatial light modulator arranged to receive light from the light turning film.

21. A display apparatus according to claim 20, further comprising:

at least one display polariser arranged on a side of the spatial light modulator;

an additional polariser arranged on the same side of the spatial light modulator as the display polariser; and a switchable liquid crystal retarder comprising a layer of liquid crystal material arranged between the display polariser and the additional polariser.

22. A display apparatus according to claim 21, wherein when a light source is arranged to input light into the optical waveguide at the first input end, a first voltage is applied across the switchable liquid crystal retarder and when a light source is arranged to input light into the optical waveguide at the second input end, a second voltage different to the first voltage is applied across the switchable liquid crystal retarder.

23. An optical waveguide according to claim 1, wherein the plurality of non-inclined light extraction features are bisected by the plane of the inclined light extraction features adjacent thereto such that the width of the non-inclined light extraction features reduces towards a cusp between the inclined light extraction features.

\* \* \* \* \*